United States Patent [19]
Jourjine

[11] Patent Number: 5,991,441
[45] Date of Patent: *Nov. 23, 1999

[54] REAL TIME HANDWRITING RECOGNITION SYSTEM

[75] Inventor: Alexander N. Jourjine, Winchester, Mass.

[73] Assignee: Wang Laboratories, Inc., Billerica, Mass.

[*] Notice: This patent is subject to a terminal disclaimer.

[21] Appl. No.: 08/476,826

[22] Filed: Jun. 7, 1995

[51] Int. Cl.[6] .............................. G06K 9/00; G06K 9/46; G06K 9/32
[52] U.S. Cl. .......................... 382/187; 382/204; 382/301
[58] Field of Search ..................................... 382/187, 186, 382/185, 188, 189, 309, 310, 311

[56] References Cited

U.S. PATENT DOCUMENTS

| | | | |
|---|---|---|---|
| 4,365,235 | 12/1982 | Greanias et al. | 382/189 |
| 4,542,526 | 9/1985 | Satoh et al. | 382/187 |
| 4,653,107 | 3/1987 | Shojima et al. | 382/189 |
| 5,313,527 | 5/1994 | Guberman et al. | 382/186 |

FOREIGN PATENT DOCUMENTS

| | | |
|---|---|---|
| 0608708 | of 0000 | European Pat. Off. . |
| 9311505 | of 0000 | WIPO . |

OTHER PUBLICATIONS

IBM Journal of Research & Development, vol. 25, No. 2, 3, May 1981, NY, pp. 187–195, Yhap, et al: "An On–Line Chinese Character Recognition System".

Pattern Recognition, vol. 24, No. 9 Head, Jan. 1, 1991, pp. 895–907, Lipscomb: "A Tranable Gesture Recognizer".

*Primary Examiner*—Yon Couso
*Assistant Examiner*—Ha Tran Nguyen
*Attorney, Agent, or Firm*—Ronald J. Paglierani; Gary D. Clapp

[57] ABSTRACT

A handwritten character recognizer having an input cluster buffer and a point buffer with dynamic and static stroke feature extraction and segment analysis by conical boundaries for identification of stroke segments dynamic stroke feature extractor static stroke feature extractor. A stroke recognizer compares single copies of idealized stroke representations with hierarchically approximated multiple scaled topological representations of a current stroke, followed by stroke proportion discrimination comparing a selected topological representation of the current stroke with boundaries defined by linear combinations of features of direct and reversed ideal stroke prototypes to provide a stroke identification. A cluster recognizer maintains a time ordered current stroke buffer and previous stroke buffer and constructs a per stroke area of influence list. The time ordered buffers are scanned to generate a spatially ordered window buffer. A position discriminator assigns character meanings to clusters of stokes in the window buffer. The buffer scanner is responsive to a current stroke having spatial coordinates located between previous strokes for reordering the stroke buffers and determining a new cluster meanings. An editor is responsive to an editing gesture or combination of two strokes for directing the stroke buffer controller to modify the strokes in the stroke buffer accordingly.

32 Claims, 44 Drawing Sheets

FIG. 3

```
typedef struct{
    UCHAR Prot;      // counts prototypes in stroke
                     // segmentation
    UCHAR Isrt;      // space insertion is on or off
    UCHAR Eras;      // erase with gesture or not
    UCHAR Buff;      // counts stroke buffer entries
    UCHAR Ansr;      // counts cluster buffer entries
    UCHAR Wind;      // counts window buffer entries
    USHORT Pnts;     // counts points in buffer
    UCHAR Segm;      // counts segments for the winning
                     // scale
    UCHAR Segs[SC];  // counts segments for all scales
    UCHAR Edit;      // editing off or on
    UCHAR Over;      // Overwriting on or off
    char Bind;       // binding is -1, 0, 1
}COUNT;
```

FIG. 4

```
typedef struct recpt{
    short x;    // x coordinate
    short y;    // y coordinate
    short t;    // TRANSITION
}RECPT;
```

```
void far PenISR(void)
{
Get new value for pen position and pressure/height;
Determine the state of the pen;
Determine <TRANSITION> variable between two consecutive states;
switch(TRANSITION)
    {
    case AWAY_UP:
        break;
    case AWAY_DOWN:
    case UP_DOWN:
        Draw the first point of contact;
        AddPoint();
        break;
    case UP_UP:
        Erase old cursor image;
        Draw new cursor image;
        break;
    case DOWN_UP:
        Erase old cursor image;
        Draw new cursor image;
        AddPoint();
        break;
    case DOWN_DOWN:
        If difference between two successive positions of the pen is more than one screen pixel then:
            Draw line connecting last and current points;
            AddPoint();
        break;
    default:
        break;
    }
}
```

FIG. 5

```
UCHAR far CheckRingBuffer(void)
{
    RemPoint();
    switch(TRANSITION)
        {
            case AWAY_AWAY:
            case AWAY_UP:
            case UP_AWAY:
            case UP_UP:
                break;
            case AWAY_DOWN:
            case UP_DOWN:
                StorePoints();
                PenDown();
                break;
            case DOWN_DOWN:
                StorePoints(&pnt);
                PenMoved();
                break;
            case DOWN_AWAY:
            case DOWN_UP:
                StorePoints(&pnt);
                theSym = PenUp();
                break;
            default:
                break;
        }
        return(theSym);
}
```

FIG. 6

```
typedef struct downRet{
        BEGSEG oneSeg;
        OLD    prevPt;
}DOWNRET;
```

FIG. 7A

```
typedef struct begseg{
    char    curDir[SC];      // actual direction of the segment for a particular scale
    UCHAR   firstP[SC];      // is the point the first for this scale
    SEGS    inseg[SC];       // parameters of actual segment
}BEGSEG;
```

FIG. 7B

```
typedef struct old{          // Contains old points, etc.
    COORD One[SC];           // coordinates of scale point before current
    COORD Two[SC];           // coordinates of scale point before before current
}OLD;
```

FIG. 7C

```
typedef struct segs{
    short Dir;               // virtual direction of the segment
    short Len;               // its length in tablet coordinates
    short Pos;               // its positive displacement
    short Neg;               // its negative displacement
}SEGS;
```

FIG. 7D

```
typedef struct coord{
    short x;
    short y;
}COORD;
```

FIG. 7E

```
void PenDown(DOWNRET *ret, COORD pen)
{
    tick.Segm = 0;
    for(scale = 0; scale < SC; scale++)
        {
            tick.Segs[scale]              = 0;
            (*ret).oneSeg.firstP[scale]   =   TRUE;
            (*ret).oneSeg.curDir [scale]  =   0;
            (*ret).oneSeg.inseg[scale].Dir = -1;
            (*ret).oneSeg.inseg[scale].Len = 0;
            (*ret).oneSeg.inseg[scale].Pos = 0;
            (*ret).oneSeg.inseg[scale].Neg = 0;
            (*ret).prevPt.One[scale]      = pen;
            (*ret).prevPt.Two[scale]      = pen;
        }
}
```

FIG. 8

```
void PenMoved(DOWNRET *ret, COORD pen)
{
    factor = 1;
    for(scale = 0; scale < SC; scale++)
        {
            de.x = pen.x - (*ret).prevPt.One[scale].x;
            de.y = pen.y - (*ret).prevPt.One[scale].y;
            spacing = (6400/factor/factor);
            if(((long)de.x*de.x + (long)de.y*de.y) >= spacing )
                {
                Stroke(ret, pen, de, scale);
                (ret*).oneSeg.firstP[scale] = FALSE;
                (*ret).prevPt.Two[scale]    = (*ret).prevPt.One[scale];
                (*ret).prevPt.One[scale]    = pen;
                }
                factor *= 2;
        }
}
```

FIG. 9

```
typedef struct binfo{
    UCHAR Sym[BUFFNUM];      // meaning of clusters
    COORD Siz[BUFFNUM];      // sizes of the clusters
    COORD Pos[BUFFNUM];      // their x-y-position
    short Len[BUFFNUM];      // their length = sum of lengths of constituent strokes
    short Prt[BUFFNUM];      // what prototype the cluster came from (either single stroke
                             //     or multiple stroke
                             //     prototype)
    UCHAR Frm[BUFFNUM][STRKNUM];   // cluster made from indexes to the stroke
buffer
}BINFO;
```

FIG. 10

```
UCHAR PenUp(DOWNRET *ret, BINFO *buf)
{
Get the meaning of the last stroke by calling SymRec(ret,buf,&oldBuf);
if(The number of clusters in cluster buffer is equal to two)
    {
    Meaning of last stroke     = (*buf).Sym[1];
    Meaning of previous stroke = (*buf).Sym[0];
    }
if(ModeFlag(buf)
    {
    retVal = ExeCom(nowSym,prevSym,buf,&oldBuf);
    if(retVal != 0) return(retVal);
    }
Otherwise print meanings of clusters on screen;
return(the Sym);
}
```

FIG. 11

```
UCHAR ExeCom(UCHAR nowSym, UCHAR prevSym, BINFO *buf, BINFO *oldBuf)
{
  reject = (nowSym != 'O');
  reject = reject||(prevSym != 'a');
  if(reject) return(0);
    if(prevSym == 'a') Call Some Command Routine;
}
```

FIG. 12

```
typedef struct Ext {
    COORD max[2]; // coords of max in x- y- dirs
    COORD min[2]; // coords of min in x- y- dirs
    }SEXTR;
```

FIG. 13A

```
typedef struct segscale{
    COORD Bef;  //   coordinates of the before endpoints
    COORD Aft;  //   coordinates of the after endpoints
    COORD End;  //   coordinates of the endpoints
    SEXTR Ext;         //   x- y-of the max in the ortho direction
    UCHAR Dir;         //   directions:  2 - U, 6 - D, 4 - L, 8 - R
    short Len;         //   screen length max extent of the segment
    short Pos;         //   screen positive displacement
    short Neg;         //   screen negative displacement
    short Pti;         //   index to beg of segment in <pntArr[ ]>
    short Pto;         //   index to end of segment in <pntArr[ ]>
    }SEGSC;
```

FIG. 13B

```
typedef struct segm{
    SEGSC Seg[SEGSNUM+1]; // segments per scale
    } SEGM;
```

FIG. 13C

```
void Stroke(DOWNRET *ret,COORD pen,COORD de,short scale)
{
    if(If Vector <de> Lies In The Right cone)
        {
        Current Direction Of <de>= RI;
        The Length Of <de> = X Coordinate Of <de>;
        Positive Displacement Of <de> = max(0, Y Coordinate Of <de> );
        Negative Displacement Of <de> = max(0, - Y Coordinate Of <de> );
        }
    else
    if(If Vector <de> Lies In The Left cone)
        {
        Current Direction Of <de> = LE;
        The Length Of <de> = - X Coordinate Of <de>;
        Positive Displacement Of <de> = max(0, Y Coordinate Of <de> );
        Negative Displacement Of <de> = max(0, - Y Coordinate Of <de> );
        }
    else
    if(If Vector <de> Lies In The Lower cone)
        {
        Current Direction Of <de> = DO;
        The Length Of <de> = Y Coordinate Of <de>;
        Positive Displacement Of <de> = max(0, X Coordinate Of <de> );
        Negative Displacement Of <de> = max(0, - X Coordinate Of <de> );
        }
    else
    if(If Vector <de> Lies In The Upper cone)
        {
        Current Direction Of <de> = UP;
        The Length Of <de> = - Y Coordinate Of <de>;
        Positive Displacement Of <de> = max(0, X Coordinate Of <de> );
        Negative Displacement Of <de> = max(0, - X Coordinate Of <de> );
        }
```

FIG. 14A

```
if(The Scale Point Is The Second Point Of This Scale)
{
    Assign Direction To First Segment;
    Assign Length To First Segment;
    Assign Positive Displacement To First Segment;
    Assign Negative Displacement To First Segment;
    Assign Begin Point Number To First Segment;
    Record The Coordinates Of The First Point Of First Segment;
    Record The Coordinates Of The Preceeding Point;
    Record The Coordinates Of The Subsequent Point;
    Assign Initial Values Of Segment Extrema For First Segment;
    Recompute The Values Of Segment Extrema For First Segment;
    return;
}
if(The Current Direction Of The Vector <de> Is The Same As The Direction Of This
Scale Segment)
{
    Augment Length Of Segment By The The Length Of <de>;
    Augment Its Positive Displacement By Positive Displacement Of <de>;
    Augment Its Negative Displacement By Negative Displacement Of <de>;
    Recompute The Coordinates of Maxima and Minima In X And Y Directions;
}
else
    if(The Total Number Of Segments Does Not Exceed The Maximum Allowable)
    {
        Assign Direction To New Segment;
        Assign Length To New Segment;
        Assign Positive Displacement To New Segment;
        Assign Negative Displacement To New Segment;
        Assign End Point Number To Old Segment;
        Augment Count Of Segments By One;
        Assign Begin Point Number To New Segment;
        Assign Initial Values Of Segment Extrema For New Segment;
```

FIG. 14B

```
        Recompute The Values Of Segment Extrema For New Segment;
        Record The Coordinates Of The First Point Of New Segment;
        Record The Coordinates Of The Preceeding Point;
        Record The Coordinates Of The Subsequent Point;
     }
  if(The Change Between Previous And Current Segment Directions More Than One Unit)
  {
     InsertSeg();
  }
  Save Current Values Of Segment Direction Lengths And Displacements;
}
```

FIG. 14C

```
void InsertSeg(DOWNRET *ret, COORD pen,short scale)
{
  if(The Total Number Of Segments Does Not Exceed The Maximum Allowable)
  {
     Assign Direction To The Fictitious Segment;
     Assign Zero Length And Displacements To The Fictitious Segment;
     Assign Extrema To The Fictitious Segment;
     Assign End Point Number To The Fictitious Segment;
     Assign Begin And End Point Numbers To The Before Fictitious Segment;
     Augment The Number Of Segments By One;
     Assign Begin Point Number To The After Fictitious Segment;
  }
}
```

FIG. 15

```
void LastSeg(DOWNRET *ret)
    {
    for(Each Scale Out Of SC Scales)
        {
        if(The Total Number Of Segments Does Not Exceed The
        Maximum Allowable)
            {
            Assign Direction To Last Segment;
            Assign Length To Last Segment;
            Assign Positive Displacement To Last Segment;
            Assign Negative Displacement To Last Segment;
            Assign End Point Number To Last Segment;
            Augment Count Of Segments By One;
            Record The Coordinates Of The Last Point Of Last Segment;
            Record The Coordinates Of The Preceeding Point;
            Record The Coordinates Of The Subsequent Point;
            }
        }
    }
```

FIG. 16

```
UCHAR SymRec(DOWNRET *ret, BINFO *buf,BINFO *oldBuf)
    {
    Finish Processing The Last Sampling Point;
    Find The Correct Range Of Scales;
    if(Scale Range Contains Only Finest Scale)
        {
        Treat This Stroke As Period Or Comma;
        }
    else
    for(All Scales In Range)
        {
        FindProt(&segs[scale], &tem, scale);
        if(The Length Of Best Fit Is More Than Stored)
            Choose This Scale Dynamic Features;
        }
    FindSyms(seg, buf, oldBuf, &str, &part);
    return(The Meaning Of The First Entry In The Answer Buffer);
    }
```

FIG. 17

```
struct protTbl{
      char  longProt[PROTLEN];
      UCHAR  symbols[BRCHNUM];
}protTbl[PROTNUM]
```

FIG. 18

```
void  FindProt(SEGM *forCop, PINFO *str, short scale)
{
    Reduce Noise In Dynamic Features;
    Initialize Topological Representation;
    Compute Angles Between Segments;
    Compute Dynamic Features For Reversed Stroke;
    for(Forward And Backward Stroke Direction)
    {
        for (All Prototypes)
        {
            if(Prototype Matches A Contiguous Section Of Direction String)
            {
                error = MatchFound(&aProt,forCop,str);
            }
        }
    }
}
```

FIG. 19

```
typedef struct prot{
        UCHAR Sym;  // prototype meaning
        UCHAR Prt;  // prototype number on the list
        UCHAR Off;  // offset of prototype within the direction string
        UCHAR Bit;  // bit length of the prototype
        UCHAR Len;  // bit length of the input direction string
        UCHAR Rol;  // roll value
        short Fit;  // screen length of the found prototype
        short Pti;  // pointer to beginning of prototype
        short Pto;  // pointer to end of prototype
}PROT;
```

FIG. 20

```
typedef struct pinfo {
    UCHAR   Sym[ALTSNUM];
    PROT    Prt[ALTSNUM];
    COORD   Siz[ALTSNUM];
    COORD   Pos[ALTSNUM];
} PINFO;
```

FIG. 21

```
short MatchFound(PROT *aProt,SEGM *cop,PINFO *str)
{
Compute The Length Of Matched Prototype;
if(The Length Is More Than A Set Fraction Of Input Stroke Length)
    {
    PropDisc(cop, str, aProt);
    }
return(Error Code);
}
```

FIG. 22

```
void PropDisc(SEGM *cop, PINFO *str, PROT *aProt)
{
Extract Static Proportion Features;
Extract Static Curvature Features;
Compute The Size Of Prototype;
Prototype Meaning = (*pSymBound[Prototype Number])(aProt)
if(Prototype Meaning Not Null)
    {
    Recompute The Size Of Prototype;
    Recompute Position Of Prototype;
    Add New Entry To Prototype List;
    Sort The Prototype List By Screen Length;
    }
}
```

FIG. 23

```
short Direct[PROTLEN]
short bseg[PROTLEN]
short pseg[PROTLEN]
short nseg[PROTLEN]
short fseg[PROTLEN]
short chdsg1[SEGSNUM]
short chdsg2[SEGSNUM]
COORD segpos[PROTLEN+1]
COORD pext
short befd[LOOK]
short befb[LOOK]
short befp[LOOK]
short befn[LOOK]
short aftd[LOOK]
short aftb[LOOK]
short aftp[LOOK]
short aftn[LOOK]
```

FIG. 24

```
short SymBoundXX(PROT *aProt)
{
    Assign Values To False Boolean Boundaries;
    If Any Of FalseBoundaries Is True Reject Prototype;
    if(RejectSym(aProt)) return(NULL_SYM);
    Assign Values To Feature Boundaries;
    Assign Values To True Boolean Boundaries On The Second Layer Of Neural Network
Tree;
    Split Nodes Of The Neural Network Tree And If Needed Augment Prototype;
    If Any Of The <tbound[ ]> Is True Then:
        Return Index Of First True True Boolean Boundary;
    Else:   Return NULL_SYM;
}
```

FIG. 25

```
void FindSyms(SEGM *seg, BINFO *buf, BINFO *oldBuf, PINFO *str)
{
tick.Bind = BindNewStroke(seg, str, buf);
if(tick.Bind < 1)
        {
        if(tick.Bind == 0)
                {
                olOlBuf    = *oldBuf;
                *oldBuf    = *buf;
                olOlTick   = oldTick;
                olOlTick.Pnts = oldTimeB[oldTick.Buff-1].Sym[0].Prt.Pto;
                oldTick    = tick;
                oldTick.Pnts = timeBuff[tick.Buff-1].Sym[0].Prt.Pto;
                for(count = 0; count < olOlTick.Pnts; count++)
                        olOlAr[count] = oldArr[count];
                for(count = 0; count < oldTick.Pnts; count++)
                        oldArr[count] = pntArr[count];
                tick.Pnts = strArr.y - strArr.x + 1;
                for(count = 0; count < tick.Pnts; count++)
                        pntArr[count] = pntArr[count+strArr.x];
                for(count = 0; count < LISTNUM; count++)
                        {
                        if((*str).Prt[count].Pto == 0)
                                break;
                        (*str),Prt[count].Pti -= strArr.x;
                        (*str).Ptr[count].Pto -= strArr.x;
                        }
                for(count = 0; count < BUFFNUM; count++)
                        olOlTimeB[count] = oldTimeB[count];
                for(count = 0; count < BUFFNUM; count++)
                        oldTimeB[count] = timeBuff[count];
                }
```

FIG. 26A

```
        tick.Buff = 0;
        tick.Ansr = 0;
        InitBuff(buf,0);
        oldTick.Buff = 0;
        oldTick.Ansr = 0;
        oldTick.Pnts = 0;
        InitBuff(oldBuf,0);
        olOlTick.Buff = 0;
        olOlTick.Ansr = 0;
        olOlTick.Pnts = 0;
        InitBuff(&olOlBuf,0);
        }
    PutList(seg, str, buf);
    ScanBuff(buf);
    }
```

FIG. 26B

```
typedef struct buff{
        SYMPROT Sym[LISTNUM];
        }BUFF;
```

FIG. 27A

```
typedef struct symprot{       // matched prototype info
        UCHAR Sym;            // meaning of the prototype
        COORD Siz;    // size of the prototype
        COORD Pos;    // its position
        PROT Prt;             // information about prototype
        COORD Bpt[BINDNUM];   // its canonical binding points
        }SYMPROT;
```

FIG. 27B

```
typedef struct oneBuff{
        SYMPROT Sym;
        UCHAR   Olp;
        }ONEBUFF;
```

FIG. 27C

```
void PutList(SEGM *seg,PINFO *str,BINFO *buf)
{
while(tick.Buff > BUFFNUM - 1) TakeList(buf, 0);
for(count = 0; count < LISTNUM; count++)
  {
  if((( (*str).Sym[count] == '/')||((*str).Sym[count] == '\'))
    {
    if((*str).Siz[count].x > (*str).Siz[count].y )
      {
      (*str).Prt[count].Prt = 1;
      }
    else
      {
      (*str).Prt[count].Prt = 0;
      }
    }
  timeBuff[tick.Buff].Sym[count].Sym  = (*str).Sym[count];
  timeBuff[tick.Buff].Sym[count].Prt  = (*str).Prt[count];
  timeBuff[tick.Buff].Sym[count].Siz.x = (*str).Siz[count].x/TBLT_SCRN;
  timeBuff[tick.Buff].Sym[count].Siz.y = (*str).Siz[count].y/TBLT_SCRN;
  timeBuff[tick.Buff].Sym[count].Pos.x = (*str).Pos[count].x/TBLT_SCRN;
  timeBuff[tick.Buff].Sym[count].Pos.y = (*str).Pos[count].y/TBLT_SCRN;
  }
}
```

FIG. 28A-1

```
if(tick.Bind != 0)
{
    timeBuff[tick.Buff].Sym[0].Prt.Pti   = strArr.x;
    timeBuff[tick.Buff].Sym[0].Prt.Pto   = str Arr.y;
}
else
{
    timeBuff[tick.Buff].Sym[0].Prt.Pti   = 0;
    timeBuff[tick.Buff].Sym[0].Prt.Pto   = strArr.y - strArr.x;
} if(tick.Edit)
{
    if((((*str).Prt[1].Prt == 0)&&((((*str).Sym[1] == '1')||(((*str).Sym[1] == '/')||(((*str).Sym[1]
 == '\')))
    {
        timeBuff[tick.Buff].Sym[0].Sym = HAPY_SYM;
        timeBuff[tick.Buff].Sym[1].Sym = HAPY_SYM;
```

FIG. 28A-2

```
        for(count = 2; count <LISTNUM; count++)
                {
                        timeBuff[tick.Buff].Sym[count].Sym   = NULL_SYM;
                }
        }
        if(((*str).Sym[1]   == 'L'||((*str).Sym[1]   == 'A'))
                {
                timeBuff[tick.Buff].Sym[0].Sym = HAPY_SYM;
                timeBuff[tick.Buff].Sym[1].Sym = HAPY_SYM;
                for(count = 2; count <LISTNUM; count++)
                        timeBuff[tick.Buff].Sym[count].Sym   = NULL_SYM;
                }
        }
timeOrdr[tick.Buff] = tick.Buff;
FindBPts(seg, str);
tick.Buff++;
}
```

```
void FindBPts(SEGM *seg, PINFO *str)
{
    len = (*str).Prt[0].Bit;
    for(count = 1; count < LISTNUM; count++)
    {
        off = (*str).Prt[count].Off;
        bit = (*str).Prt[count].Bit;
        prt = (*str).Prt[count].Prt;
        rol = (*str).Prt[count].Rol;
        for(pcount = 0; pcount < BINDNUM; pcount++)
        {
            timeBuff[tickBuff].Sym[count].Bpt[pcount].x = -300+50*pcount;
            timeBuff[tickBuff].Sym[count].Bpt[pcount].y = -500;
        }
        if(prt < 14)
        {
            if(rol == 0)
            {
                begpos = off;
                endpos = off+bit;
                midpos = begpos+1;
                timeBuff[tick.Buff].Sym[count].Bpt[0] = (*seg).Seg[begpos].End;
                timeBuff[tick.Buff].Sym[count].Bpt[1] = (*seg).Seg[endpos].End;
            }
            else
            if(rol == 1)
            {
                begpos = abs(len - off - bit);
                endpos = abs(lens - off);
                midpos = begpos+1;
                timeBuff[tick.Buff].Sym[count].Bpt[0] = (*seg).Seg[endpos].End;
                timeBuff[tick.Buff].Sym[count].Bpt[1] = (*seg).Seg[begpos].End;
            }
```

```
else
    {
    begpos = 0;
    endpos = 0;;
    midpos = 0;
    timeBuff[tick.Buff].Sym[count].Bpt[0].x = 0;
    timeBuff[tick.Buff].Sym[count].Bpt[0].y = 0;
    timeBuff[tick.Buff].Sym[count].Bpt[1].x = 0;
    timeBuff[tick.Buff].Sym[count].Bpt[1].y = 0;
    }
if(prt < 2)    timeBuff[tick.Buff].Sym[count].Bpt[2] = (*str).Pos[count];
else
if((prt < 6)&&(prt >= 2))
               timeBuff[tick.Buff].Sym[count].Bpt[2] = (*seg).Seg[midpos].End;
else
if(prt == 6)   timeBuff[tick.Buff].Sym[count].Bpt[2] = (*seg).Seg[midpos].Ext.min[1];
else
if(prt == 7)   timeBuff[tick.Buff].Sym[count].Bpt[2] = (*seg).Seg[midpos].Ext.max[1];
else
if(prt == 8)   if( time.Buff[tick.Buff].Sym[count].Sym == '[')
                   {
                   timeBuff[tick.Buff].Sym[count].Bpt[2].x =
                         ((*seg).Seg[begpos+1].End.x +
                          (*seg).Seg[begpos+2].End.x)/2;
                   timeBuff[tick.Buff].Sym[count].Bpt[2].y =
                         ((*seg).Seg[begpos+1].End.y +
                          (*seg).Seg[begpos+2].End.y)/2;
                   }
               else
                   timeBuff[tick.Buff].Sym[count].Bpt[2] = (*seg).Seg[midpos].Ext.min[0];
               else
```

FIG. 29B

```
if(prt == 9)
                    timeBuff[tick.Buff].Sym[count].Bpt[2] = (*seg).Seg[midpos].Ext.max[0];
        else
                    timeBuff[tick.Buff].Sym[count].Bpt[2] = (*str).Pos[count];
    if(((*str).Sym[count] == '/')||((*str).Sym[count] =='\'))
    {
            timeBuff[tick.Buff].Sym[count].Bpt[2] = (*str).Pos[count];
            if((*str).Siz[count].x < (*str).Siz[count].y)
            {
                    if((*seg).Seg[begpos].End.y < (*seg).Seg[endpos].End.y)
                    {
                            timeBuff[tick.Buff].Sym[count].Bpt[0] =
(*seg).Seg[begpos].End;
                            timeBuff[tick.Buff].Sym[count].Bpt[1] =
(*seg).Seg[endpos].End;
                    }
                    else
                    {
                            timeBuff[tick.Buff].Sym[count].Bpt[1] =
(*seg.Seg[begpos].End;
                            timeBuff[tick.Buff].Sym[count].Bpt[0] =
(*seg).Seg[endpos].End;
                    }
            }
            else
            if((*str).Siz[count].x >= (*str).Siz[count].y)
            {
                    if((*seg).Seg[begpos].End.x < (*seg).Seg[endpos].End.x)
                    {
                            timeBuff[tick.Buff].Sym[count].Bpt[0] =
(*seg).Seg[begpos].End;
                            timeBuff[tick.Buff].Sym[count].Bpt[1] =
(*seg).Seg[endpos].End;
                    }
                    else
                    {
                            timeBuff[tick.Buff].Sym[count].Bpt[1] =
(*seg).Seg[begpos].End;
                            timeBuff[tick.Buff].Sym[count].Bpt[0] =
(*seg).Seg[endpos].End;
                    }
```

FIG. 29C

```
            timeBuff[tick.Buff].Sym[count].Bpt[3] = timeBuff[tick.Buff].Sym[count].Bpt[2];
        }
    }
    else
    if(prt == 20)
    {
        if(rol == 0)
            begpos = off;
        else
        if(rol == 1)
            begpos = abs(len - off - bit);
        timeBuff[tick.Buff].Sym[count].Bpt[0] = (*seg).Seg[begpos  ].End;
        timeBuff[tick.Buff].Sym[count].Bpt[1] = (*seg).Seg[begpos+1].End;
        timeBuff[tick.Buff].Sym[count].Bpt[2] = (*seg).Seg[begpos+2].Ext.max[0];
        timeBuff[tick.Buff].Sym[count].Bpt[3] = (*seg).Seg[begpos+4].End;
    }
    else {
        timeBuff[tick.Buff].Sym[count].Bpt[0].x = (*str).Pos[count].x -
(*str).Siz[count].x/2;
        timeBuff[tick.Buff].Sym[count].Bpt[0].y = (*str).Pos[count].y -
(*str).Siz[count].y/2;
        timeBuff[tick.Buff].Sym[count].Bpt[1].x = (*str).Pos[count].x +
```

FIG. 29D-1

```
            (*str).Siz[count].x/2;
         timeBuff[tick.Buff].Sym[count].Bpt[1].y = (*str).Pos[count].y -
            (*str).Siz[count].y/2;
         timeBuff[tick.Buff].Sym[count].Bpt[2].x = (*str).Pos[count].x +
            (*str).Siz[count].x/2;
         timeBuff[tick.Buff].Sym[count].Bpt[2].y = (*str).Pos[count].y +
            (*str).Siz[count].y/2;
         timeBuff[tick.Buff].Sym[count].Bpt[3].x = (*str).Pos[count].x -
            (*str).Siz[count].x/2;
         timeBuff[tick.Buff].Sym[count].Bpt[3].y = (*str).Pos[count].y +
            (*str).Siz[count].y/2;
      }
      for(pcount = 0; pcount < BINDNUM; pcount++)
      {
         timeBuff[tick.Buff].Sym[count].Bpt[pcount].x / = TBLT_SCRN;
         timeBuff[tick.Buff].Sym[count].Bpt[pcount].y / = TBLT_SCRN;
      }
   }
```

FIG. 29D-2

```
void ScanBuff(BINFO *buf)
{
        PutAnsr(buf,tick.Buff-1 -count);
        if(tick.Buff <2)  return;
        if((tick.Buff == 2)&&ModeFlag(buf))  return;
        PosnOrder(buf);
        InitRem(buf, &begScan,&endScan);
        scanCnt  = begScan;
        foundFeet = 0;
        InitWind(0);
        LoadWind( );
        InitClust(&clust);
        while(scanCnt < endScan)
                {
                foundFeet = 0;
                InitClust(&clust);
                foundFeet = InterList(&clust,&shift);
                CleanBuff(buf,&clust,foundFeet);
                PutClust(buf,&clust,foundFeet);
                scanCnt += foundFeet;
                InitWind(shift);
                if(shift == 0)
                        LoadWind( );
                InitClust(&clust);
                }
        BufOrder(buf);
        OverlapAnsr(buf);
        tick.Eras = FALSE;
        tick.Edit = FALSE;
        tick.Over = FALSE;
        }
```

FIG. 30

```
typedef struct inf{
    UCHAR Sym;           // meaning of the segmented part of the cluster
    COORD Siz;           // x-y sizes of the cluster
    COORD Pos;           // position of the cluster
    short Len;           // length of the cluster which equals the total length of the constituent strokes
    short Prt;           // identifies from what multiple stroke prototype the cluster came from
    UCHAR Frm[STRKNUM];  // what strokes in the window buffer this cluster was made from
}INF;
```

FIG. 31

```
short  InterList(INF *clust, short *shift)
{
    totFit = 0;
    winFit = 0;
    winDist = 0;
    *shift = 0;
    winShift = 0;
    winFeet = 1;
    typeFit = 0;
    (*clust).Frm[0] = 0;
    temClust = *clust;
    for (count = 0; count <tick.Wind; count++)
        totFit += windBuff[count].Sym[1].Prt.Fit;
    skip = FALSE;
    for (count = 0; count < tick.Wind;count++)
    {
        if(windBuff[count].Sym[1].Sym == '-')
        {
            maxSize  = windBuff[count].Sym[0].Prt.Fit;
            nextSize  = windBuff[count].Sym[0].Siz.x;
            nextCount = windBuff[count].Sym[0].Siz.y;
            if((maxSize/TBLT_SCRN > 2*nextSize) && (nextSize> 4*nextCount))
            {
                skip = TRUE;
            }
        }
        if(skip) break;
    }
    maxSize = 0;
    maxCount = 0;
    for (count = 0; count < tick.Wind; count++)
        oneSize = max(windBuff[count].Sym[0].Siz.x, windBuff[count].Sym[0].Siz.y);
```

FIG. 32A

```
if(maxSize < oneSize)
{
    maxSize = oneSize;
    maxCount = count;
} nextCount = -1;
nextSize = -1;
for(count = 0;count < tick.Wind; count++)
{
    if(count == maxCount)continue;
    oneSize = max(windBuff[count].Sym[0].Siz.x, windBuff[count].Sym[0].Siz.y);
    if(nextSize < oneSize)
    {
        nextSize = oneSize;
        nextCount = count;
    }
}
if((windBuff[maxCount].Sym[1].Sym == '.') && (nextSize >0) && (nextCount >0) &&
   (maxSize > 2*nextSize)
   &&(windBuff[nextCount].Sym[1].Prt.Prt > 6))
{
    skip = TRUE;
}
if((windBuff[maxCount].Sym[1].Sym == '.')
   &&(maxSize  > 4*nextSize)
   &&(nextSize > 0)
   &&(nextCount > 0)
   &&(windBuff[nextCount].Sym[1].Prt.Prt <= 6))
{
    skip = TRUE;
}
if(skip)
{
```

FIG. 32B

```
        tick.Eras = 1;
                return(winFeet);
                }
        for(count = 0; count < STRKNUM; count++)
                protCode[count] = 0;
        setCount = 1;
        for(count = 0; count < tick.Wind; count++)
                setCount *= DEPTH;
        for(icount = 1; icount < setCount; icount++)
                {
                feet    = 0;
                skip    = FALSE;
                symFit  = 0;
                for(count = 0; count < tick.Wind; count++)
                        {
                        protCode[count] = (icount<<(BINSIZE*(7 - count)))>>14;
                        if(windBuff[count].Sym[protCode[count]].Sym == NULL_SYM)
                                {
                                feet = 0;
                                skip = TRUE;
                                break;
                                }
                        if(windBuff[count].Sym[0].Sym == NULL_SYM)
                                {
                                feet = 0;
                                skip = TRUE;
                                break;
                                }
                        }
                if(skip) continue;
                skip = FALSE;
                for(count = 0; count < tick.Wind-2; count++)
                        {
```

FIG. 32C

```
if((windBuff[count].Sym[protCode[count]].Sym != HAPY_SYM)
    &&(windBuff[count+1].Sym[protCode[count+1]].Sym == HAPY_SYM)
    &&(windBuff[count+2].Sym[protCode[count+2]].Sym != HAPY_SYM))
        {
        skip = TRUE;
        break;
        }
    }
if((tick.Wind == STRKNUM) && (windBuff[0].Sym[protCode[0]].Sym !=HAPY_SYM)
    &&(windBuff[1].Sym[protCode[1]].Sym == HAPY_SYM) &&
    (windBuff[1].Sym[protCode[2]].Sym ==
    HAPY_SYM) && (windBuff[2].Sym[protCode[3]].Sym != HAPY_SYM))
        {
        skip = TRUE;
        }
if(skip) continue;
if(windBuff[0].Sym[protCode[0]].Sym == HAPY_SYM)
    continue;
(*shift) = 0;
for(count = 0; count < tick.Wind; count++)
    {
    if(windBuff[count].Sym[protCode[count]].Sym != HAPY_SYM) break;
    (*shift)++;
    }
```

FIG. 32D-1

```
skip = FALSE;
for(count = 0; count < tick.Wind; count ++)
{
    if((winfBuff[count].Sym[1].Prt.Prt > 13) && (protCode[count] > 1)
        && (windBuff[count].Sym[1].Sym !=
        windBuff[count].Sym[protCode[count]].Sym)
        && (3*(windBuff[count].Sym[1].Prt.Fit -
        windBuff[count].Sym[protCode[count].Prt.Fit)/TBLT_SCRN >
        2*max(windBuff[count].Sym[1].Siz.x, windBuff[count].Sym[1].Siz.y)))
    {
        skip = TRUE;
        break;
```

FIG. 32D-2

```
if((protCode[count] > 1) && (windBuff[count].Sym[1].Sym !=
windBuff[count].Sym[protCode[count]].Sym)
      && (windBuff[count].Sym[1].Prt.Fit >
2*windBuff[count].Sym[protCode[count]].Prt.Fit))
      {
      skip = TRUE;
      break;
      }
if((windBuff[count].Sym[1].Prt.Prt > 13)
      && (windBuff[count].Sym[1].Sym !=
windBuff[count].Sym[protCode[count]].Sym)
      && (protCode[count] > 1) && (2*windBuff[count].Sym[1].Prt.Fit >
3*windBuff[count].Sym[protCode[count]].Prt.Fit))
      {
      skip = TRUE;
      break;
      }
if(windBuff[count].Sym[protCode[count]].Sym != HAPY_SYM)
      {
      (*clust).Frm[feet].Sym = count;
      typeBuff[feet].Sym = windBuff[count].Sym[protCode[count]];
      typeBuff[feet].Olp = windBuff[count].Sym[1].Prt.Prt;
      symFit += windBuff[count].Sym[1].Prt.Fit;
      feet++;
      }
else
      {
      (*clust).Frm[count] = NULL_SYM;
      }
if(skip) continue;
for (count = 0; count < feet; count++)
      {
      code    = typeBuff[count].Sym.Prt.Prt;
      code    = ProtFilter(code, count);
```

```
typeBuff[count].Sym.Prt.Prt = code;
            }
            TypeOrder(feet);
            typeCode = 0;
            factor   = 1;
            for (count = 0; count < feet; count++){
                code     = typeBuff[count].Sym.Prt.Prt;
                typeCode += ((long)code + 1)*factor;
                factor   *= 100;
            }
            typeFit = InterBuff(clust, feet, &pminDist);
            if(typeFit == 0) continue;
            if(typeFit > winFit)
            {
                winFit = typeFit;
                winFeet = feet;
                winShift = *shift;
                temClust = *clust;
            }
            else
            if((typeFit == winFit)&&(pminDist < winDist)&&!show.bat&&!show.BAT)
            {
                winDist = pminDist;
                winFeet = feet;
                winShift = *shift;
                temClust = *clust;
                lBuffDiag(clust,typeCode);
            }
        }
        *clust = temClust;
        *shift = winShift;
        return(winFeet);
    }
```

FIG. 33

```
short    InterBuff(INF *clust,short feet, USHORT *pminDist)
{
    SizeAndPos(&size,&posn,feet);
    for(count = 0; count < COMPNUM; count++)
    {
        if(typeCode != symsTbl[count].typeCode)  continue;
        else
        {
            for(pcount = 0; pcount < BRCHNUM; pcount++)
                tbound[pcount] = FALSE;
            close = DistArr(feet,&maxSize);
            if(!close) return(0);
            scount = (*pStkBound[count])(pminDist);
            close = *pminDist < maxSize/2;
            if(!close) return(0);
            if((scount != NULL_SYM) && (symsTbl[count].syms[scount] != (scount == -1)))
            {
                typeFit = 0;
                for(pcount = 0; pcount < feet; pcount++)
                    typeFit += typeBuff[pcount].Sym.Prt.Fit;
                MakeClust(clust,&posn,&size,scount,typeFit,count);
                return(typeFit);
            }
        }
    }
    return (0);
}
```

FIG. 34

```
short StkBoundXX(USHORT *pminDist){
*pminDist = IsClose(4, 0, 6, 10, 2, -1, -1);
tbound[4] = tbound[2] && (typeBuff[0].Sym.Bpt[1].x < typeBuff[1].Sym.Bpt[1].x);
tbound[2] = tbound[2] && (typeBuff[0].Sym.Bpt[1].x >=typeBuff[1].Sym.Bpt[1].x);
if(tbound[2] && (4*(typeBuff[0].Sym.Bpt[1].y - typeBuff[0].Sym.Bpt[2].y) <
typeBuff[1].Sym.Siz.y))
    {
    tbound[2] = FALSE;
    tbound[1] = TRUE;
    }
if(tbound[1]&&(typeBuff[0].Sym.Bpt[1].x < typeBuff[0].Sym.Bpt[2].x) &&
(typeBuff[1].Sym.Sym != '\'))
    {
    tbound[1] = FALSE;
    tbound[2] = TRUE;
    }
of((tbound[2]||tbound[3]) && (typeBuff[0].Sym.Siz.y > 2*typeBuff[1].Sym.Siz.y)
&&(typeBuff[0].Sym.Pos.y > typeBuff[1].Sym.Pos.y))
    {
    tbound[2] = FALSE;
    tbound[3] = FALSE;
    tbound[1] = TRUE;
    }
etc., etc.,
for(scount = 0; scount < BRCHNUM; scount++)
    if(tbound[scount]) return(scount);
    return(NULL_SYM);
}
```

FIG. 35A

```
void OverlapAnsr(BINFO *buf)
{
for(count = 0; count < tick.Ansr; count++)
    underCount[count] = NULL_SYM;
flag = FALSE;
for(count = 0; count < tick.ansr; count++)
{
    for(cnt = 0; cnt < STRKNUM; cnt++)
    {
        if(oldTimeOrdr[tick.Buff-1] == (*buf).Frm[count][cnt])
        {
            flag = TRUE;
            overCount = count;
            break;
        }
    }
    if(flag == TRUE) break;
}
overX     = (*buf).Pos[overCount].x;
overY     = (*buf).Pos[overCount].y;
overSizX = (*buf).Siz[overCount].x;
overSizY = (*buf).Siz[overCount].y;
underNum = 0;
for(count = 0; count < tick.Ansr; count++)
{
    if(count == overCount) continue;
    underX = (*buf).Pos[count].x;
    underY = (*buf).Pos[count].y;
    sizX = (*buf).Siz[count].x;
    sizY = (*buf).Siz[count].y;
    if((overX > underX - sizX/2) && (overX < underX + sizX/2) && (overY > underY - 2*sizY)
        && (overY < underY + sizY))
    {
        underCount[underNum] = count;
```

```
        underNum++;
        }
    else
    if((underX > overX - overSizX/2) && (underX < overX + overSizX/2) && (underY > overY - 2*overSizY)
        && (underY < overY + overSizY))
        {
        underCount[underNum] = count;
        underNum++;
        }
    else
    if(((*buf).Sym[overCount] =='-') && (overX > underX - sizX/2) && (overX < underX + sizX/2))
        {
        underCount[underNum] = count;
        underNum++;
        }
    else
    if(((*buf).Sym[overCount] == '-') && (underX > overX - overSizX/2) && (underX < overX + overSizX/2))
        {
        underCount[underNum] = count;
        underNum++;
        }
    }
```

FIG. 35B-1

```
if(underNum == 0)
{
    return;
}
if(tick.Edit &&( (*buf).Sym[overCount] == HAPY_SYM) && ((*buf).Prt[overCount] == 3))
{
    tick.Isrt = TRUE;
    ErasePoints(0, tick.Pnts);
    shift.x = (*buf).Siz[overCount].x*TBLT_SCRN;
    shift.y = (*buf).Pos[overCount].x*TBLT_SCRN - (*buf).Siz[overCount].x*TBLT_SCRN/2;
    for(count = 0; count < tick.Pnts; count++)
```

FIG. 35B-2

```
            if(pntArr[count].x > shift.y)
                pntArr[count].x += shift.x;
        }
        ErasePrint(buf,tick.Buff);
        shift.x = (*buf).Siz[overCount].x;
        outPnt = (*buf).Pos[overCount].x - (*buf).Siz[overCount].x/2;
        for(count = 0; count < tick.Ansr; count++)
        {
            inPnt = (*buf).Pos[count].x - (*buf).Siz[count].x/2;
            if(inPnt > outPnt)
            {
                (*buf).Pos[count].x += shift.x;
                for(cnt = 0 ; cnt < STRKNUM; cnt++)
                {
                    rmCount = (*buf).Frm[count][cnt];
                    if(rmCount == NULL_SYM) continue;
                    rCount = timeBuff[rmCount].Sym[1].Sym;
                    if(rCount == NULL_SYM) continue;
                    for(ct = 0; ct < LISTNUM; ct++)
                    {
                        timeBuff[rmCount].Sym[ct].Pos.x += (*buf).Siz[overCount].x;
                        for(tc = 0; tc < BINDNUM; tc++)
                            timeBuff[rmCount].Sym[ct].Bpt[tc].x +=
                                (*buf).Siz[overCount].x;
                    }
                }
            }
        }
        RecDrawBox(buf);
        PrintCom(buf)
        remCount = (*buf).Frm[overCount][0];
        TakeList(buf, remCount);
        shift.x =    0;
```

FIG. 35C

```
        shift.y =    0;
        DrawPoints(shift, 0,tick.Pnts);
        return;
    }
    if(tick.Edit) return;
    count = oldTimeOrdr[tick.Buff-1];
    if((timeBuff[count].Sym[1].Prt.Prt > 13) &&(timeBuff[count].Sym[1].Prt.Prt < 90))
        tick.Over = 1;
    if(!(tick.Over||tick.Eras)) return;
    for(cnt = 0; cnt < underNum; cnt++){
        for(count = 0; count < STRKNUM; count++){
            if((*buf).Frm[underCount[cnt]][count] == NULL_SYM)
                break;
            strkCount = (*buf).Frm[underCount[cnt]][count];
            inPnt = timeBuff[strkCount].Sym[0].Prt.Pti;
            outPnt = timeBuff[strkCount].Sym[0].Prt.Pto;
            ErasePoints(inPnt, outPnt);
        }
    }
    shift.x = 0;
    shift.y = 0;
    for(count = 0; count < STRKNUM; count++)
    {
        if((*buf).Frm.[overCount][count] == NULL_SYM)
            continue;
        strkCount = (*buf).Frm[overCount][count];
        inPnt = timeBuff[strkCount].Sym[0].Prt.Pti;
        outPnt = timeBuff[strkCount].Sym[0].Prt.Pto;
        if(tick.Eras)
            ErasePoints(inPnt, outPnt);
        else
        DrawPoints(shift,inPnt, outPnt);
    }
```

FIG. 35D

```
while(underNum > 0)
    {
    remCount = (*buf).Frm[underCount[0]][0];
    if( remCount != NULL_SYM)
            {
            if(underCount[0] < overCount)
                    overCount -= 1;
            TakeList(buf, remCount);
            underNum--;
            for(ct = 0; ct < underNum; ct++)
            underCount[ct] = underCount[ct+1]-1;
            }
        else
            {
            printf("ERROR taking list and cluster\n");
            break;
            }
    }
}
```

FIG. 35E

REAL TIME HANDWRITING RECOGNITION SYSTEM

RELATED PATENT APPLICATIONS

The present patent application is related to U.S. patent application Ser. No. 08/484,630, filed on even date with the present application by Kadashevick et al. for character Recognition System Recognition and Scanned and Real Time Handwritten Characters.

FIELD OF THE INVENTION

The invention relates to a real time handwriting recognition system.

BACKGROUND OF THE INVENTION

The advent of affordable touch sensitive tablets and pens as computer input devices and the availability of more powerful microprocessors and lower cost memory has resulted in increased use of computer systems wherein the primary user input interface is hand formed characters or symbols through a touch tablet, often referred to as "tablet computers" and "clipboard computers".

Although such handwritten character input systems offer a more convenient and intuitive user interface for many purposes, the methods and apparatus for handwritten character recognition have imposed many constraints which have prevented such systems from realizing their full potential. For example, and although much information for identifying handwritten characters is contained in the individual strokes comprising the characters, many system of the prior art are not effective at extracting and using stroke information, either as part of a dynamic and therefore faster process for recognizing characters or in recognizing the constituent parts of the characters. For example, many handwritten character recognition system of the prior art have difficulty in determining whether a curved or angled stroke in a character is a single stroke or two or more strokes.

As a consequence, many such systems of the prior art typically can perform character recognition only upon completed characters, thereby either slowing the performance of the systems or requiring that the systems be implemented only with the very fastest and most powerful microprocessors in order to keep up with the user input.

Another severe problem of the prior art is that most systems of the prior art identify an input character by comparing the completed input character to possible matching character configurations stored in the system, usually either in a database or generated as required. The very large range of variations in character position, orientation, size, and stroke configuration and proportion that can occur with handwritten characters thereby again either severely limits the system performance or requires the use of very powerful microprocessors with large memories and high capacity disk drives to store or generate and process the libraries of possible character configurations.

Yet another problem of the prior art systems for handwritten character recognition is that, because of the complex processing required for recognition of handwritten characters, many such systems impose restrictions upon the user interface in order to reduce the processing requirements.

For example, many such systems require that the characters be written only into predefined spaces, often referred to as "combs", and in a certain order, and some systems of the prior art even require that the characters be limited to certain stroke configurations, such as block capital letters. Such systems, for example, do not permit a user to go back to an earlier part of a line of characters to enter a new character or symbol or to rewrite, modify or edit an already entered character or string of characters.

A related problem is the entry of system or application commands, such as "save file" or "open file" or "spelling check", and the entry of editing commands, such as "insert", "delete", or "insert space". Because of the complexity of processing required to distinguish such commands from handwritten text, however, many systems of the prior art require that application and system commands and editing commands be entered into specially designated areas of the tablet, and even that the system or application commands and the editing commands be entered in separate areas.

As such, the systems of the prior art do not allow the full realization of a handwritten input system. Such systems do not, for example, permit a user to enter characters in a natural, free form style, or to enter a system or application command through a gesture or symbol or combination of symbols entered at any convenient place on the tablet, or to directly edit text by symbols or marks written directly into the text, such as deleting a character by "scratching out" the character.

The method and apparatus of the handwritten character recognition system of the present invention provides a solution to these and other problems of the prior art.

SUMMARY OF THE INVENTION

The present invention is directed to a method and apparatus for handwritten character recognition in a data processing system including a tablet and pen for user entry of handwritten characters and a processing unit connected from the tablet and pen for operating upon the user input under control of the character recognition system. The character recognition system includes a pen input detector for detecting and indicating user inputs through the tablet and pen, wherein the user inputs including pen strokes and pen states, an input cluster buffer connected from the pen input detector for storing stroke descriptor information of a current stroke as the current stroke is entered by the user, and a point buffer connected from the input cluster buffer for storing the stroke descriptor information of the current stroke. A point detector is connected from the input cluster buffer and responsive to the pen states for transferring the stroke descriptor information of the current stroke into the point buffer. The system further includes a stroke feature recognizer connected from the point buffer and responsive to the pen states for extracting stroke recognition features from the stroke descriptor information of the current stroke and assigning a meaning to the current stroke and a cluster recognizer connected from the stroke feature recognizer and responsive to the meaning assigned to each stroke for recognizing and assigning a character meaning to a current cluster of strokes.

In the preferred embodiment, the stroke feature recognizer includes a dynamic stroke feature extractor connected from the point buffer and responsive to the pen states, such as the pen down state, for extracting stroke recognition features from the stroke descriptor information of the current stroke as the current stroke is entered by the user. A static stroke feature extractor is connected from the point buffer and responsive to the pen states, such as the pen up state, for extracting stroke recognition features from the stroke descriptor information of the current stroke when the current stroke is completed.

The input stroke descriptor information includes, for each stroke, a sequence of coordinate points along the line of the stroke, including at least the first and last points of the line of the stroke, and a direction string indicating, for each point of the string, the direction of movement of the line of the stroke at the point.

In further aspects of the present invention, the stroke feature recognizer includes a segment analyzer for identifying segments of a stroke wherein a segment of a stroke includes at least a beginning point of the segment and an end point of the segment and wherein a segment does not contain a change in direction of movement of the line of the stroke. The segment analyzer includes a direction analyzer for identifying changes in the direction of movement of the line of a stroke wherein a change in direction of movement of the line of a stroke occurs when an angle between two lines connecting three consecutive points along the stroke exceeds a predetermined boundary defined by a cone defined by lines extending from any one of the three points. The cone lines extend from that point in the direction of movement of the pen at that point and the angle between the cone lines is defined by predetermined displacements along the coordinate axis orthogonal to the coordinate axis along the direction of movement of the pen at that point.

The segment analyzer may further include a segment constructor responsive to the direction analyzer for inserting an additional point at a change in direction of the line of a stroke, the additional point being located at the end point of the segment before the change in direction of the line of the stroke and operating as the beginning point of the segment following the change in direction of the line of the stroke.

In the preferred embodiment, the stroke recognizer includes a stroke recognition feature data structure for storing the stroke recognition features extracted from the current stroke, wherein the stroke recognition features describe the current stroke with variable degrees of hierarchical approximation, beginning with a direction string indicating, for points along the line of the stroke, the direction of movement of the line of the stroke at each point. The stroke recognition features may further include the coordinates of at least the beginning and end points of the line of the stroke and an array of coordinates of all points along the line of the stroke as received as input coordinates from the tablet.

In a further aspect of the present invention, the character recognizer stores a single copy of each of a plurality of idealized representations of strokes and generates multiple versions of a current input stroke for comparison to the idealized representations to identify the current input stroke. For this purpose, the stroke feature recognizer includes a multiple scale stroke representation generator for reading the stroke recognition features from the stroke recognition feature data structure, generating a plurality of scaled topological representations of the current stroke, each scaled topological representation being a progressively smoothed representation of the current stroke generated from the stroke representation features. The multiple scale stroke representation generator then selects a scaled topological representation of the current stroke wherein the scaled topological representation of the current stroke is selected to provide the maximum signal to noise ratio of the stroke representation.

The character recognizer further includes a stroke proportion discriminator that stores a list of ideal prototype representations corresponding to possible meanings of the current stroke from a plurality of ideal prototype representations of strokes. A stroke boundary discriminator is responsive to the scaled topological representation of the current stroke and to the ideal prototype representations of the list of ideal prototype representations for comparing the scaled topological representation of the current stroke and boundaries of the ideal prototype representations of the list of ideal prototype representations wherein the boundaries of the ideal prototype representations are determined by linear combinations of features of the ideal prototype representations. The stroke boundary discriminator then assigns to the current stroke an identification of an ideal prototype representation having boundaries including the scaled topological representation of the current stroke, the assigned identification of the matching ideal prototype representation representing a stroke meaning assigned to the current stroke.

In the presently preferred embodiment, the stroke proportion discriminator further generates, for each ideal prototype representation, a corresponding reversed ideal prototype representation having a reversed direction string for use in the comparison of features of the topological representations of the current stroke and of the ideal prototype representations.

The cluster recognizer includes a stroke buffer, including a current stroke buffer for storing the strokes of a current cluster of strokes in the time order of their entry and a previous stroke buffer for storing the strokes of a cluster of strokes immediately preceding the current cluster of strokes, a window buffer for storing a contiguous group of strokes in spatial order according to the coordinates of the strokes of the group.

The cluster recognizer also includes a stroke buffer controller responsive to the stroke feature recognizer for constructing an influence list containing an identification of an area of influence of each stroke of the current cluster of strokes, receiving a current stroke, and determining an area of influence of the current stroke. When the area of influence of the current stroke indicates that the current stroke is a part of the current cluster of strokes, the stroke buffer controller writes the current stroke into the current stroke buffer, and, when the area of influence of the current stroke indicates that the current stroke is not a part of the current cluster of strokes, the stroke buffer controller transfers the strokes of the current cluster of strokes into the previous stroke buffer and writes the current stroke into the current stroke buffer to begin a new current cluster of strokes.

The cluster recognizer includes a stroke buffer scanner for scanning the influence list and writing the strokes of the current stoke buffer into the window buffer in spatial order and a position discriminator for storing a cluster data structure containing a plurality of cluster meanings, wherein each cluster meaning represents a cluster of strokes and a corresponding meaning assigned to the cluster of strokes.

The position discriminator reads combinations of strokes from the window buffer, compares the combinations of strokes from the window buffer with the cluster meanings stored in the cluster data structure, and determines when a combination a strokes from the window buffer corresponds to a cluster meaning. The position discriminator then provides as an output an identification of the cluster meaning corresponding to the combination of strokes from the window buffer, removes the combination of strokes from the window buffer, and transfers the combination of strokes from the current cluster buffer to the previous stroke buffer.

The stroke buffer controller is also responsive to a current stroke having spatial coordinates located between strokes which are previous in time for reordering the strokes in the current and previous stroke buffers and the stroke buffer scanner is responsive to the reordering of the current and previous stroke buffers for rewriting the strokes of the current stoke buffer into the window buffer in a corresponding new spatial order. The position discriminator is then responsive to the rewriting of the window buffer for determining a new cluster meaning from the new combinations of strokes in the window buffer, thereby allowing a user to write new strokes into any location along a previously entered series of strokes, or characters.

The new stroke may be an editing gesture and the handwritten character recognition system further includes an editor responsive to the editing gesture for directing the stroke buffer controller to modify the strokes stored in the stroke buffer as indicated by the editing gesture. Further, in certain instances an editing command may be a combination of two consecutive strokes and the position discriminator is responsive to the combination of two consecutive strokes comprising an editing command for providing an output indicating the editing command and the editor is responsive to the editing command for directing the stroke buffer controller to modify the strokes stored in the stroke buffer as indicated by the editing command.

Other advantages and features will become apparent from the following description of the preferred embodiment and from the claims and from the drawings, wherein:

BRIEF DESCRIPTION OF THE DRAWINGS

FIG. 3 shows the <COUNT> data structure;

FIG. 4 shows the <RECPT> data structure;

FIG. 5 presents the pseudo-code for the PenISR() routine;

FIG. 6 presents the pseudo-code for the CheckRingBuffer() routine;

FIG. 7A shows the <DOWNRET> data structure;

FIG. 7B shows the <BEGSEG> data structure;

FIG. 7C shows the <OLD> data structure;

FIG. 71D shows the <SEGS> data structure;

FIG. 7E shows the <COORD> data structure;

FIG. 8 presents the pseudo-code for the PenDown() routine;

FIG. 9 presents the pseudo-code for the PenMoved() routine;

FIG. 10 shows the <BINFO> data structure;

FIG. 11 presents the pseudo-code for the PenUp() routine;

FIG. 12 presents the pseudo-code for the ExeCom() routine;

FIG. 13A shows the <SEXTR> data structure;

FIG. 13B shows the <SEGSC> data structure;

FIG. 13C shows the <SEGM> data structure;

FIGS. 14A–C present the pseudo-code for the Stroke() routine;

FIG. 15 presents the pseudo-code for the InsertSeg() routine;

FIG. 16 presents the pseudo-code for the LastSeg() routine;

FIG. 17 presents the pseudo-code for the SymRec() routine;

FIG. 18 shows the <protTh1[PROTNUM]> data structure;

FIG. 19 presents the pseudo-code for the FindProt() routine;

FIG. 20 shows the <PROT> data structure;

FIG. 21 shows the <PINFO> data structure;

FIG. 22 presents the pseudo-code for the MatchFound() routine;

FIG. 23 presents the pseudo-code for the PropDisc() routine;

FIG. 24 shows the arrays for representing the static proportion features;

FIG. 25 presents the pseudo-code for the SymBoundXX() routine;

FIG. 26 presents the pseudo-code for the FindSyms() routine;

FIG. 27A shows the <BUFF> data structure;

FIG. 27B shows the <SYMPROT> data structure;

FIG. 27C shows the <ONEBUFF> data structure,

FIGS. 28A–B presents the pseudo-code for the PutList() routine;

FIGS. 29A–D present the pseudo-code for the FindBPts() routine;

FIG. 30 presents the pseudo-code for the ScarBuff() routine;

FIG. 31 shows the <INF> data structure;

FIGS. 32A–F present the pseudo-code for the InterList() routine;

FIG. 33 presents the pseudo-code for the InterBuff() routine;

FIG. 34 presents the pseudo-code for the StkBoundXX() routine; and

FIGS. 35A–E present the pseudo-code for the OverlapAnsr() routine;

DESCRIPTION OF A PREFERRED EMBODIMENT

Figure 1:
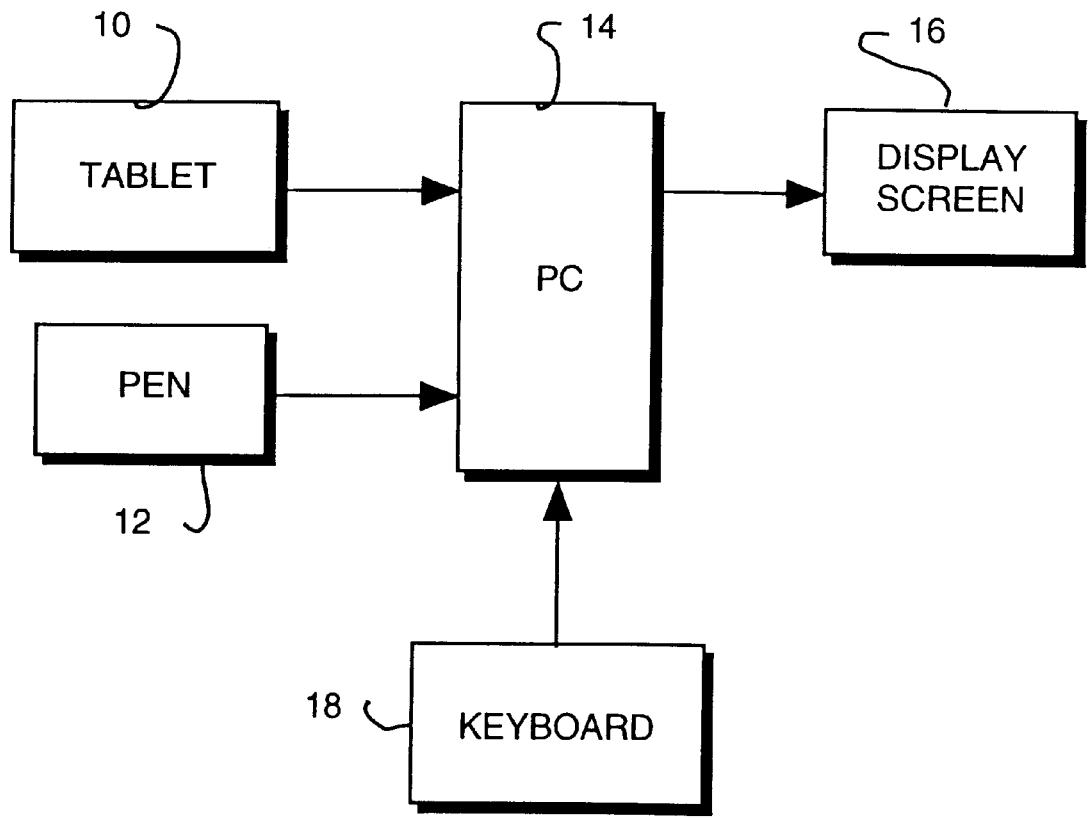
FIGS. 1 and 2 are diagrammatic representations of a system implementing the present invention.

Referring to FIG. 1 the recognition system described here includes a tablet 10 and pen 12 interfacing with host Personal Computer (PC) 14 that includes a display screen 16 and a keyboard 17. While a user writes on tablet 10 using pen 12, a recognition program that which is running on PC 14 (i.e., the recognizer) recognizes the individual characters written by the user and displays both the handwritten character and the recognized character on display screen 16.

Figure 2:
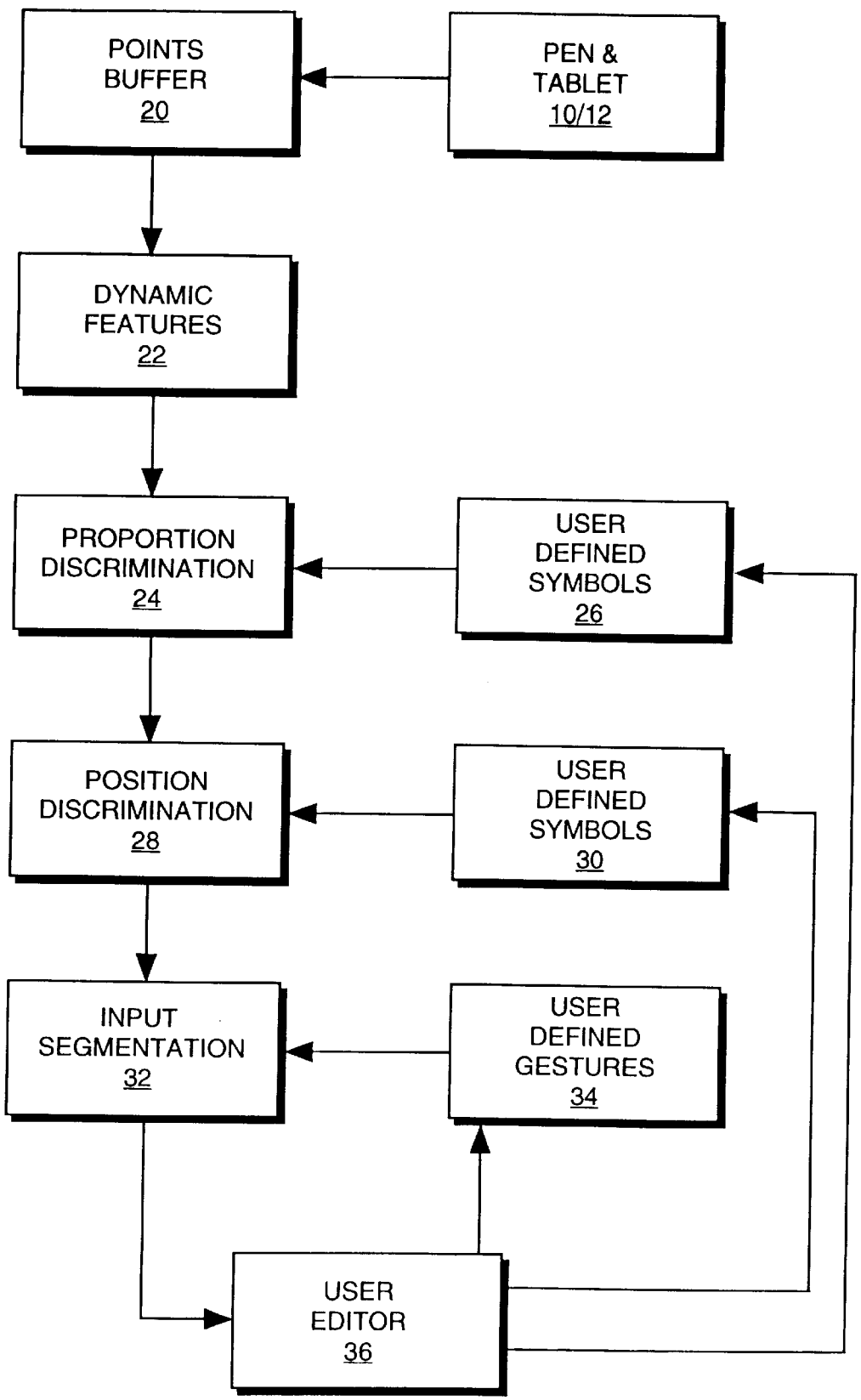

FIG. 2 in turn is a diagrammatic representation of the character recognition system executing on the system illustrated in FIG. 1. As represented in FIG. 2, the character recognition system of the present invention includes Pen 10 and Tablet 12 which provide inputs to a Points Buffer 20, which in turn provides character stroke information to Dynamic Features 22, which dynamically extracts recognition features from the character strokes. Dynamic Features 20 in turn provides extracted stroke information to Proportion Discrimination 24, which also receives User Defined Symbols 26 as inputs, and performs a proportion discrimination operation upon the received stroke information. The position discrimination results are provided in turn from Proportion Discrimination 24 to Position Discrimination 28, which again receives as inputs User Defined Symbols 30, and performs a position discrimination operation. The output of Position Discrimination 28 is provided to Input Segmentation 32, which also receives User Defined Gestures 34 as an input, and provides outputs to User Editor 36, which also interacts with User Defined Symbols 26, User Defined Symbols 30 and User Defined Gestures 34. Although not shown in FIG. 2, the character recognizer also includes a main() routine which itself includes initialization routines, two of which are InitRec() and InitializeDrivers().

The following concepts and terminology are used to describe the operation of the recognizer. Touching the stylus to the tablet initiates a pen down event, which continues until the stylus is lifted off of the tablet for the first time after the initiation of the pen down event. As soon as the pen is lifted off of the tablet, the pen down event terminates. The input generated by the user who is writing on the tablet during the pen down event is a stroke. A stroke is a set of points representing the sampled pen positions describing the user's input during the pen down event. A stroke is typically made up of segments, each of which is an object that is associated with part of the input image obtained while the pen is traveling in one direction. A stroke commonly changes direction more than once; thus, a stroke often includes more than one segment.

The user's input usually consists of a sequence of strokes which make up a particular character. The recognizer produces a cluster from some or all of strokes entered by the user. A cluster is a collection of strokes with a list of meanings assigned to the collection by the recognizer. The collection is ordered according to some measure of success of the assignment by the recognizer.

Note that in future references all actual routines will be followed by parenthesis (), whereas lines of pseudo-code will be made of verbal description of the function. When a potential confusion may arise the actual variables and data structures used in the software are enclosed in angle brackets such as in <pennow>, <penwas>.

InitializeDrivers() calls the graphics, clock, and tablet drivers and links them to the main() routine. These routines are not part of the recognition software and thus are not described in detail. The interface between graphic, tablet and clock routines and the recognition software is done through calling each of the routines from within recognition software defined routines. This ensures portability and modularity of the recognition software. For example, the routine for drawing a black line of thickness 1 from (xbeg,ybeg) to (xend, yend) which is provided by the graphic driver is FG_Line (xbeg, ybeg, xend, yend, 1, FG_BLACK). Instead of calling this routine, a new recognition specific routine is defined void RecDrawLine(short xb, short yb, short xe, short ye) {FG_Line(xb,yb,xe,ye, 1, FG_BLACK);} and is used instead of FG_Line(). All of the routines which provide such an interface are collected in a single module. As a result, the recognition software can be quickly reconfigured from one set of external drivers to another.

The InitRec() routine initializes a certain set of counting variables which are instances of a structure COUNT defined by the typedef struct shown in FIG. 3. The meaning and the use of these variables are described in detail later.

The initialization is followed by an infinite do . . . while() loop whose termination is accomplished by the user either through keyboard 17 or by a stylus gesture.

The infinite loop calls the main handwriting recognition routine referred to as CheckRingBuffer() 20. The infinite loop is periodically interrupted approximately every 5 milliseconds by the tablet TSR driver, referred to as routine PenISR() 22 (short for Pen Interrupt Service Routine 22). During each interrupt a new position and height or pressure of the pen on the tablet are sampled. No sampling occurs if the pen is further away from the tablet than a certain distance (e.g. approximately 1 inch).

If the infinite loop is terminated, the system collects diagnostic information and closes the diagnostic files opened by the routine InitRec(). This is accomplished by the routine PostProcess. Finally, the system disengages from the graphic, clock, and tablet drivers and returns to the DOS operating system prompt.

During the loop interrupt the state of all variables related to all DOS processes is saved. After the interrupt is completed all saved variables are restored. The PenISR() routine 22 furnishes the new variables which describe the state of the stylus variables and performs the following functions:

1) displays ink on the screen by drawing lines of specified thickness between consecutive sampling points;
2) determines the state of the pen and its transition state; and
3) copies the position of the stylus into a circular FIFO array of structures referred to as <ringBuffer[]>, which serves as a circular buffer 24.

There are three possible pen states, namely, <PEN_AWAY>, <PEN_UP>, and <PEN_DOWN> and a set of transition states. These pen and transistion states are defined as follows:

define PEN_AWAY 0
define PEN_UP 1
define PEN_DOWN 2
define TRANSITION (3*penwas+pennow)
define AWAY_AWAY (3*(PEN_AWAY)+(PEN_AWAY)) //=0
define AWAY_UP (3*(PEN_AWAY)+(PEN_UP)) //=1
define AWAY_DOWN (3*(PEN_AWAY)+(PEN_DOWN)) //=2
define UP_AWAY (3*(PEN_UP)+(PEN_AWAY)) //=3
define UP_UP (3*(PEN_UP)+PEN_UP)) //==4
define UP_DOWN (3*(PEN_UP)+(PEN_DOWN)) //=5
define DOWN_AWAY (3*(PEN_DOWN)+(PEN_AWAY)) //=6
define DOWN_UP (3*(PEN_DOWN)+(PEN_UP)) //=1=7
define DOWN_DOWN (3*(PEN_DOWN)+(PEN_DOWN)) //=8

In the above definition, <pennow> and <penwas> takes one of the three values <PEN_AWAY>, <PEN_UP>, <PEN_DOWN>.

The state <PEN_AWAY> is accorded to the stylus if the pen is above a certain distance from the tablet, about one inch, and as a result the tablet ceases to detect the stylus in its proximity for a certain period of time (e.g. 200 msec). The state <PEN_UP> is declared if stylus is above the tablet, or the pen was in PEN_UP state at previous interrupt and is touching the tablet but its pressure does not exceed a certain threshold value. The state <PEN_DOWN> is declared if the stylus is touching the tablet or the pen was in <PEN_DOWN> state at previous interrupt and the height above the tablet is not exceeding a certain threshold value.

The introduction of the threshold values in the determination of the stylus state is done to eliminate "skipping" for the stylus, i.e., fragmentation of a line into a set of disconnected lines whose ends are in close proximity and for a user may have a look of an unbroken line.

A routine referred to as AddPoint() copies the positions of the stylus into circular buffer 24. Each element of the <ringBuffer[]> array as well as the input of AddPoint() is a structure <RECPT> defined as shown in FIG. 4. The first two entries in <RECPT> are the x and y locations of the stylus on the tablet at the time of the sample. TRANSITION is denoted by instance <.t> of the structure and its value is as defined above.

The operations performed by the pen interrupt service routine are shown in FIG. 5. When invoked, PenISR() 22 first gets the new values for the position of the pen on the tablet as well as its pressure on the tablet or its height above the tablet (step 100). Then, PenISR() determines the state of the pen (step 102) and it determines the value of the <TRANSITION> variable by using the state of the pen at the last sample and the state of the pen for the current sample (step 104). Depending upon the transition state of the pen, PenISR() 22 performs a set of operations defined in a switch statement (step 106).

If the transition state is <AWAY_UP> (i.e., the pen has just come into contact with the tablet but the pressure does not exceed the threshold), PenISR() 22 quits without doing anything (step 108). If the transition state is either <AWAY_DOWN> or <UP_DOWN> (i.e., pen has come into contact with the tablet and the pressure exceeds the threshold), PenISR() 22 draws the first point of contact on the display and adds the coordinates to the ring buffer array (step 110). If the transition state is <UP_UP> (i.e., the pen has remained on the tablet but its pressure has not exceeded threshold), then PenISR() 22 erases the old cursor and redraws a new cursor at the location of the pen on the tablet (step 112). If the transition is <DOWN_UP> (i.e., the pen is being lifted from the tablet but has not yet left the tablet), PenISR() 22 redraws the cursor at the new location and records this last point in the ring buffer array (step 114). Finally, if the transition is <DOWN_DOWN> (i.e., the pen has remained on the tablet), PenISR() 22 checks whether the pen has moved more than the width of one screen pixel (step 116). If it has, PenISR() 22 draws a line on the screen connecting the current pen location with the previous pen location and adds the current point to the ring buffer (step 118). If it has not moved more than a screen pixel since the last point, PenISR() 22 terminates and waits for the next sample. If the transition is any other than the above-mentioned transitions, PenISR() 22 terminates without doing anything (step 120).

The pseudo-code for CheckRingBuffer() 20, the main recognition routine, is shown in FIG. 6. CheckRingBuffer() 20, which has no input, produces as its output the meaning of the last entry in a cluster buffer which describes the assignments of meaning to a particular clustering of the group of strokes the system considers at that particular moment. The returned value is used primarily for diagnostics of recognition rate of isolated characters, i.e., when there is only one cluster in the cluster buffer.

The circular buffer <ringBuffer[]> serves to disengage the collection of tablet points and their processing by the recognition software. The CheckRingBuffer() routine removes all of the points from the circular buffer in the order in which they came in. A RemPoint() routine within CheckRingBuffer() routine performs the removal of points from the circular buffer. RemPoint() has void output and its input is a pointer to the structure <RECPT> (see FIG. 4), which describes current position and transition value for the current sampled point.

In order to allow manipulation of the points describing the image of the input on the screen, each point which is being removed from <ringBuffer[]> is stored in another ring buffer referred to as a point buffer and denoted by <pntArr[]>. Just like <ringBuffer[]>, it is a circular array of structures of dimension <RBUFNUM> (defined to be equal 2048), each element of the array being a structure <RECPT>. The storage is accomplished by another routine within CheckRingBuffer() referred to as StorePoints() , which has no return value and whose input is a pointer to the structure <RECPT>. The storage occurs every time the transition is of the type <AWAY_DOWN>, <UP_DOWN>, <DOWN_DOWN>, <DOWN_AWAY>, or <DOWN_UP>.

The <pntArr[]> array is closely tied with other features describing the input and may itself be considered as a feature of the lowest order. Its use allows manipulation of the image of the input and consistent manipulation of the data objects describing the image.

In addition to storage of the points retrieved from <ringBuffer[]>, the CheckRingBuffer() routine performs feature extraction and recognition. As a process, feature extraction may be put in two broad classes, namely, dynamic feature extraction and static feature extraction. Dynamic feature extraction means that features are extracted while each stroke is being completed; whereas static feature extraction means that the system has to wait until the completion of the stroke in order to extract a feature. Recognition refers to assignment of the meaning to each stroke and assignment of meanings to clusters of strokes out of the total number under consideration by the system.

Every dynamic feature can be extracted statically if the necessary information is stored, but as a rule, a static feature cannot be extracted dynamically. The advantage of extracting features dynamically is that certain strokes can take a very long time to complete and it is desirable to use that time for processing. The dynamic features are extracted by the routines within CheckRingBuffer() referred to as PenDown() and PenMoved(). Both routines have no output, while the input of the routines is a pointer to a structure <DOWNRET> and a structure <COORD>, shown in FIGS. 7A and 7E.

Referring to FIG. 6, CheckRingBuffer() 20 calls RemPoint() to take a point from the ring buffer <ringBuffer[]> (step 130). Then, depending on the state of the transition variable for the stored point, it performs one of several different sequences of operations selected through a switch statement (132). If the transition state is <AWAY_AWAY>, <AWAY_UP>, <UP_AWAY>, or <UP_UP> indicating that no samples points are being generated, the switch statement exits (steps 134). If the transition state is either <AWAY_DOWN> or <UP_DOWN>, indicating that it is the first point of a stroke, the switch statement calls a StorePoints() routine to store the point in the point buffer <pntArr[]> mentioned above (step 136), calls a PenDown() routine to initialize recognition structures and some counting variables (step 138) and then terminates. If the transition state is <DOWN_DOWN>, indicating that there are other points of that stroke already in the <pntArr[]> point buffer, the switch statement calls the StorePoints() routine to store the new point in the point buffer <pntArr[]> (step 140) and then calls a PenMoved() routine to extract dynamic features from the points in the point buffer (step 142). After PenMoved() returns its result, the switch statement terminates (step 144). If the transition state of the stored point is <DOWN_AWAY> or <DOWN_UP>, the switch statement calls StorePoints() to store the point in the point buffer <pntArr[]> (step 146) and then calls a PenUp() routine to complete the recognition process by performing clustering and text/command differentiation (step 148). PenUp() returns the rightmost cluster in the cluster buffer as a variable, <theSym>. For any other transition state, the switch statement ends without performing any operation. After the switch statement ends, CheckRingBuffer() 20 returns the recognized cluster <theSym> (step 150).

The routine PenDown() performs initialization of certain variables relating to the dynamic feature extraction. PenMoved() is the main dynamic feature extraction routine and it uses the variables intialized by PenDown(). PenUp() is the final feature interpretation routine. It returns the meaning of the rightmost cluster in the cluster buffer.

PenDown() is called whenever the transition is <AWAY_DOWN> or <UP_DOWN>, PenMoved() is called when transition is <DOWN_OWN> and PenUp() is called whenever the transition is <DOWN_AWAY> or <DOWN_UP>.

The pseudo-code describing the operation of the routine PenDown() is shown in FIG. 6. The only function of this routine is initializing the variables used in the dynamic feature extraction. PenDown() initalizes certain variables in <*ret>, which is a structure <DOWNRET>, and receives the location of the pen through a variable called pen, which is a structure <COORD>. Referring to FIG. 7E, the input structure <COORD> describes x- y-position of a point removed from the <ringBuffer[]>. Referring to FIG. 7A, the input structure <DOWNRET> describes a segment at various scales. The scale is determined by the number of samples used for the representation of the segment. For example, if the tablet provides a sample every 200 msec, the highest resolution scale may take every sample point, a next lower scale may take every other sample point, an even lower scale may take every fourth sample point, etc.

The structure <DOWNRET> includes two entries, namely, oneSeg, which is a structure <BEGSEG>, and prevPt, which is a structure <OLD>. The structure <BEGSEG>, shown in FIG. 7B, describes the segment and the structure <OLD>, shown in FIG. 7C, contains the coordinates of the point before the current point and the coordinates of the point before the current point once removed. The structure <BEGSEG> contains three other arrays, namely, <curDir[SC]>, which is a character type, <firstP[SC]>, which is an unsigned character type, and <inseg[SC]>, which is a structure <SEGS>. <CurDir[SC]> specifies for each scale the actual direction of the segment. <FirstP[SC]> specifies for each scale whether the point is the first point for the segement for that scale, and <inseg[SC]> contains parameters for the actual segment.

As shown in FIG. 7D, the structure <SEGS> includes four entries, namely, <Dir>, <Len>, <Pos>, and <Neg>. [Dir> specifies the virtual direction for the segment. In the representation used herein, there are four possible directions: up, down, right and left. <Len> specifies the length of the segment in tablet coordinates. <Pos> and <Neg> specify the maximum positive and negative displacements, respectively, of the segment with reference the beginning point of the segment. The positive and negative displacement are measured perpendicular to the direction of the segment.

Referring again to FIG. 8, PenDown() first initializes a count of the number of segments in the input to zero (step 160). Then, for each scale, it initializes the contents of oneseg[SC] and sets the coordinates of both points within prevPt equal to the coordinates of the current point (step 162). The following initialization occurs. The number of segments for the scale is set to zero and the current point is declared as the first point of the segment. Since the point represent the first point of the segment, the direction for the new segment is set to unknown. The length of the new segment is set to zero, and both the positive and negative displacements of the new segment are also set to zero.

The pseudo-code for the routine PenMoved() is shown in FIG. 9. PenMoved extracts the dynamical features of the input. The function of this routine is to arrange calling the main dynamic feature extraction routine Stroke() at appropriate times for different scales. There are <SC>+1 (i.e., 4) sets of frequencies with which Stroke() is called. Each set of calls represents an original input spatially smoothed at certain scale. The meaning and the use of smoothing is described below in the section on dynamic feature extraction.

Like PenDown(), PenMoved() also takes as input an instance of the structure <DOWNRET> and an instance of the structure <COORD>. First, PenMoved() initializes a scale subsampling generating variable, called factor, to one (step 170). Then, for each scale, PenMoved() determines whether to perfrom feature extraction at the current point. It does this by first determining the coordinate differences, de.x and de.y, between the current point and the last point of this scale (steps 172–174). Then, it determines a cutoff threshold (called spacing) for testing if the current point belongs to this particular scale (step 176). The cutoff threshold is equal to $6400/(factor)^2$. If the square of the distance between the current point and the last point of this scale exceeds the cutoff threshold, PenMoved() calls a Stroke() routine to extract dynamical features for this scale (step 178). After calling the Stoke() routine, PenMoved() sets firstP[SC] equal to FALSE to make sure that only the first point of the stroke is treated as such (step 180); it saves the scale point before current scale point to prevPt.Two[scale] (step 182) and it saves the current scale point to prevPt.One[scale] (step 184).

After completing the above-described sequence of operations for the current scale, PenMoved() multiplies the variable factor by 2 and then moves onto the next scale (step 186). As noted above, there are four scale representations (i.e., SC equals four). The minimum separation between points for the lowest resolution scale is 80. For the next three higher resolution scales, the minimum separation between points is 40, 20 and 5, respectively.

The routine PenUp() is primarily used to separate commands and text entry of the user interface. In general, there are three functions one can assign to an input through the tablet, namely, annotation, text entry and command execution.

Annotation is a function where the image of the last stroke is integrated with the image of the screen before the input entry. This function is useful for storing users drawings, diagrams, or handwriting which does not need to be recognized by the system.

The text entry function allows the recognizer to recognize all written symbols as strings of meaningful text. In the present invention this interpretation is displayed on the screen as a string of ASCII characters printed underneath each meaningful cluster of strokes.

The command execution function is necessary for any pen based user interface. It is used to change a mode or a function of application software operation, or to perform an operation on the image of the input on the screen such as erasure of the screen image, or to perform error correction editing functions such as insertion of a space in a line of handwritten symbols or correction of a segmentation error, or deletion of some of the handwritten symbols on the screen.

Because of the different functions of annotation, text entry, and command execution one needs to separate among them using pen based inputs. In the current invention, a separation between text entry and command execution is effected. The separation of annotation from the other two functions is accomplished by designating special annotation areas on the screen. The separation of commands and text is performed by the routine PenUp().

The input to PenUp() is a pointer to the initialization structure <DOWNRET> and a pointer to a cluster buffer structure <BINFO> (for cluster Buffer INFOrmation). The cluster buffer structure <FINFO> which describes clustering and interpretations of the clusters is shown in FIG. 10.

Each instance of the structure <BINFO> is an linear array of size <BUFFNUM> (=32), except for the instance <.Frm> which is a double array with <STRKNUM> (=4) describing the maximum allowed number of strokes per buffer. <BUFFNUM> gives the maximum number of clusters in the cluster buffer.

The <.Sym> instance describes the meaning of each cluster, the <.Siz> and <.Pos> instances give their size and position in screen coordinates. The <.Len> instance is the combined screen length of all cluster's constituent strokes, <.Prt> is the prototype number of the best fit of the cluster, and the <.Frm> instance describes the clustering. For a given value of its first index (i.e., BUFFNUM), <.Frm> gives the numbers of the strokes in a <timeBuff[]> array of structures which make up the cluster.

A stroke buffer <BUFF timeBuff[BUFFNUM]> is an object which contains information about the group of strokes which are being processed by the recognition system. More thorough description of this object is given in a later section on clustering and position discrimination and the routine PutList(). Some of the other concepts introduced by the structure <BINFO> are also discussed in greater detail later. For example, Prototype numbers are defined and discussed in detail in a section concerning proportion discrimination. In addition, the <.Prt> and <.Frm> arrays are explained in more detail below in sections on single stroke recognition and on clustering.

The pseudo-code for the routine PenUp() is shown in FIG. 11. When invoked, PenUp() calls another routine called SymRec() to obtain the meaning of the last stroke in the cluster buffer (step 190). If the number of clusters in the cluster buffer is equal to two, PenUp() sets the meaning of the last stroke equal to the second entry in the <.Sym[]> array and sets the meaning of the previous stroke to the first entry in the <.Sym[]> array (steps 192 and 194). Then, PenUp() checks whether an editing flag (i.e., ModeFlag()) is turned on (i.e., TRUE), indicating that the system will recognize user entered editing gestures (step 196). If the mode flag is TRUE, PenUp() calls an ExeCom() routine to check whether the combination of two strokes represents a potential editing gesture (i.e., a single stroke enclosed in a circle) and if it does, which command to execute (step 198). If the mode flag is FALSE, PenUp() prints the meanings of the clusters on screen (step 200).

The method of separating commands and text entry consists of detecting of certain spatial alignments of certain symbols. That is, the system interprets any of a predetermined set of stroke shapes followed by a circular stroke which completely encircles the shapes as a command determined by the shape, unless such a combination forms a meaningful cluster. The encirclement is determined by the routine ModeFlag() which has boolean output and has a pointer to the cluster buffer structure as the input. If output of ModeFlag() is zero then no encirclement by the last stroke was detected. If its output is one, an encirclement was detected. The encirclement is determined by deciding whether the smallest rectangular box which contains the previous stroke input is contained in the similar rectangular box for the last stroke input and if the last stroke has meaning of letter 'O', For example, a single stroke lower case letter 'a' encircled by a single stroke letter 'O' is interpreted as a command provided the letter 'a' was written sufficiently far away from all previous strokes.

As a result instead of treating 'O' as a meaningful symbol the system uses the routine ExeCom() to determine which command must be executed. The pseudo-code for this routine and for this gesture is shown in FIG. 12. As indicated, ExeCom() receives as its input the meaning of the current stroke <nowSym>, the meaning of the previous stroke <prevSym>, the current cluster buffer structure <buf>, and the cluster buffer structure before the gesture <oldbuf>. As will be described below in more detail, the cluster buffer structure is initialized (emptied) whenever a new stroke input is sufficiently far away from the previous strokes.

Within ExeCom(), a variable <reject> is used to determine whether both <nowSym> equals "O" and <prevSym> equals "a". If both conditions are true, the variable <reject> will be FALSE and ExeCom() will call the command routine associated with the encircled letter "a". For any other case, the value of the reject variable will be TRUE and ExeCom() returns without calling a command routine.

If no gesture was found then the system augments the cluster buffer and prints all the meanings of meaningful clusters on the screen underneath the cluster using routine PrintCom(). Before the ASCII characters are printed all the previous answers are erased to avoid printing the new meanings on top of old ones.

Having described the overall structure of the recognition system we now turn to the detailed description of feature extraction, beginning with the dynamic feature extraction.

Dynamic Feature Extraction

As mentioned earlier, dynamic feature extraction implies the extraction of the features while a stroke is being created. In addition to dynamic features, the recognition system extracts static features which include the features that can be defined only after each stroke is completed. An example of a dynamic feature is the coordinates of a sample point, these coordinates can be stored before the stroke is completed. An example of static feature is the size of the stroke.

Instead of recomputing the size of the stroke with every new sampling point, it is computationally more efficient to wait until the stroke is indeed completed, i.e., a transition <DOWN_UP> or <DOWN_AWAY> has occurred.

Multiple Input Representation

An important feature of the present invention is the use of multiple representations of the input. If the general problem of pattern recognition is considered, in many instances it may be reformulated as a process of exact matching of some form of representation of the input with a similar form of representation of allowable outputs. Since in realistic problems the input has a large number of degrees of freedom (between 2 to 1000 degrees of freedom in the case of handwriting recognition) and the amount of noise present in an input is directly related to the input's number of degrees of freedom, the main problem of pattern recognition is the construction of internal representations of the desired outputs which can be matched to as noisy inputs as possible under the constraint of fixed amount of memory allowed for storage of internal representations. One way to effect the matching is to store as many noisy inputs as possible. Thus if I(0) is an ideal input without noise and noise N acting on the ideal input produces noisy inputs $$I(k)=N((0),k), k=1, 2, \ldots, M,$$

where N(.,k) means application of some noise operator for the "k"th time, one can store M patterns in hope that the actual input I will match one of internal representations I(k). Such a method is used in prior art. This method, however, becomes inefficient if a large number of outputs is required because storage requirements grow faster than any polynomial with that number of degrees of freedom.

The alternative used in the present invention, in effect, trades space for time. Instead of matching noisy input to noisy internal representation of the output, the noisy input is injected with more noise by making multiple copies or representations of the input. Thus, instead of I(k) we obtain J(k)=N(I,k), k=1, 2, . . . , M where the noise operator is applied to the actual input, rather than to internal representation of ideal input.

Furthermore, instead of storing a multitude of internal representations, only the ideal representations are stored. Thus, instead of trying to match actual input to a noisy version of the ideal input, one tries to match a noisy version of the actual noisy input to an ideal representation.

One advantage of this method is that only (M−1) additional copies of the actual input are temporarily generated, while in the prior art K*(M−1) copies, where K is the number of outputs, are permanently stored in the memory.

Another advantage of the present invention is that the method is well suited for parallel implementation. After the multiple copies are generated, their further processing is independent of each other until the final step of choosing which of the noisy copies of the actual input was closest to some ideal representation.

Multiple Scale Representation

In accordance with the idea of multiple input representation, the features extracted from the sample pen positions are generated in two forms of multiple representation. The first form is referred to as a scale multiple representation and the second form is referred to as topological multiple representation.

Scale representation is obtained by extracting sets of features from different subsets of sample points of each stroke. The subsets are obtained as follows. The first and the last point of a stroke are included in each subset. The second and subsequent points, except for the last, of a subset "n" n=0, 1, 2, 3, are obtained from the sample points of the input by the inductive rule: if point p(k) was included in the subset "n", then the next point p(k') of the subset must be at distance at least L/D, where D is 2 to the "n"th power.

The largest "n" is chosen so that the distance between subsequent points is one screen pixel. Making scale copies of the input amounts to a successive smoothing of the original input beginning with the highest "n" which represents the finest resolution down to n=0 for the roughest resolution of the representation.

For a given scale feature extraction is effected by the previously mentioned routine Stroke() called by PenMoved() (see FIG. 9). The features extracted by the routine Stroke() for each scale representation are given by the array of structures <SEGM> one for each scale used. The structure <SEGM> and its component structures are shown in FIGS. 13A–C.

The dynamic features extracted by routine Stroke() are a sequence of directions of movement of the pen quantized to two bits plus information describing the stroke during each direction of movement. The quantized directions are UP, DOWN, LEFT, RIGHT corresponding to movements within the cones. They are defined numerically by:

```
#define UP    2    // UP
#define LE    4    // LEFT
#define DO    6    // DOWN
#define RI    8    // RIGHT
```

Thus, for example, the sequence of two points $x_0$ and $x_1$ is part of a segment of direction R. The next point $x_2$ is also part of that same R segment if it falls with the RIGHT cone with respect to $x_1$.

The dynamic features are grouped in the <SEGM> array with each element of the array (i.e., <SEGSC>) corresponding to a particular direction of movement. Changes in the direction of movement occur when the two lines connecting three subsequent points lie in different cones. Such groups of features characterizing parts of the stroke are referred to as segments and are described in the structures <SEGSC> (see FIG. 13B).

Each segment is represented by:
1. the <.End> instance is the coordinates of the endpoint of the segment;
2. the <.Bef> instance is the coordinates of the point before the endpoint of the segment;
3. the <.Aft> instance is the coordinates of the point after the endpoint of the segment;
4. the <.Ext> instance, which is the structure <SEXTR> shown in FIG. 13A, specifies the coordinates of the maximum and minimum extensions of the segment in directions normal to the direction of the segment which is useful characterizing the curvature of the segment;
5. the <.Dir> instance identifies the direction of pen movement for that segment;
6. the <.Len> instance is the maximum screen extension of the segment in the direction of movement;
7. the <.Pos> instance specifies the screen positive displacement of the segment;
8. the <.Neg> instance specifies the screen negative displacement of the segment;
9. the <.Pti> instance identifies the number of the point in the point array <pntArr[]> which is the first point of the segment; and
10. the <.Pto> instance identifies the number of the point in the point array <pntArr[]> which is the last point of the segment.

The <SEGM> array includes SEGSNUM+1 structures <SEGSC>, i.e., one more entry than there are segments. In the described embodiment, SEGSNUM equals 25, it was selected to be equal to the largest number of segments likely to be found in the most complex stroke (13 segments) plus six segments on either end of that stroke.

A set of successive directions is referred to as the direction string of a particular scale representation of the input. In the present invention, there is a restriction on the possible form of the direction string. The first restriction, which follows from the nature of feature extraction, is that two similar directions in the string cannot be next to each other. In other words, a string of the form RRR (i.e., Right, Right, Right) does not occur. The second restriction, which is introduced in order to reduce space needed to store ideal representations of the input and to provide consistent multiple topological representations of the input, is that all changes in the direction string must proceed in units of one. Thus, a string of the type DUDU is not acceptable. That is, changes in direction must be described by a neighboring cone.

To insure that the second restriction is observed, whenever a change occurs from UP to DOWN or from LEFT to RIGHT, etc. in the original set of sampling points, an additional fictitious sampling point is added whose coordinates are identical with those of the point where the change of directions occurred. This results in an additional segment, which is referred to as an inserted segment. The choice of the direction for the inserted segment is such that the image would have no loop, had the fictitious point moved a small distance in the chosen direction.

As was mentioned above, routine Stroke() extracts features for each of the <SC> number of scale representations. Each coordinate pair received by the routine PenMoved() is checked as to whether it belongs to a particular scale according to the algorithm described earlier. What follows is a detailed description of the dynamic feature extraction for a particular scale representation.

Procedure Stroke() has void output and its input is a pointer to the structure <DOWNRET> described above, the coordinate pair describing the particular scale point (i.e., <COORD>pen), the coordinate difference between current and preceding scale points (i.e., <COORD>de), and the value of the scale <scale>.

Routine Stroke() is summarized by the pseudo-code shown in FIGS. 14A–B. In the following description, the the right cone is composed of all vectors lying in the cone defined by x>0, y≦x, and y≧−x, the left cone is defined by x<0, y≦x, and y≧−x, the upper cone is defined by y≦0. x<y, and x>−y, and the lower cone is defined by y>0, x<y, and x>−y.

Note that the cones cover the whole plane except for the point (0,0). A vector <de> of value (0.0) never occurs as input to routine Stroke() because the routine is called only if the value of the maximum component of <de> exceeds a threshold value <TBLT_SCRN>, which is the ratio of tablet to screen resolution. Such a cutoff is useful because tablets typically have better resolution than screens and by using the cutoff threshold, features are extracted which describe the image the user actually observes thus reducing the amount of necessary computations.

When Stroke() is called by PenMoved(), it checks the direction of movement of the pen from the previous scale point and the current scale point <de> (steps 210–216). Depending upon the direction of movement, Stroke() then records the current direction, the length of <de>, and the positive and negative displacements of<de>. Then, Stroke() checks whether the current scale point is the second scale point of the current scale (step 218). Note that the first scale point is identified by setting the instance <.oneSeg.firstP [SC]> of the structure <DOWNRET> to TRUE for that point.

If the current scale point is the second point for that scale, Stroke() begins to construct information for the new segment. In particular, Stroke() performs the following steps:
  1. assigns a direction to the first segment;
  2. assigns a length to the first segment;
  3. assigns positive and negative displacements to the first segment;
  4. assigns a beginning point number to the first segment;
  5. records the coordinates of the first point of the first segment;
  6. records the coordinates of the preceeding point;
  7. records the coordinates of the subsequent point;
  8. assigns initial values of segment extrema for the first segment; and
  9. recomputes the values of the segment extrema for the first segment;

If the current scale point is not the second scale point, Stroke() checks whether the direction of the vector <de> is the same as the direction of the current scale segment (step 220). If it is the same direction, Stroke() augments the existing information for the segment. In particular, Stroke() performs the following steps:
  1. augments the length of the segment by the length of<de>;
  2. augments its positive displacement by the positive displacement of <de>;
  3. augments its negative displacement by the negative displacement of<de>; and
  4. recomputes the coordinates of maxima and minima in the X and Y directions;

If the direction of the vector <de> is not the same as the direction of the current scale segment, Stroke() checks whether the total number of segments exceeds the maximum allowable number (i.e., whether the number of segments has reached SEGSNUM+1) (step 222). If the maximum number of permitted segments has not been reached, Stroke() creates a new segment structure. In doing so, it performs the following operations:
  1. assigns direction to the new segment;
  2. assigns length to the new segment;
  3. assigns a positive displacement to the new segment;
  4. assigns a negative displacement to the new segment;
  5. assigns an end point number to the old segment;
  6. augments the count of segments by one;
  7. assigns a beginning point number to the new segment;
  8. assigns initial values of segment extrema for the new segment;
  9. recomputes the values of segment extrema for the new segment;
  10. records the coordinates of the first point of the new segment;
  11. records the coordinates of the preceeding point; and
  12. records the coordinates of the subsequent point.

Stroke() then checks whether the change in direction between the last segment and the current segment was greater than one quadrant (step 224). If it was greater than one quadrant, Stroke() calls an InsertSeg() routine that inserts a null segment of the appropriate direction to separate the two segments. Finally, Stroke() saves the current values of the segment direction lengths and displacements (step 226).

Considering the insertion of a fictitious segment, three consecutive sampling points x(0), x(1), x(2) are drawn such that the point x(1) is at the center of the coordinate system. The original direction string of the input is DU since the pen first travels in the lower cone and then in the upper cone. Because the x coordinate of x(0) is larger than that of x(2), InsertSeg() augments the direction string DU by inserting a segment with direction L (eft). The resulting direction string is DLU. The inserted segment is provided with null attributes: zero lengths and displacements, same beginning and end etc., to make the insertion geometrically consistent. For an original direction string of UD, InsertSeg() adds an intermediate segment having a direction R to produce URD. For an original direction string of RL, InsertSeg() adds an intermediate segment having a direction D to produce RDL. Finally, for an original direction string of LR, InsertSeg() adds an intermediate segment having a direction U to produce LUR.

The remaining four cases of insertion may be readily obtained by interchanging x(0) and x(2).

The operations of InsertSeg() are shown by the following pseudo-code in FIG. 15. After being called, InsertSeg() checks whether the total number of segments found thus far does not exceed the maximum allowable number (step 300). If the number of segments is not yet at that maximum level, InsertSeg() generates a new "fictitious" segment and assigns to it the relevant data. In particular, InsertSeg() assigns the new segment a direction in accordance with the approach described above (step 302); it assigns values of zero to the length and the extrema (steps 304–306); it assigns an end point number (i.e., an index into the point array) to the segment before the fictitious segment (step 308); it assigns begin and end point numbers to the fictitious segment (step 310); it augments the total number of segments by one (step 312); and it assigns a begin point number to the segment after the fictitious segment (step 314).

The actual extraction of the dynamic features is completed by a routine hereinafter referred to as LastSeg(). The output of the routine is null, the input of the routine is the pointer to the structure DOWNRET. This routine processes the last sample point of each stroke. The pseudo-code for this routine is shown in FIG. 16.

When the last point of the stroke is reached, LastSeg() completes the data structures which fully describe the dynamic features of the stroke. First, LastSeg() checks whether the maximum number of permitted segments has been reached (step 320). If not, LastSeg() completes the structure for the last segment. To do this, it performs the following functions for each scale of the SC scales:
1. assigns a direction to the last segment;
2. assigns length to the last segment;
3. assigns a positive displacement to the last segment;
4. assigns a negative displacement to the last segment;
5. assigns an end point number to the last segment;
6. augments the count of segments by one;
7. records the coordinates of the last point of the last segment;
8. records the coordinates of the preceeding point; and
9. records the coordinates of the subsequent point.

The end process of extraction is a hierarchical data structure describing the input stroke with variable degree of approximation. The crudest approximation is the direction string of the stroke. The next level of approximation involves assignment of lengths and displacements to each segment of the stroke. The following level involves the information about position of extrema of coordinates of the sample points of each segment, and finally the last level of approximation is the pointer to the array of coordinates of all sampling points of the segment. The last level of the description contains all the information about the stroke as it was obtained from the tablet. These data structures are referred to as graded input representations. They are computed for variable degree of smoothing of the image of the input stroke, where smoothing is done by removing some sampling points as described above. Subsequently, the system selects only one level of smoothing or scale as the best representation and uses that for further recognition. The precedure for making the selection of the best scale representation is described next.

Selection of the Best Scale Representation

The selection of the best scale is based on a conceptually simple criterion with information theoretical meaning. Ignoring for now the details of the process of recognition of a particular input, assume that the system can assign meaning to subsets of the input and assume also that the system can measure the "volume of space" each interpretation occupies. Then the rule for choosing the best interpretation is to pick the interpretation with the largest "volume of space". In the described embodiment, the "volume of space" occupied by an input subset is defined as its screen length.

The information theoretical interpretation is as follows. One can think of the volume of the input as the volume of the signal mixed with noise, and the volume of a meaningful subset as the volume of the signal only. Then choosing the interpretation with the largest volume amounts to choosing the interpretation with the largest signal to noise ratio.

In the described embodiment, the process of selection is performed by a routine referred to as SymRec(). This routine is called within the routine PenUp() whenever the pen <TRANSITION> is <DOWN_UP> or <DOWN_AWAY>.

The inputs of this routine are pointers to a <DOWNRET> structure and two <BINFO> structures. Both structures have been previously described. The two <BINFO> structures are used to describe two cluster buffers, namely, a current buffer and the buffer which existed before the current. The use of the additional cluster buffer is needed for separating of commands and text, and will be described in more detail in a later section on the Editor User Interface. The output of SymRec() is an unsigned character which is used for diagnostic purposes only.

The operation of SymRec() is described by the pseudo-code in FIG. 17. After being called, SymRec() finishes processing the last samplin point of the stroke (step 330) and then finds the correct range of scales (step 332). Finding the correct range of scales refers to finding the roughest scale for which the selection of best scale is considered. Limiting the range of scales is done to increase the speed of processing in the case when the size of the input is much smaller than some of the rough scales. In the described embodiment, the rule for inclusion of a scale "k" in the range is that the maximum tablet size of the input in x- y-direction is more than <GRIDSZ> times 2 to the "k+1"th power. Presently, <GRIDSZ>=40.

SymRec() checks whether the scale range contains only the finest scale (step 334). If it turns out that only the finest scale is in the range, the system treats such an input as very small and assigns to it the default meaning of the period, or comma depending on the proportion of its vertical size with regard to its horizontal size (step 336).

If the range includes more than the finest scale, for all scales SymRec() finds all meaningful prototype matches and it sorts them by length (step 338). The process of finding and sorting all meaningful prototype matches is referred to as proportion discrimination. This is the process of assignment of meaning to each individual stroke and it is done within the routine referred to as FindProt(). FindProt() and proportion discrimination are described in greater detail in a later section.

SymRec() checks for the prototype match with the best fit that has the greatest length and chooses the dynamic features for that scale (step 340). Then, for the selected scale, SymRec() finds the best meaning for the cluster of strokes (step 342). The process of assigning meaning to clusters of strokes is done within the routine referred to as FindSyms() and is also referred to as position discrimination. Position discrimination is described in greater detail in a later section.

After FindSyms() has assigned meanings to the cluster of strokes, SymRec() returns the meaning of the first entry in the answer buffer that was generated by FindSyms() (step 344).

Proportion Discrimination

Proportion discrimination is the process of assigning meaning to subsets of single strokes based on relative length proportions of their parts. The process results in compiling a multiple input representation where the input is now a particular scale representation of the tablet input. Such a representation is referred to as a topological representation.

To compile a topological representation of a given input the present invention uses a list of topological prototypes. Each entry in the list is a direction string for a certain frequently occurring shape of an ideal input. For example, the direction string or prototype for capital L would be <"DR">. Note that each input image is characterized by two different direction strings. One string characterizes the input if written in one direction and the other string characterizes the input if it written in the reverse direction. Thus, for example, <"LU"> is the prototype for a capital L written in the reverse direction. The list of prototypes, however, encodes only one of the two equivalent prototypes. At run time, the direction string of the input is reversed to ensure that both ways of traversing the image are covered.

The process of compiling involves matching the prototypes against any contiguous subset of the direction string of the input or its reverse. Whenever a match of a prototype occurs, the system attempts to assign a meaning to the match. This is done by a tree-based neural network which will be described in detail below. If meaning cannot be assigned to a prototype, the system rejects it and attempts matching with other subsets of the input direction string and other prototypes.

When the match is meaningful, the number of the matched prototype is put in the list together with the screen length of the matched portion of the input and information about position, size, and meaning of the matched part. The list is sorted with each match so that the matched portions of the input with the largest screen length are at the top of the list. Such sorting is useful because it maximizes the signal to noise ratio for a transmission of noisy signals where the value of the signal is the screen length of the input and the noise is the difference between the input screen length and the length of a meaningful subset of the input.

The process of compiling a topological representation is repeated for each scale of the scale representation and the scale with the largest signal to noise ratio is considered as the best interpretation of the input.

Referring to FIG. 18, the list of meaningful prototypes in the present invention is described by an array of structures protTbl[BRCHNUM], one per prototype. The instance <.longProt[PROTLEN]> of the structure is the character string representing the direction string of the prototype and the array <.symbols[BRCHNUM]> is a list of possible meanings of the prototype. In the described embodiment, <PROTLEN>=8, <BRCHNUM>=9. The structure is defined as shown in Appendix A The character string RESV indicates that the particular prototype is not used by the system. The entries which do not have a character string on the same line are not part of the structure.

The routine which compiles the topological representation is referred to as FindProt(). Its inputs are a pointer to the structure <SEGM> which describes dynamic features for a particular scale, a pointer to a structure <PINFO> which describes the topological representation of the stroke described by the structure <SEGM>, and an integer scale which is used for diagnostic purposes only. This routine has no output.

The pseudo-code for the routine FindProt() is shown in FIG. 19. FindProt() accomplishes the following things. It reduces the noise in the dynamic features due to passage of the pen near the diagonal lines separating the cones of the four directions in the direction string of the stroke (step 350). It initializes the structure describing the topological representation (step 352). It computes new static features, i.e., the angles between successive and once removed segments quantized to four bits (step 354). It computes the dynamic and static features for the stroke with reversed direction of movement (step 356). And it scans the list of prototypes and tries to find an exact match between prototypes and a connected subset of the direction string of the input stroke both for original and reversed stroke (step 358). For each match of a prototype, it call a Match Found() routine which computes the screen length occupied by the subset of the stoke image whose direction string matched the prototype, tries to assign meaning to the matched prototype, and compiles the topological representation, i.e., the list of all meaningful matched prototypes sorted in order of their screen length (step 360).

The inputs to the MatchFound() routine are a pointer to the structure <PROT> which describes a single matched prototype, a pointer to the structure <SEGM> which describes the stroke's dynamical features for a particular scale and direction, and a pointer to the structure <PINFO> which describes sorted lists of meaningful, matched prototypes. The output of this routine is an integer which is used for diagnostic purposes.

The structure <SEGM> has been described in an earlier section on dynamic feature extraction. The structure <PROT> is shown in FIG. 20 (where UCHAR means an unsigned character). The instance <.Sym> of this structure is the meaning of the matched prototype. The instance <.Prt> is the number of the matched prototype in the prototype list. Thus, for example, if the matched string is "DRUL", <.Prt> is 16 (see Appendix A). The instance <.Off> is the offset of the matched prototype from the beginning of the complete direction string describing the users input stroke. The instance <.Bit> is the number of directions in the matched prototype. In the case of "DRUL" that number would be 4. The instance <.Len> is the number of directions in the complete input stroke. The instance <.Rol> has value 0 or 1 depending on whether or not the input string had to be reversed for this prototype to match. The instance <.Fit> is the screen length of the matched prototype. The instances <.Pti> and <.Pto> are indexes into the point array pntArr[]. In particular, the instance <.Pti> is the point number of the first sampling point of the prototype in the point array pntArr[]; and the instance <.Pto> is the point number of the last sample point of the prototype in the point array. The last two instances are for the Editor User Interface. In principle, the knowledge of these sampling points allows one to manipulate the image of the subset of the input stroke which corresponds to the matched prototype.

The structure <PINFO>, which is shown in FIG. 21, describes sorted arrays of meaningful prototypes. There are <ALTSNUM> (=16) entries, each of which (except for the first one) corresponds to a matched meaningful prototype. The instance <.Sym[ALTSNUM] refers to the meaning of the prototype. The instance <.Prt> is the structure <PROT> described above. The instance <.Siz> is the screen size of the matched prototype. And the instance <.Pos> is the position of the matched prototype. The entries of the first array in the structure <PINFO> describes the input string itself according to the following example:

```
{
PINFO str;
    str.Sym[0] = HAPY_SYM;
    str.Prt[0].Bit = Number Of Directions In The Input String;
    str.Prt[0].Fit = Screen Length Of Input String;
    str.Prt[0].Pti = First Sample Point Of Direction String
        At This Scale;
    str.Prt[0].Pto = Last Sample Point Of Direction String
        At This Scale;
}
```

In this example, <HAPY_SYM>=1. Such an assignment of the first entries is useful for recognizing clusters of strokes.

If for some reason there are less than <ALTSNUM>−1 matched prototypes, then the remaining entries of the arrays are initialized so that for the entry with Entry Count entry count value, they have the following values:

```
{
    str.Sym[Entry Count] = NULL_SYM;
    str.Prt[Entry Count].Prt = 0;
    str.Prt[Entry Count].Off = 0;
    str.Prt[Entry Count].Bit = 0;
    str.Prt[Entry Count].Rol = 0;
    str.Prt[Entry Count].Fit = 0;
```

```
          str.Pos[Entry Count].x = 10;
          str.Pos[Entry Count].y = 10;
          str.Siz[Entry Count].x = 0;
          str.Siz[Entry Count].y = 0;
          }
```

These two assignments (i.e., of the first array and the remaining entries for empty matched prototypes) are done within the routine FindProt().

The pseudo-code for MatchFound() is presented in FIG. 22. MatchFound() first computes the length of the matched prototype (step 370) and then compares it to the length of the input stroke (step 372). If the computed length is less than a specified fraction of the total length of the input string, the prototype is rejected from further consideration. In the described embodiment, the fraction is equal ¼. This proves useful because "short" prototypes do not carry much information about the whole input string. One can therefore save computation time by disregarding them.

If the total length of the matched prototype exceeds the threshold, MatchFound(), by calling a routine referred to as PropDisc(), extracts more information about the prototype (step 374). PropDisc(), which is presented in pseudo-code in FIG. 23, performs what shall be referred to as PROPortion DISCrimination. The inputs to PropDisc() are pointers to the structures <SEGM>, <PINFO>, and <PROT>, which have been described above. The routine has no output.

The PropDisc() routine extracts static proportion features (step 380), static curvature features (step 382), and the overall size of the prototype (step 384). Static proportion features refer to lengths and perpendicular displacements of the prototype, together with the same features which describe segments extending from the beginning and the end of the prototype. The static proportion features are stored in arrays (<LOOK>=3, <PROTLEN>=9, <SEGSNUM>=25) of variables relating to a particular prototype. Presenting features in such a form proves convenient for use in the neural networks which assign meaning to prototypes and which will be described later.

The static proportion features are represented by the arrays listed in FIG. 24. The information that is stored in each of those data structures will now be described with the aid of the input string "URDRU", represent a handwritten "U". In this example, it is assumed that the matched prototype spans the points A to B ("DRU").

1. direct[PROTLEN] is the direction of the corresponding segment of the prototype, i.e., "DRU".

2. bseg[PROTLEN] is the screen length of the segment in the direction of movement without including displacements of neighboring segments (e.g. see bseg[0]).

3. pseg[PROTLEN] is the screen length of maximal positive displacement perpendicular to the direction of movement (e.g. see pseg[2]).

4. nseg[PROTLEN] is the screen length of maximal negative displacement perpendicular to the direction of movement.

5. fseg[PROTLEN] is the screen length of segment in the direction of movement including the displacements of the neighboring segments.

6. chdsg1[SEGSNUM] is the change in angle between two successive segments (e.g. see chdsg1[0]).

7. chdsg2[SEGSNUM] is the change in angle between two once removed segments (e.g. see chdsg2[0]).

8. segpos[PROTLEN+1] is the screen coordinates of the endpoints of the segment.

9. COORD pext is the screen size in pixels of the prototype.

10. befd[LOOK] is the same as direct[PROTLEN] except that it applies to the segments which come before the first segment of the prototype. The count begins with the first preceding segment up to LOOK preceding segments.

11. befb[LOOK] is similar to bseg[], but applies to the segments before the first segment of the prototype.

12. befp[LOOK] is similar to pseg[], but applies to the segments before the first segment of the prototype.

13. befn[LOOK] is similar to nseg[], but applies to the segments before the first segment of the prototype.

14. aftd[LOOK] is the same as direct[PROTLEN] except that it applies to the segments which follow the last segment of the prototype. The count begins with the first successive segment and proceeds to <LOOK>.

15. aftb[LOOK] is similar to bseg[], but applies to the segments after the last segment of the prototype.

16. aftp[LOOK] is similar to pseg[], but applies to the segments after the last segment of the prototype.

17. aftn[LOOK] is similar to nseg[], but applies to the segments after the last segment of the prototype.

Extracted static curvature features are described by an array <ULONG devit[2]>. This array of two elements measures the segments curvature by computing the squared distance between the sampling point with the largest and the smallest coordinate (i.e., the locations of the extrema) and the line connecting the ends of the segment. Thus, for example, if the prototype is tilda, then the positive and negative extrema are points labelled C and D, respectively and the line connecting the end points A and B of the segment is the dashed line connecting points A and B. In that case, devit[0] is the perpendicular distance from point C to the the dashed line AB and devit[1] is the perpendicular distance from point D to the the dashed line AB.

Since extracting the curvature requires double precision computation, it is done only for some segments of particular prototypes, namely the prototype for which curvature is the discriminating feature, such as the curvature of the single segment which allows to tell '(' from ')'. Other examples are "2" and "Z", and "6" and "G". The curvature of the first segment distinguishes a "2" from a "Z". And the curvature of the last segment distinguishes a "6" from a "G".

After PropDisc() extracts the static features, it assigns meaning to the prototype (step 386). The actual assignment of the meaning to prototypes is done by an array of routines SymBoundXX(), where XX is two digits, the first of which varies between 0 and 8 and the second of which varies between 0 and 9. In all, there are 90 routines of this type. The input of each routine is a pointer to the structure <PROT>, which describes features of a single prototype. This structure was described above. The output of each routine is an integer <gcount> with values between −1 and <BRCHNUM> or <NULL_SYM> (where <NULL_SYM>=254). The routines are called within the routine PropDisc() by using an array of pointers to them referred to as "short (*pSymBound [PROTNUM])(PROT *)", where <PROTNUM>=90.

The particular value of the index to the <PROTNUM> array is determined by the number of the prototype on the prototype list given as an instance of the structure <protTbl>. Each pointer of this array points to a routine SymBoundXX() with XX corresponding to the index of the pointer.

If the return value of the routine SymBound() is <NULL_SYM>, the meaning of the prototype is defined as null and this prototype is excluded from further consideration and is not included in the topological representation described by the structure <PINFO>. If the return value is not <NULL_SYM> and is positive, it indicates the assignment of the meaning as "<gcount>"th value of the <protTbl[]> array of meanings:

meaning=<protTbl.symbols[gcount]>.

In this case, the meaning of the prototype is assigned within the routine PropDisc(). Finally, if the return value is −1, then the meaning of the prototype is assigned within the routine SymBoundXX(), as described below.

Referring again to FIG. 23, if the meaning of the prototype is determined not to be null (i.e., the prototype was not rejected), PropDisc() recomputes the size of the prototype (since it may have been augmented within the SymBoundXX() routine) (step 388); it recomputes the position of the prototype (step 390); it adds the new entry to the prototype list (step 392); and it sorts the prototype list by screen length with the longest first (step 394).

Tree Structured Neural Networks:

In addition to the inputs described above, the data structures used by SymBoundXX() are:

1. False and true boolean boundaries which are initialized

<fbound[i]=FALSE>, i=0, 1, . . . , BRCHNUM-1,

<tbound[i]=FALSE>, i=0, 1, . . . , BRCHNUM-1, where <BRCHNUM>=9.

2. Feature boundaries that take integer values and are initialized to be zero:

<bnd[i]>=0, i=0, 1, . . . , BNDRNUM-1, where <BNDRNUM>=80.

The false boundaries are used to reject the prototype from assignment of any meaning. If any of the false boundaries are true, the prototype's meaning is null. The true boundaries are used to assign meaning from the prototype table <protTbl[]>. The index of the first true boundary in the array <tbound[]> is used as an index into the <protTbl[]> array.

The feature boundaries are linear combinations of static proportion features. They are used to draw the boundaries in the feature space between symbols with different meanings.

A single boundary is a hyper-plane defined by <bnd[k]>>0, where <bnd[k]>=G*bseg[0]+H*bseg[1]+. . . is an integer valued linear combination of features. The integers G, H, . . . , referred to as weights, all typically vary in the range between 1 and 16 and are thus quantized to 3 or 4 bit level.

On average there are between two to three weights involved in the definition of each feature boundary. The low precision of the coefficients and their small number offers a significant advantage. In comparison to conventional approaches, it leads to reduced requirements on memory and greater speed of the handwriting recognition system. The described embodiment employs about five thousand weights to distinguish between about a hundred categories.

In the described embodiment, feature space is subdivided into regions with assigned meaning. Assigning meaning to a particular prototype is done by searching for the appropriate region in the feature space as defined by the feature boundaries. In the real-time handwriting recognition system, it is important to make such a search computationally efficient, so in the described embodiment a concept of tree-based representation is used. Tree-based data structures are known in prior art [Friedman, Classification Trees] under the name of classification trees. Because of successive subdivision of the feature space, classification trees permit a logarithmic time access to the data. These structures are also very convenient for constructing the data representations in an inductive way, without a priori assumptions on the final detailed form of the architecture of data representation. They may be described as data driven data representations.

The tree structured network of the present invention may also be thought of as a tree based feedforward neural network, where the nodes and dependencies of the tree are treated as nodes and interconnections of the neural network.

The root of the tree is a null node. All subsequent nodes are assigned an integer value of layer. The nodes of the first layer are the topological prototypes and they are the children of the root node. The children of each prototype node are in one-to-one correspondence with the regions in the static feature space obtained by its initial subdivision. Each successive subdivision of the initial region produces children of each subdivided region with a consecutively assigned value of the layer. The terminal nodes of the tree are in one-to-one correspondence with the finest subdivision of the static feature space (i.e. they represent the assigned meaning to the prototype).

The process of constructing the data representation consists of finding the errors in classification for each terminal node and its subsequent subdivision in such a way as to reduce the error by the largest amount. The process of assigning of meaning to an input comprises a traversal of the tree until a terminal node is reached. In the described embodiment, both of the processes are incorporated in the routines SymBoundXX(), which assigns meaning to a single stroke. Similar routines are used for assignment of meaning to multiple strokes and they will be described in a later section on position discrimination.

The pseudo-code for all SymBoundXX() routines except SymBound00() and SymBound01() is shown in FIG. 25. The pseudo-code for routines SymBound00() and SymBound01() is the same as that shown in FIG. 25 except that for these two routines the corresponding prototypes cannot be rejected, hence there is no false boundary assignment. Thus, for SymBound00() and SymBound01() the first three lines of the pseudo-code shown in FIG. 25 are absent.

When called, the SymBoundXX() routine first assigns values to the false boundaries (step 400). If any of the false boundaries for a given SymBoundXX() is true, then that indicates that none of the meanings associated with that prototype could be true and the prototype can be rejected. The false boundaries enable the system to quickly eliminate "junk" and avoid assigning meaning to it.

Assigning values to the false boundaries is done with code of the following form:

<fbound[0]>=A*feat[0]+B*feat[1]+. . . <0;

<fbound[1]>=C*feat[0]+D*feat[1]+. . . <0;

<fbound[k]>=E*feat[0]+F*feat[1]+. . . <0;

where A, B, C, D, E, and F are integer coefficients and feat[i] are some combination of features (e.g. bseg[], nseg[], pseg[], etc.). The index k ranges from 0 to <BRCHNUM>−1 (i.e., 0 to 8).

If any false boundary is TRUE, SymBoundXX() rejects that prototype and returns a NULL_SYM (step steps 402–404). On the other hand, if none of the false boundaries is true, SymBoundXX() assigns values to feature boundaries (step 406). The pseudo-code for performing that function is as follows:

```
<bnd[0]>=G*feat[0]+H*feat[1]+. . . ;

<bnd[1]>=I*feat[0]+3*feat[1]+. . . ;

<bnd[m]>=K*feat[0]+L*feat[1]+. . . ;,
``` where G, H, I, J, K, and L are integer coefficients and as before feat[i] are some combination of features. The <bnd[]> variables are also referred to as the linear boundaries of the prototype neural network. The index m ranges from 0 to <BNDRNUM>. The linear boundaries define hyperplanes that divide feature space into regions. In the described embodiment, only a maximum of 80 hyperplanes were required to successfully and accurately assign meanings to prototypes.

After SymBoundXX() has assigned values to the feature boundaries, it then assigns values to the true boolean boundaries on the second layer of the neural network tree (step 408). The pseudo-code for performing that function is as follows:

```
<tbound[0]=bnd[i]>0;>

<tbound[1]=bnd[j]>0;>

<tbound[n]=bnd[k]>0;>,
``` where the index n ranges from 0 to <BRCHNUM>−1. The variables <tbound[]> correspond to the possible meanings of the prototype.

After the values for <tbound[]> are assigned, SymBoundXX() splits the nodes of the neural network tree and, if needed, augments the prototype (step 410). The code for performing those functions (including augmentation) has the following form:

```
if(tbound[i]
        &&(bnd[j] > 0)
        &&(bnd[k] > 0)
        . . .
        &&(bnd[p] > 0)
)
tbound[i] = FALSE;
tbound[q] = TRUE;
iProt[q].Bit += M;
iProt[q].Off −= N;
iProt[q].Fit += P*bseg[0] + Q*bseg[1] +. . . ;
}
``` where M, N, P, and Q are integers. In particular, M equals the total number of augmented segments, N equals the number of augmented segments which come before the prototype, and <.Fit> is increased by an amount equal to the combined length of augmented segments.

The process of augmentation occurs when any of the <bnd[j]>, <bnd[k]>, . . . , <bnd[p]> has one of the following forms:

```
<bnd[j]>=<befd[s]>=DIR;

<bnd[j]>=<aftd[t]>=DIR;
``` where 8<befd[]> and <aftd[]> refer to the directions of segments immediately next to prototype's segment directions, and DIR is one of the four directions <DO,UP, RI,LE>.

Prototype augmentation is employed because the augmented prototype string may be occurring too infrequently to be included in the prototype table <protTbl[]>. Or, though the augmented prototype is in the <protTbl[]>, the structure of the subtree whose root is the augmented prototype is more complicated than that of the subtree with its root in unaugmented prototype and, therefore, it is easier to construct the error-free data representation beginning with an unaugmented prototype. If augmentation does occur, then the appropriate corrections must be made in the detected prototype's length of direction string, its offset, and screen length. This is done by adding appropriate quantities to the instances of the array of structures <iProt[]>, each element of which is a structure <PROT>, described above. The structure <iProt[]> describes a single prototype and is introduced in connection with augmentation.

In the above descriptions all integers (the weights of the neural network) are quantized to three to four bits precision, and on average only between two to three weights are used to connect a node of the network to the subsequent layer. In others words, each node of the tree has on average between two to three children.

The procedure to reject a prototype, namely, RejectSym() (shown in step 404 of FIG. 25), determines if any of the false boundaries is true. If any of the false boundaries is true, the prototype is assigned a null meaning <NULL_SYM'. The pseudo-code describing the operation of RejectSym() is as follows:

```
bool RejectSym(PROT*aProt)
{
    for(count = 0; count < BRCHNUM; count++){
        if(fbound[count]) return(TRUE);
        iProt[count] = *aProt;
    }
    return(FALSE);
}
```

The procedure to find the first true boundary searches through all true boundaries until it finds one to be true (step 412). When this happens, the index of the first true boundary is returned and the possibly augmented attributes of the prototype are copied to the structure <PROT> whose pointer <*aProt> is the input of both the routine AssignSym() and SymBoundXX(), otherwise null meaning is assigned to the prototype (step 414).

The pseudo-code describing the operation of AssignSym() is as follows:

```
short AssignSym(PROT *aProt)
{
    for(count = 0; count < BRCHNUM; count++)
        if(tbound[count]){
            *aProt = iProt[count];
            return(count);
        }
    return(NULL_SYM);
}
```

This procedure is used for assigning those meanings of the prototype which are contained in the <protTbl[]> table. There are instances when there are more meanings of a prototype than <BRCHNUM>(=9). In that case, meaning assignment is done by assigning a meaning to a global variable <sym> within the routine SymBoundXX() as in:

```
SymBoundXX()
{
    ...
        <sym> = ASCII code;
        return(-1);
    ...
},
``` where . . . stands for other code described above. If the SymBoundXX() routine returns −1, then in the routine PropDisc(), instead of <protTbl[]> the variable <sym> is used for assignment of meaning.

This concludes the description of compiling of the topological feature representation of the meaningful subsets of the input stroke where one topological representation is compiled for each spatial scale of the scale representation of the input. As was described above these topological representations are compared on the basis of the screen length occupied by the largest meaningful interpretation at each scale and the scale for the largest interpretation is considered the best representation of the single stroke image. From then on, only the topological representation for the winning scale is used for further processing, namely, for clustering of groups of strokes into meaningful clusters.

Position Discrimination and Clustering

Position discrimination and clustering refers to assigning meaning to multiple strokes. Similar to what was described in the preceeding section of proportion discrimination, assigning of meaning to a single stroke is done in the routine SymRec() by calling another routine, namely, FindProt() (see FIG. 17). The result of the proportion discrimination is a list of matched meaningful prototypes together with the information on the meaning, position, size, etc. The returned information is described by the structure PINFO (see above).

In practice, typically more than one stroke is needed to make a symbol or a command. As a result the meaning of a group of strokes is typically a character string with more than one character in the string. To assign a character string to a group of strokes it is therefore necessary to subdivide it into meaningful subgroups or clusters in some optimal way. One can force a user to do the clustering by requiring that only one meaningful symbol (possibly with more than one stroke) is entered into a single special area demarked from others. Commonly, in prior art such areas take the form of boxes or combs on the computer screen. Such devices are cumbersome to use for they take much space, and interfere with the visual perception of the image of the input.

In the described embodiment, a minimum of restrictions are put on the user and the user can write free form so long that he lifts the pen between two separate symbols. This is achieved by two processes: clustering and position discrimination. Clustering relates to a process of separation of a given group of strokes into clusters each of which has a meaning of a single character. An example would be a separation of a group of six horizontal and two vertical strokes into two clusters, each containing three horizontal and one vertical stroke, each of the two clusters having strokes in a particular spatial relations, so that each cluster could be assigned meaning 'E' and the whole group could be assigned meaning of a character string "EE".

The phrase position discrimination refers to a process for assigning a single character meaning to a given group of strokes in the case when the group can be assigned a single meaning. An example of such process would be assignment of 'E' to three horizontal and one vertical strokes in a certain spatial positions.

Clustering and position discrimination are accomplished by calling a number of routines from within the routine FindSyms(). This routine is called from within the routine SymRec() after the best scale representation is obtained with regard to a predetermined signal-to-noise ratio (see step 342 of FIG. 17).

The pseudo-code describing the operation of the routine FindSyms() is shown in FIGS. 26A–B. FindSyms() has void output and its inputs are a pointer to structure <SEGM>, which describes the best scale representation, a pointer to structure <BINFO>, which describes clustering and assignment of meaning to current group of strokes, a pointer to structure <BINFO>, which describes clustering and meaning assignment to previous group of strokes (see below on the definition of the current and the previous group of strokes), and a pointer to structure <PINFO>, which describes the possible assignments of meaning to the last stroke entered on the tablet.

The main functions of the routine FindSyms() are:

1. Determine if the new stroke belongs to the current stroke buffer (i.e., the current group of strokes).

2. If the new stroke does belong to the new stroke buffer, increment current stroke buffer, provided that the number of strokes in the buffer does not exceed a certain number (<BUFFNUM=32). If the number of strokes does exceed that threshold number, remove the leftmost entry before putting in a new entry.

3. If the new stroke does not belong to the new stroke buffer, save the current stroke buffer as the old stroke buffer and intitialize a new current stroke buffer. Then, add the last stroke as the first entry into the new current stroke buffer. Note that the system remembers two buffers in the past. That is, it maintains information about current stroke, about the stroke before current stroke and the stroke that is before the previous stroke. The need for two step memory is necessitated by the gesture based editor user interface.

4. Scan the current stroke buffer left to right and do clustering and meaning assignment to the buffer.

The stroke buffer mentioned in the above description is the principle data structure which describes the current group of strokes. It contains necessary information about each stroke, their spatial relations and point counts of the beginning and the end of each stroke and each stroke's segments which allow image manipulation of the strokes and their segments by the Editor. This data structure is used by a number of variables that are relevant to FindSyms():

1.<BUFF timeBuff[BUFFNUM]>—this is an array of <BUFFNUM> (i.e., 32) structures, each of which describes a single stroke of the current group of strokes.

2. <BUFF oldTimeB[BUFFNUM]>—this is a time ordered array of structures, each of which describes a single stroke of the group of strokes before the current group of strokes. (It is also referred to as a time ordered stroke buffer descriptor.)

3. <BUFF olOlTimeB[BUFFNUM>—this is an array of structures, each of which describes a single stroke of the group of strokes before the group of strokes represented by <oldTimeB[]>.

4. <BUFF windBuff[STRKNUM>—this is an array of <STRKNUM> (i.e., 4) structures which is a subset of the timeBuff structures. It is called the window stroke buffer. The strokes of this array constitute a contiguous group of strokes in the sense of their x-coordinate position. This structure is used in left to right scanning and subsequent clustering of the current group of strokes (to be described);

5. <ONEBUFF typeBuff[STRKNUM> is an array of structures, each of which describes one meaningful matched prototype assignment to strokes of the window stroke buffer <WindBuff[]>. This data structure is used in proportion discrimination. There is an instance <.Olp> of this structure which is described below.

The details of these structures are shown in FIGS. 27A–C. The <BUFF> structure is an array of <SYMPROT> structures. The <SYMPROT> structure contains information about a matched prototype. The <.Sym> instance gives the meaning of the prototype; the <.Siz> instance is a <COORD> structure specifying the size of the prototype; the <.Pos> instance is another <COORD> structure specifying the position of the prototype; the <.Prt> instance is <PROT> structure containing information about the prototype; and the <.Bpt[]> instance is a <COORD> structure specifying the prototypes binding points (to be described later).

The <PROT> structure which was described previously is shown in FIG. 20. Recall that it describes a single matched prototype and contains information about its meaning, its number in the prototype table, its offset within the direction string, its bit length, the bit length of the input direction string, and pointers to the beginning and end of the prototype within the point array.

The <ONEBUFF> structure shown in FIG. 27C is a structure that describes one meaningful matched prototype assignment. The <.Sym> instance is a <SYMPROT> structure containing information about a selected one of the prototypes from the <typeBuff[]> array. The <.Olp> instance identifies the number of the largest prototype on the list from which the prototype described by <typeBuff[]> was chosen. This is used by some of the neural networks for position discrimination.

The FindSyms() operates on a <COUNT> structure called <tick>. The <COUNT> structure, which is shown in FIG. 3, contains global counting variables and editor information. FindSyms() also keeps track of a current and two prior cluster buffers. To do so it maintains three data structures, namely, <buf> (a buffer holding information about the current cluster), <oldBuf> (a buffer holding information about the previous cluster) and <olOlBuf> (a buffer holding information about the cluster before the previous cluster). Similarly, Findsyms() maintains three counting structures of the type <COUNT> containing global counting variables for each of the cluster buffers. The structures are referred to as <tick>, <oldTick> and <olOlTick>. And it maintains three points arrays, one for each of the cluster buffers. The points arrays are designated <pntArr[]>, <oldArr[]>, and <olOlAr[]>, respectively.

The manner in which FindSyms() uses these data structures will now be described in greater detail.

Upon being called, FindSyms() invokes a routine named BindNewStroke() which determines whether the new stroke represented by the <PINFO> structure is close to any strokes in the stroke buffer represented by the <BINFO> structure (step 420). BindNewStroke() accepts as input <SEGM>, <BINFO> and <PINFO> structures. Based upon how close the new stroke is to the previous strokes, FindSyms() assigns the output of BindNewStroke() to <tick.Bind>, the instance of the <COUNT> structure that indicates closeness.

BindNewStroke() outputs one of three values, namely, −1, 0, or 1. If <tick.Bind> equals −1, this means that the stroke is the first stroke of the user's session with the Recognizer. If <tick.Bind> equals 0, this means that the last stroke is spatially far away from each of the strokes of the current group of strokes in the stroke buffer. And, if <tick.Bind> equals 1, this means that the last stroke is spatially close to at least one of the strokes of the current group of strokes.

NewBindStroke() determines closeness by computing (1) the average size of the clusters in the current group of strokes and (2) the smallest distance between the last stroke and all the clusters in the current group of strokes and then comparing the two. When determining the distance between strokes, the center of a box bounding the stroke is used as the location of the stroke. If the distance between strokes is more than a certain multiple of an average size of a character, then the last stroke is considered far, otherwise it is considered close. Different multiples may be used for distance in x-direction (horizontal) and y-direction (vertical).

It is the first stroke

If the last stroke is determined to be the first stroke of the user's session (steps 422 and 424), the recognizer only needs to perform initialization FindSyms() sets the number of strokes on the current stroke buffer (i.e., <tick.Buff>) to zero (step 450); sets the number of clusters on the current cluster buffer (i.e., <tick.Ansr>) to zero (step 452); and calls another routine to initialize the cluster buffer (step 454). After the cluster buffer <buf> is initialized, FindSyms() sets the number of strokes on the old stroke buffer (i.e., oldTick.Buff> to zero (step 456); sets the number of strokes on the old cluster buffer (i.e., <oldTick.Ansr>) to zero (step 458); sets the number of points of the old points buffer (i.e., <oldTick.Pnts>) to zero (step 460); and then calls the previous routine to initialize the old cluster buffer (step 462). FindSyms() then repeats the last sequence of steps for <olOlTick> and <olOlBuf> (steps 464–470).

The last stroke was close:

If the last stroke was close to a previous stroke in the cluster buffer, FindSyms() calls a PutList() routine that puts the prototype list for that stroke into the stroke buffer (step 472). After the stroke buffer has been updated, FindSyms() calls another routine ScanBuff() that scans the updated stroke buffer and performs clustering and position discrimination (step 474). Both PutList() and ScanList() will be described in greater detail shortly.

The last stroke was far

If the last stroke is far from the other strokes in the cluster buffer, FindSyms() saves the current and old cluster buffer and prepares to generate a new cluster buffer. In other words, FindSyms() shifts the contents of <oldbuf> to <olOlBuf> (step 426) and shifts the contents of <buf> to <oldBuf> (step 428). FindSyms() also saves the contents of <oldTick> in <olOlTick>, replacing any information that had been stored there from before (step 430). Before storing <Tick> into <oldTick>, FindSyms() updates the <.Pnts> instance of <olOlTick> (i.e., the number of points in the cluster buffer) with the value of the index to the last point of the last stroke of the cluster buffer, namely, oldTimeB[oldTick.Buff1].Sym.[0].Prt.Pto (step 432). Note that the index to this information is contained in <oldTick.Buff> and must be used before <oldTick> overwritten with new information.

After updating the information in <olOlTick>, FindSyms() stores the contents of <buf> and <Tick> in <oldBuf> and <oldTick>, respectively (steps 434–436).

Then, FindSyms() saves the contents of the points arrays (step 438 and 440).

After storing the contents of the old structures, FindSyms() computes a new point count for the current cluster buffer by using the contents of a structure <strArr> (step 442). There are two instances of <strArr>, namely, <strArr.x> and <strArr.y>, both of which are indexes into the point array containing the actual points of the input. The <strArr.x> instance is an index of the first point of the most recent stroke and the <strArr.y> instance is an index of the last point of the most recent stroke. The total number of points for the stroke is equal to the difference between these two numbers plus 1.

Then, FindSyms() recomputes a new point array for the new stroke in the cluster buffer (step 444). This is done by shifting the information in the point array up by <strArr.x>, the actual first point of the most recent stroke. After recomputing the new point array, FindSyms() recomputes new pointers to the point array in PINFO structure (step 446). It does this for each of the meanings or interpretations in the PINFO structure. Before recomputing the new pointers, FindSyms() checks whether the pointer in the PINFO structure to the end of the prototype is set equal to zero. If it is, indicating that there is no stroke for that entry, FindSyms() exits this loop. If FindSyms() determines that there is a actual entry in PINFO, it decrements the pointers to the beginning and the end of the prototype by an amount equal to the location of the first point of the most recent stroke. preforming a coordinate transformation After completing the update of all of the entries in the PINFO structure, FindSyms() saves the old stroke buffer and the current stroke buffer (steps 448–449).

Recall that if the stroke is close to another stroke in the current cluster buffer, FindSyms() calls PutList() to place the prototype list for that stroke into the stroke buffer. PutList() performs the following functions:

1. It makes room in the stroke buffer array for new strokes.
2. It assigns values of the stroke descriptor <PINFO *str> to the time ordered stroke buffer descriptor <timeBuff [STRKNUM]>, converting tablet coordinates of features into screen coordinates.
3. When editing is on (i.e., <tick.Edit>=TRUE), it assigns certain types of strokes null meaning for use in segmentation error correction and space insertion functions of the Editor.
4. It assigns a value to an array which is a pointer from the time ordered stroke buffer to the position ordered stroke buffer.
5. Calls a procedure FindBPts() which calculates and assigns to the time stroke buffer entries values of features used in position discrimination.
6. Increments stroke buffer count (<tick.Buff>) for each stroke added to the time stroke buffer.

The inputs of the procedure PutList() are a pointer to the structure SEGM, which describes the dynamic features of the last stroke and is used for computation of proportion discrimination features, a pointer to the structure PINFO, which describes the list of meaningful matched prototypes of the last stroke and is in large part copied into an entry of the time stroke buffer <timeBuff[]> for further use in position discrimination, and a pointer to the structure BINFO which contains information about clustering of the current group of strokes.

The procedure has no output.

The details of the operation of Putlist() are shown in FIGS. 28A–B. Initially, PutList() removes from the time stroke buffer <timeBuff[]> all the entries that are necessary to make room for new stroke(s) (step 500).

After making room for the new stroke, PutList() prepares to store the stroke's matched prototype list in the time stroke buffer. Before storing each matched prototype, however, PutList() first determines whether the matched prototype is interpreted as either '/' or '\' (step 502). Note that there are six prototypes that can have those meanings. PutList() simplifies the subsequent recognition process by forcing the prototypes having these meanings to be either prototype 00 or prototype 01. It does this by comparing the horizontal size of the stroke with its vertical size (step 504). If the horizontal size is larger than the vertical size, PutList() sets the prototype number for the stroke to '01' (step 506); otherwise, it sets the prototype number to '00' (step 508).

After simplifying the topological interpretation of the stroke if possible, PutList() records the information about the most recent stroke's matched prototype in time stroke buffer (steps 510–20). In doing this, PutList() performs a transformation from tablet screen coordinates to pixels for the size and position information.

Recall that the locations of points for any stroke on the matched prototype list are locations of scaled points, i.e., they reflect subsampling at different scales. For image manipulation by the Editor, however, the actual first and last points of the stroke are required. This information is contained in the <strArr> structure since it records the point number of the beginning and the end of the last stroke at the time when these points are retrieved from the ring buffer of points. PutList() uses the information in <strArr> to replace the locations of the first and last sampled points with the locations of the actual first and last points of the stroke.

To perform this update, PutList() first checks whether it is close to another stroke in the cluster buffer (i.e., is tick.Bind=1). If it was added to a cluster buffer with other strokes, the PutList() sets the location of its first point equal to <strArr.x> and the location of its last point equal to <strArr.y> (step 522–54). On the other hand, if it represents the first stroke of a new cluster buffer, PutList() sets the location of its first point equal to zero and the location of its last point equal to <strArr.y>–<strArr.x> (step 526–528).

If user is in the editing mode, then certain strokes are not considered as meaningful but are considered to be gestures that control editing. For example, a single tick mark is used to tell the system not to consider a cluster of strokes as meaningful. This is done by assigning a special HAPY__SYM meaning to the first and second prototype list entries into the time buffer of the tick mark.

In the case of the tick mark editing gesture, if <tick.Edit> indicates that editing mode is turned on (step 530), PutList() checks whether the first prototype on the list of prototypes for the stroke is number zero (i.e., the first prototype in the prototype table) and has one of the following meanings: '/', '\', or '1' (step 532). If those conditions are satisfied, indicating that the stroke is an editing gesture, PutList() stores the HAPY__SYM symbol as the meaning of the prototype for that stroke in the time stroke buffer (steps 534–536). The presence of HAPY__SYM eliminates printing of the gesture. PutList() then stores a NULL__SYM as the meaning for all remaining meanings of that prototype of that stroke in the time stroke buffer (step 538).

Another gesture used in the editing mode is an L shaped stroke (e.g. A). Such a stroke is used to insert an empty space in a line of symbols. PutList() checks for the presence of these editing gestures. The L-gesture is used to determine the extent and position of space insertion. After this has been determined the gesture is removed from all buffers by an Overlap() routine described later.

When editing mode is turned on, to determine whether the user has requested a space insertion, PutList() checks if the meaning of the first entry on the prototype list is either 'L' or 'Á' (step 540). If either of those two meanings are indicated, PutList() stores a HAPY__SYM as the meaning of the stroke in the time stroke buffer (step 542–544). Doing this ensures that no subpart of the editing gesture will be treated as part of any meaningful cluster. Than, as before, PutList() stores a NULL__SYM as the meaning of all of the remainder of alternative meanings of the stroke in the time stroke buffer (step 546).

After checking for editing gestures, PutList() assigns a time order to the last stroke (step 548). To store the time order information, PutList() uses an array called timeOrder []. It keeps track of which stroke is which after timeBuff array is later sorted according to x-positions of its entries.

Then, PutList() determines the coordinates of the special points (i.e., the binding points) on each matched prototype in the stroke buffer (step 550). The distances between the binding points will later be computed and used as position discrimination features. PutList() calls another routine called FindBPts() to determine the coordinates of the binding points of the matched prototypes. After computing the binding points, PutList() increments the global variable which counts the total number of strokes in the current stoke buffer (step 552).

The features computed by the FindBPts() procedure (i.e., the binding points) are needed for proportion discrimination and clustering. For each matched prototype, the binding points are the screen coordinates of special points of the matched part of the stroke. For the different prototypes, the location of the binding points depends on the topological complexity of the prototype.

The location of the binding points for the different categories of prototypes are defined as follows.

For prototypes consisting of one segment, the binding points are:

1. the coordinates of the beginning of the matched portion of the stroke;
2. the coordinates of the end of the matched portion of the stroke; and
3. the coordinates of the center of the smallest rectangular box surrounding the matched portion of the stroke.

For prototypes consisting of two segments, the binding points are:

1. the coordinates of the beginning of the matched portion of the stroke;
2. the coordinates of the end of the matched portion of the stroke; and
3. the coordinates of the end of the first segment of the matched portion of the stroke.

For prototypes consisting of three segments, the binding points are:

1. the coordinates of the beginning of the matched portion of the stroke;
2. the coordinates of the end of the matched portion of the stroke; and
3. the coordinates of the point on the middle segment of the matched portion of the stroke where the value of x-coordinate achieves minimum for prototype LDR, or where the value of x-coordinate achieves maximum for prototype RDL, or where the value of y-coordinate achieves minimum for prototype DRU, or where the value of y-coordinate achieves maximum for prototype URD or for any other three segment prototype the coordinate of the smallest rectangular box surrounding the matched portion of the stroke.

Finally, for prototypes with four or more segments, the binding points are the coordinates of the comers of the smallest rectangular box surrounding the matched portion of the stroke.

These features are used at later stage to derive features used by a collection of neural networks each of which assigns meaning to a collection of strokes of a particular topology. Additional features may be computed within each neural network.

As indicated earlier, the binding point features are stored in instances of the structure <timeBuff>, namely, COORD timeBuff[BUFFNUM].Sym[ALTSNUM].Bpt[BIND-NUM]

Feature computation is done for each matched prototype of the input and up to BINDNUM (=4) coordinates are used. The choice of binding points as features is particularly useful because of their small number, their partial invariance with respect to rotations of the input strokes and the simplicity of their computation.

The routine FindBPts() operates as shown by the pseudocode of FIGS. 29A–D. It receives as input two structures, namely, <SEGM> containing information about the dynamic features of the segments within the stroke and <PINFO> containing the topological representation of the stroke. First, FindBPts() assigns to an intermediary variable 'len' the number of segments in the matched prototype (step 600). This information is found within the <.Prt[0].Bit> instance of the <PINFO> structure.

After this initial assignment, FindBPts() then enters a for-loop in which it goes through all matched prototype on the list (except the first one which describes the input itself) and assigns position discrimination features (i.e., binding points) to the matched prototypes (step 602).

Within the for-loop and for the given matched prototype, FindBPts() assigns to various intermediate variable values obtained from the <PINFO> structure, <str>. To a variable 'off' it assigns the offset of the first segment of the matched prototype from the beginning of the input direction string (step 604). To another variable 'bit' it assigns the number of segments of the matched prototype (step 606). To yet another variable 'prt' it assigns the number of the matched prototype on the prototype list protTbl[] (step 608). To another variable 'rol' it assigns the value of the input string reversal value for that matched prototype (step 610). These variables are used elsewhere in the FindBPts() routine.

After making the assignments to the intermediate variables, FindBPts() enters another for-loop in which it first initializes the values of the binding points for the given matched prototype within the stroke buffer <timeBuff[]> to fictitious values (step 612).

Depending upon the number of segments within the matched prototype, FindBPts() then executes a segment of code which makes the assignment of actual values to the binding points. If there are less than four segments in the matched prototype, FindBPts() assigns the beginning and the end of the matched prototype as first and second entries in the feature array (i.e., Bpt[]). To determine whether there are less than four segments, FindBPts[] checks the number of the prototype in the protTbl[] (i.e., the prototype list) (step 614). Note that the prototypes are ordered in protThl[] in order of increasing complexity and a number of less than 14 on the prototype list (i.e., protTbl[]) indicates that there are less than four segments in the prototype.

If the input string was not reversed to match this prototype (i.e., 'rol' equals zero—step 616), FindBPts() assigns the first point of the first segment and the end point of the last segment to Bpt[0] and Bpt[1], respectively (steps 618–620). If the input string was reversed (step 622), FindBPts() takes this into account and makes the assignments of the values to Bpt[0] and Bpt[1], accordingly (step 624–626). In either case FindBPts() also assigns an intermediate value to a variable 'midpos' corresponding to the location of the first segment plus one (step * and *).

If for some reason 'rol' equals neither 1 nor 0, indicating an error, FindBPts() assigns zero values to both Bpt[0] and Bpt[1] (steps 628–634).

After assinging values to the first and second features (i.e., Bpt[0] and Bpt[1]), FindBPts() checks if the prototype number is less than 2, indicating that it has only one segment (step 636). If there is only one segment, FindBPts() sets Bpt[2], the third feature, equal to the position of the prototype (step 638).

If the prototype has more than one segment, FindBPts() checks whether it has only two segments (640). It will have only two segments if its number on the prototype list at least as great as two but less than six. If the matched prototype has only two segments, FindBPts() sets Bpt[2] equal to the location of the first segment as identified by the variable 'midpos' (step 642).

If the prototype has more than two segments, FindBPts() checks whether its prototype number is equal to 6, 7, 8, or 9 (steps 644, 648, 652, and 662). If the prototype number is equal to 6, FindBPts() sets Bpt[2] equal to the x-y coordinates of the point of minimum extension of the middle segment in the y direction (step 646). If the prototype number is equal to 7, FindBPts() sets Bpt[2] equal to the x-y coordinates of the point of maximum extension of the middle segment in the y direction (step 650).

If the prototype number is equal to 8, FindBPts() checks whether the prototype meaning is a left bracket (i.e., '[') (step 654). It the prototype meaning is a left bracket, FindBPts() ets the x coordinate of Bpt[2] equal to the average of the sum of the x coordinates of the end points of the second and third segments (step 656) and it sets the y coordinate equal to the average of the sum of the y coordinates of the second and third segments (step 658). Otherwise, if the prototype meaning is not a left bracket, FindBPts() sets Bpt[2] equal to the x-y coordinates of the point of minimum extension of the middle segment in the x direction (step 660).

Finally, if the prototype number is equal to 9, FindBPts() sets Bpt[28] equal to the x-y coordinates of the point of maximum extension of the middle segment in the x direction (step 664).

For all other three segment prototypes, FindBPts() sets Bpt[] equal to the x-y coordinates of the position of the prototype (step 666).

FindBPts() treats prototypes having the meaning of either '/' or '\' as a special case (step 668). If any of the prototype's meaning is '/' or '\', then, regardless of the number of segments, FindBPts() sets Bpt[2] equal to the prototype's position (step 670). Then, FindBPts() checks the orientation of the prototype and assigns values to Bpt[0] and Bpt[1 to properly reflect the orientation of the segment (steps 672 and 682).

For all prototypes having less than four segments, FindBPts() then makes the fourth feature (i.e., Bpt[3])) equal to the second feature (step 684). Though Bpt[3] is not used for such prototypes, this step makes sure that the information stored in the fourth feature is known information.

With one exception for all other matched prototypes (i.e., those having more than three segments), FindBPts() chooses the four locations of the comers of the box surrounding the prototype as the four features. It begins by setting Bpt[0] to the coordinates of the upper left corner and then moves clockwise around the box setting Bpt[1], Bpt[2] and Bpt[3] accordingly (step 696–710).

The one exeception is prototype number 20 in the protTbl []. For that matched prototype FindBPts() computes the binding points as shown in steps 688–694 of FIG. 29D.

After computing the binding points, FindBPts() rescales the values to convert them from tablet values to screen values (steps 712–714). This allows the program to use 16 bit instead of 32 bit precision later on.

Scanning:

Once the matched prototypes features are assigned to the time stroke buffer and additional position discrimination features has been computed, the system performs scanning of the current stroke buffer left to right. The purpose of this is to separate the current stroke buffer into clusters of strokes and assign meaning to each cluster in some optimal way. In order to save time, some of the possible clusters are ruled out. This is achieved by scanning. For example, whenever a new stroke is close to the current stroke buffer, the system orders the new buffer so that the x coordinates of the entries increase monotonically and then determines a potential area of influence of the new stroke within the space ordered stroke buffer.

Thus, the system makes a list of strokes that it considers to be close to the new stroke and then scans the list left to right to cluster and assign meaning. The area of influence of a stroke in the space ordered stroke buffer is defined as the first and the last entry in the stroke buffer such that all the strokes in between may potentially change meaning with addition of the last stroke.

Since the maximum number of strokes in a meaningful cluster is STRKNUM (=4), the system creates an influence list and puts on that list all the strokes that are up to STRKNUM places ahead or behind of the most recent stroke in the space ordered stroke buffer. In addition, if any of the strokes on this list are members of meaningful clusters whose members are not on the list, these missed members are also added to the list.

Once the influence list is created, the system scans the list by taking the first STRKNUM entries from the list and putting them into the structure named <windBuff> which is analogous to <timeBuff> except that the array of structures has STRKNUM (=4) entries and not BUFFNUM (=32) entries. Since the elements of the list are ordered by their position's x-coordinate, the entries in the <windBuff> structure are always contiguous on the screen.

After loading the strokes into the window buffer, the system finds the best cluster within the window, removes the elements of the found cluster from the window buffer and adds more elements from the influence list, if any. By successive assignment of the clusters, the system scans all the strokes in the influence buffer and reassigns the clusters meanings.

Searching for a cluster within the window buffer is done by calling a routine InterList(), to be described below.

The advantage of this method of scanning is that it allows one to enter new strokes regardless of the position of the previous strokes. That is, the user is not constrained in only one prescribed order (e.g. from left to right). This enables the user to have greater flexibility in interacting with the computer via a tablet.

The pseudo-code describing the operation of ScanBuff() is shown in FIG. 30. The input to ScanBuff() is the stroke buffer. When called, ScanBuff() assumes that the last stroke is part of a separate cluster and puts it as such into the cluster buffer (step 750). Then, ScanBuff() checks whether there is only one stroke in the stroke buffer and returns to the calling routine if there is (step 752). Next, ScanBuff() checks if there are exactly two strokes in the stroke buffer (step 754). If there are exactly two strokes and one is a gesture while the other is a circle around (i.e., if ModeFlag() is true), ScanBuff() treats this as a gesture and stops scanning.

If neither of the conditions of steps 752 or 754 are satisfied, ScanBuff() proceeds with scanning by calling a routine PosnOrder() which reorders the entries in the stroke buffer in order of increasing x-coordinate of their position (step 756). Then, ScanBuff() calls an InitRem() routine that finds the beginning and the end elements of the region of influence of the last stroke (step 758). Recall that the region of influence is defined as spanning the stroke buffer from four strokes before the current stroke to four strokes after the current stroke.

After locating the ends of the region of influence, ScanBuff() performs a number of initialization steps. It initializes a variable 'scanCnt' to begScan, the index of the first stroke in the region of influence (step 760). The variable 'scanCnt', which is used to control the progress of scanning, is incremented during scanning. When it reaches 'endScan', the index of the last stroke in the region of influence, scanning stops.

ScanBuff() also initializes another variable 'foundFeet' to zero (step 762). The variable 'foundFeet' is used during scanning to count the number of strokes that are found to be within a cluster. If the cluster is accepted, then 'foundFeet' determines the number of strokes from the influence region that are to be removed to make room for new strokes.

ScanBuff() calls an InitWind() routine to initialize the window buffer (step 764), which is a subset of the stroke buffer. Its size is the maximum number of strokes in a cluster (i.e., 4). InitWind() sets the contents of the window buffer to zero. ScanBuff() then calls a LoadWind() routine to load the window buffer from the scan buffer (step 766) and calls an InitClust() routine to initialize certain variables describing the window cluster (step 768).

After completing the initialization steps and loading the window buffer, ScanBuff() enters a while-loop in which it scans so long as there is something within the scan buffer (step 770). At the beginning of the while-loop, ScanBuff() again initializes 'foundFeet' to zero (step 772) and initializes certain variables describing the window cluster (step 774).

Then, ScanBuff() calls the InterList() routine to find the "best" cluster from the strokes in the window (step 776). InterList() returns a new value for <foundFeet>, indicating the number of strokes in the found cluster. InterList(), which will be described in greater detail shortly, finds the largest meaningful cluster among the strokes of the window buffer. If the best cluster has only one stroke, ScanBuff() assigns that cluster values from the window buffer. If the window cluster's strokes are part of a cluster contained in the cluster buffer, ScanBuff() removes that cluster from the cluster buffer by calling a CleanBuff() routine (step 778). CleanBuff() removes all meanings for all clusters from the cluster buffer that were used by the routine InterList() to construct the largest meaningful cluster. After ClearBuff() returns, ScanBuff() calls a PutClust() routine to put the found cluster into the cluster buffer (step 780). That is, it assigns the cluster description of the window cluster to the cluster description in the cluster buffer.

After transferring the found cluster to the cluster buffer, ScanBuff() increments the scan count variable (i.e., scanCnt) by the number of the strokes in the best window cluster (i.e., foundFeet) (step 782). Then, ScanBuff() calls the InitWind() routine to shift the strokes in the window buffer to the left thereby removing the strokes in the best window cluster (step 784). This, of course, only occurs if the strokes that are removed from the window buffer are the first strokes in the window buffer. If the found cluster does not include the first strokes in the window buffer, shifting cannot occur until ScanBuff() during a later cycle of the while-loop identifies the first strokes in the window buffer as part of the best window cluster.

After calling InitWin(), ScanBuff() checks if strokes were removed by InitWind() (step 786). If strokes were removed, ScanBuff() calls LoadWind() to load more strokes into the window buffer filling the space left by removing the other strokes (step 788).

Then, ScanBuff() reinitializes the window cluster descriptor (step 790) and returns to the beginning of the while-loop to continue scanning.

Upon completion of scanning, ScanBuff() calls a BufOrder() routine to reorder all the entries in the cluster buffer in order of increasing x-coordinate of their position on the screen (step 792). Note that the order in which the clusters are added to the cluster buffer is in an order determined by a measure of which cluster is most meaningful. Thus, after scanning the cluster buffer is not spatially ordered and a reordering must occur.

After reordering, ScanBuff() calls an OverlapAnsr() routine to determine if there is any overlap between the surrounding boxes of the strokes in the old stroke buffer and the surrounding box of the last stroke (step 794). Note that an overlap of clusters typically identifies an editing command. Thus, if there is overlap, the system detects it through calling the OverlapAnsr() routine and performs whatever editing functions are indicated by the editing gesture. The OverlapAnsr() routine is the interface between the recognition system and the editor functions.

After checking for overlap and performing whatever editing functions are appropriate, ScanBuff() restores default values to editing flags (step 796–800).

The routine InterList() which is called by ScanBuf() determines the "best" cluster from the strokes in the window buffer. In principle, the routine operates by considering the sorted prototype lists of the strokes and finding the largest meaningful combination of parts of the strokes. The system searches for a meaningful cluster having the largest signal-to-noise ratio (S/N). The definition of the S/N ratio is similar to that used by the proportion discrimination portion of the system. The S/N ratio is defined as the ratio of the length of the image divided by the length of the meaningful part of the image.

InterList() has as its inputs a pointer to a structure <INF> and a pointer to the integer shift <shift>. Structure <INF> is shown in FIG. 31. This structure describes a single cluster. The <.Sym> instance identifies the meaning of the segmented part of the cluster. The <.Siz> and <.Pos> instances specify x-y size of the cluster and its position, respectively. The <.Len> instance specifies the length of the cluster which is equal to the total length of the constituent strokes. The <.Prt> instance identifies from what multiple stroke prototype the cluster came from. And the <.Frm[]> instance is an array identifying the strokes in the window buffer that make up the cluster.

The variable <shift> denotes the number of the first stroke of the cluster in the window buffer. If this number is zero, then a variable <scanCnt> is augmented by the number of strokes in the cluster in the routine ScanBuff() and the window buffer is loaded with additional strokes from the scan buffer. If <shift> is not zero, then there is no additional loading. This is done to ensure that strokes of any cluster are contiguous, i.e, for any two strokes of the cluster 'A' there are no strokes from another cluster 'B' whose x-coordinate is between x-coordinates of the strokes making up cluster A.

This assumption is based on assuming that the user's input will consist of lines of text with symbols lying along a horizontal line. If that assumption is true, then the any current stroke buffer will be organized similarly.

The output of the routine InterList() is an integer which indicates how many strokes are contained in the found cluster. The default cluster is a single stroke cluster consisting of the first stroke of the window buffer.

InterList() performs the following operations:

1. It determines if any of the strokes in the window buffer is an erasure gesture.

2. If a stroke is an erasure gesture, the system does no clustering, assigns TRUE to the value of editing flag <tick-.Erase> and exits. Note that <tick.Erase> is an instance of the structure <COUNT tick> which contains global counting variables. It is shown as shown in FIG. 3.

3. It makes up all possible combinations of the single stroke prototypes on the single stroke prototype lists. This includes combinations with less than maximal number of strokes in the window buffer.

4. It throws away all combinations which have gaps, i.e., which would have a cluster such that another stroke of the window buffer under consideration would have an x-coordinate between the coordinates of some of the strokes of the cluster.

5. It loads each admissible combination into a structure <ONEBUFF typeBuff[STRKNUM]>. The <typeBuff[]> structure is similar to <BUFF timeBuff[]> except it contains information not about prototype lists but about prototypes themselves.

For contrast both structures are defined below.

```
typedef struct buff{
    SYMPROT Sym[LISTNUM];
}BUFF;
typedef struct oneBuff{
    SYMPROT Sym;
    UCHAR Olp;
}ONEBUFF;
```

Here the instance <.Olp> refers to the number of the largest prototype on the list from which the prototype described by <typeBuff[]> was chosen from. This is a feature used by some of the neural networks for position discrimination.

6. It orders each combination in <typeBuff> in a canonical way according to complexity-spatial criterion to obtain a input multiple stroke prototype. This is done by calling a routine TypeOrder().

7. It checks if any of the combinations are meaningful by comparing each input multiple stroke prototype with a list of canonical multiple stroke prototypes. This is done by calling a routine InterBuff(). To do checking, the routine assigns a value to variable <typeCode> which is obtained by making up a long integer from the up to eight digits of the decimal numbers of the constituent prototypes on the canonical prototype list protTbl[].

The type code is independent of the order in which the strokes were entered. This eliminates the need to specify in which order the strokes of a symbol are to be entered by a user, in contrast with other systems where an order of strokes is essential.

8. It chooses a meaningful multiple stroke prototype with largest screen length, or for two choices with the same length it chooses the one with the least distance between constituent parts (this distance is explained below in section on multistroke neural networks).

9. It declares the cluster of the largest and most compact multistroke prototype as the winning cluster and stores information about it in structure <INF>.

The pseudo-code describing the operation of the InterList() routine is shown in FIGS. 32A–F and its operation will now be described in detail.

InterList() first initializes a set of variables that it will use (steps 850). The variables are: totFit, winFit, winDist, shift, winShift, winFeet, and typeFit. The variable totFit records the total length of the strokes in the window buffer. The variable winFit records the length of the largest cluster. The winDist variable records the closeness or compactness of the most compact cluster. The shift variable records the count of the first stroke of the cluster in the window buffer. The variable winShift records the previous count for the winning cluster. The variable winFeet records the number of strokes in the winning cluster. And the variable typeFit records the length of a cluster. InterList() initializes all of these variables, except winFeet to zero; it initializes winFeet to one.

After initializing variables, InterList() forms a single cluster with the first stroke in the window buffer (step 852) and saves that cluster to a temporary variable, temClust (step 854). Then, InterList() enters a for-loop in which it computes the total length of the strokes in the window buffer (step 850). Within the for-loop, InterList() goes through each of the <tick.Wind> entries within <windBuff[]> and uses the totFit variable to add up the screen lengths of the found prototypes as recorded in the <.Sym[1].Prt.Fit> instances of the <windBuff]> array structure (step 858).

After computing the total screen length of the contents of the window buffer, InterList() sets a skip variable to FALSE and then proceeds to determine whether any of the strokes within the window buffer is an erasure gesture. There are several erasure gestures, e.g. a back and forth scratch over an entry, a scribble over an entry, or a long line through an entry. The variable skip is used by InterList() to indicate whether any of these erasure gestures is found during the search of the window buffer. The specific tests that InterList() performs to find such entries will now be described.

If any of the strokes of the window buffer have the meaning of '-' and its y-size is less than ¼ of its x-size and its x-size is less than ½ of the total screen length of the '-' stroke, then it is an erase gesture (i.e., it is a forward and back scratch gesture). InterList() enters a for-loop in which it again goes through each of the entries in the window buffer and checks whether any of the entries meets these criteria (steps 860–862). If such a gesture is found, the variable skip is set to TRUE (step 864) and InterList() exits the for-loop (step 866).

After searching for a short erasure gesture, InterList() finds the size and count of the largest stroke in the buffer. It uses two variables, maxSize and maxCount, to record the size and count of the largest stroke found. Before beginning the search, InterList() initializes maxSize and maxCount to zero (steps 868 and 870). Then, InterList() enters another for-loop in which it looks for the stroke entry which has the largest x or y dimension (step 872). It sets maxSize to the largest x or y dimension found and sets maxCount to the index of the entry (steps 874 and 876).

Then, using a similar procedure InterList() finds the size and count of the second largest stroke in the buffer (steps 878–884). During this search, InterList() uses two other variables, nextSize and nextCount, to identify the found stroke.

If the largest stroke is '-' and its size is 2 times the size of the next largest stroke and the next largest stroke prototype number (i.e., its complexity) is more than 6, then the stroke '-' is an erase gesture. InterList() checks whether the largest found stroke meets these criteria (step 886) and if it does, InterList() sets the variable skip to TRUE (step 888).

If the largest stroke is '-' and its size is 4 times the size of the next largest stroke and the next largest stroke prototype number (i.e., its complexity) is less than or equal to 6, then the stroke '-' is an erase gesture. InterList() checks whether the largest found stroke meets these criteria (step 890) and if it does, InterList() sets the variable skip to TRUE (step 892).

After searching the window buffer for strokes that meet the above-described criteria, InterList() checks whether the skip variable is TRUE, indicating that an erasure gesture was found. If an erasure gesture was found, then InterList() performs no clustering, it sets <tick.Erase> to one (step 894), alerting the user interface (i.e., the editor) that an erasure is to occur and it exits, returning the value of winFeet (which equals 1) to the program which called InerList() (step 896).

If no erasure gesture was found (i.e., if skip is FALSE), InterList() initializes an array of indexes to input multistroke prototypes, protCode[count], where count ranges from zero to STRKNUM (i.e., 4) (step 898). Then, InterList() sets the value of a variable <DEPTH> (step 900). The variable <DEPTH> establishes the maximum number of combinations of elements from the prototype list that InterList() will examine to construct the input multistroke prototype. In the described embodiment, InterList() looks only four deep in the list of prototype meanings. That is, InterList() looks at only the four best meanings in the sense of the length which they occupy. Thus, the search is restricted to the most likely candidates for the multistroke prototype. With <DEPTH> set to four, the total number of possibilities is $4^4$=256.

After setting the depth of the search, InterList() then enters a for-loop in which it examines all of the 256 possible multistroke combinations (step 902). For a selected combination, it sets the number of strokes in a cluster (specified by a variable feet) to zero (step 904) and it sets skip to FALSE (step 906). Then, InterList() initializes a variable, symFit, that is used to measure the length of the input multistroke prototype (step 908).

After initializing symFit, InterList() arbitrarily numbers the combinations. It does this by picking a stroke and computing a number for it as shown in step 910. Then it checks whether the corresponding meaning (which is one of the best four meanings of the prototype) is NULL_SYM (step 912) or whether the prototype is identified as NULL_SYM (step 914). If either of these is true, InterList() does not consider the combination but moves on to the next of the 256 possible combinations.

If neither the selected meanings for the four strokes nor the prototypes are identified as NULL_SYM, then InterList() checks for the presence of a gap among the strokes. First, InterList() checks for the presence of two strokes separated by a HAPY_SYM symbol (steps 916–918). Then, InterList() checks four stroke window buffers for the presence of two strokes separated by two HAPY_SYM symbols (step 920). Finally, InterList() also checks for the presence of a HAPY_SYM symbol at the beginning of the buffer window (steps 920). If any of these situations are detected, InterList() skips the combination and moves on to the next of the 256 possible combinations.

If the combination is not skipped, InterList() sets the shift variable to zero (step 924) and enters a for-loop in which it uses the shift variable to count the number of strokes that are in the cluster (steps 926). InterList() counts all strokes that are not assigned the meaning of HAPY_SYM.

After counting the number of strokes, InterList() sets the skip variable to FALSE (step 928) and then enters another for-loop in which it performs three tests on each stroke of the current combination (step 930). The three tests compare different measures of the size of the current matched prototype (i.e., the matched prototype being considered for the current combination) with a corresponding measure of the size of the most meaningful matched prototype for that stroke (i.e., SYM[1]) (steps 932, 938, and 944). If any of these tests establish that the most meaningful interpretation of the stroke is significantly larger (as defined by the specific tests) than the interpretation being considered, InterList() sets the skip variable to TRUE (steps 930, 940, and 945) and breaks out of the for-loop (steps 930, 942, and 948) and moves on to the next one of the 256 combinations (step *).

If the stroke of the current combination passes the size comparison tests, the skip variable remains set to FALSE and InterList() checks whether the current stroke of the current cluster is a gap (i.e., is assigned the meaning HAPY_SYM) (step 950). If it is not a gap, InterList() finds which stroke of the time stroke buffer corresponds to the current stroke and loads the meanings of its prototype into the <typeBuff> array of structures (steps 952–954). InterList() also loads the number of the largest prototype for that stroke into the instance <typeBuff.Olp> (step 956), increments the value of symFit by the length of the stroke (step 958) and increments the feet variable (step 960). After the for-loop has looked at all of the strokes of the cluster, symFit will contain the total length of the strokes in the cluster.

In the event that the stroke has the meaning HAPY_SYM, InterList() simply loads NULL_SYM into the corresponding element of the <.Frm[]> array in the <INF> structure (step 962).

To simplify subsequent processing, Interlist() assigns the same single stroke prototype number to all round prototypes within the current combination (steps 964–970). It does this with the aid of a routine called ProtFilter(). Notice that there are four prototypes that have the meaning of 'O', namely, prototype numbers 14, 15, 16, and 17. For all round prototypes, ProtFilter() converts the prototype number to 14 and this value is stored in the <.Sym.Prt.Prt> instance of <typeBuff>.

After converting the round prototypes to a standard prototype number, InterList() orders all prototypes according to the following rule:
the more complex prototype comes ahead (i.e., to the right of) of less complex prototypes and, if there are two prototypes of the same complexity, order them by their x-coordinates, unless they are '-'prototypes, in which case order them by their y-coordinates.
This rule is implemented by a routine called TypeOrder() (step 972).

After ordering the prototypes according to the above-identified rule, InterList() determines a type code for the current combination of prototypes. The type code will be used to assign meanings to the combination of strokes. The code is a long integer where each two digits of its decimal form are the prototype numbers of the single stroke prototypes of the combination ordered canonically by the routine TypeOrder(). Before determining the type code, InterList() initializes two variables, namely, <typecode> and <factor>. Both variables are used to compute the type code for the combination. InterList() initializes <typeCode> to zero (step 974) and <factor> to one (step 976). Then InterList() enters a for-loop in which constructs the type code from the prototype numbers of the canonically ordered strokes within the combination (step 978).

Next, InterList() calls an InterBuff() routine to assign meaning to this combination of single stroke prototypes (step 980). InterBuff() interprets the cluster buffer <INF> using a neural network that will be described shortly. InterBuff() returns a value representing the total length of the prototypes of the cluster. Interlist() stores the output of InterBuff() in the <typeFit> variable.

InterList() checks if <typeFit> is equal to zero (step 982). If it is, Interlist() skips that combination and moves onto the next one. If typeFit is not zero, Interlist() checks whether the new combination is larger than previous combinations (step 984). If it represents the largest combination examined thus far, Interlist() declares the new cluster the winner and records its values in the variables <winFit>, <winFeet>, <winShift> and <temClust> (step 986).

If, however, the current cluster has the same length as the largest cluster examined thus far, InterList() determines the winner by comparing their compactness (step 988). The cluster with the closest combined distances between the binding points (as recorded in a variable <pminDist>) is declared the winner. The variable <pminDist> is computed by InterBuff() as will be described shortly.

If the current cluster is smaller than the largest cluster examined thus far, InterList() skips this particular combination and moves onto the next one.

After evaluating all of the 256 possible combinations, InterList() records the winning cluster (step 990), records the number of the first stroke of the winning cluster in the window buffer (step 992) and returns the number of the strokes in the winning cluster (step 994).

The routine InterBuff() assigns meaning to a single cluster of matched prototypes described by the structure <ONEB-UFF typeBuff[]>. Its inputs are a pointer to structure <INF> which describes an isolated cluster (see above), an integer which describes the number of strokes in the cluster, and a pointer to unsigned integer which describes how close the strokes of the cluster are compared to their ideal position. This last input will be described in more detail in context of position discrimination neural networks. The output of the routine is an integer which is the total length of the prototypes of the cluster.

The InterBuff() routine performs the following operations:

1. It determines the x- and y- sizes of the cluster under consideration and its x- and y-coordinates.

2. It scans the list of multistroke prototypes and determines if the type code of the cluster under consideration matches a type code on the list of multistroke prototypes described by structure symsTbl[] defined by:

```
struct bundle {
    ULONG typeCode;
    UCHAR syms[BRCHNUM];
}
```

The first instance of the structure is the type code of a canonical combination of the strokes, the second is the list of up to BRCHNUM (=9) meanings which can be assigned to a particular multistroke prototype. For example the type code 101 means that the cluster contains one stroke whose prototype number is 0- a "horizontal" stroke and another stroke whose prototype number is 1—a "vertical" stroke. Such a cluster potentially could have meanings of 'X', 'Y', 'V', '^', 'I', 'K', or 'D'. Zero values in the array of meaning signify a null meaning.

3. If a match of the input type code was not found, the routine returns zero as the value of the combined length of the strokes of the cluster and the cluster is declared not meaningful.

4. Once a type code match is found, InterBufo computes squares of distances between binding points of each prototype in <typeBuff[ ]> and computes how large the distances are compared to the maximum size of strokes in the cluster. This is done by calling a routine DistArr( ).

5. If the smallest of the distances is large compared to the size of the strokes, the system rejects this multistroke prototype and continues with matching type codes.

6. If the cluster's strokes are declared "close", the routine calls a neural network routine StkBoundXX( ) which attempts to assign meaning to the cluster.

7. If a non-null meaning has been assigned to the cluster by the neural network, the routine computes the screen length of the cluster and assigns information about cluster to structure <INF *clust> by calling a routine MakeClust( ).

The InterBuff( ) Routine

The pseudo-code describing the operation of the Inter-Buffo routine is shown in FIG. 33.

First, InterBuff(0) calls a SizeAndPos( ) routine to determine the size and position of the current cluster (step 1000). Then, it loops through all multistroke prototypes in symsTbl[ ] and tries to match the input prototype with one of the canonical prototypes (step 1002). If the type code of the entry in the prototype table does not equal the type code of the input, InterBuffo moves on to the next entry in the table (step 1004).

As soon as InterBuff(0) finds a match in the table, it initializes a tbound[] array which points to the meaning of the mulitstroke prototype (step 1006). It sets all entries of the array to FALSE.

Then, InterBuff( ) determines whether the prototypes are "close" enough to represent a valid multistroke prototype. It does this by calling a DistArr( ) routine (step 1008). DistArr( ) computes the squares of distances between the binding points of each prototype, finds the smallest distance and compares the smallest distance to the maximum size of the cluster's strokes. DistArr( ) returns a boolean value indicating whether the closeness criteria are met and InterBuff( ) sets an internal variable <close> equal to the returned value from DistArr( ).

InterBuff( ) then checks the value of close (step 1010). If close is FALSE, InterBuff( ) returns a zero for that combination. If close is TRUE, InterBuff( ) finds what meaning is assigned to this cluster prototype (step 1012). It does this by by calling the neural network routines StkBound[ ]( ). The routines return an index into the array structure <sysmTbl[ ].Sym[ ]> which InterBuff( ) saves in a variable <scount>.

After obtaining an index into the array of multistroke prototypes, InterBuff( ) determines how close the actual distance between strokes is as compared to the canonical distance (maxSize/2) (step 1014). If the actual distance between strokes is less than the canonical distance, InterBuff( ) considers that mulitstroke further. Otherwise, InterBuff( ) rejects the prototype, returns a zero to the calling routine and exits.

If InterBuff( ) accepts the multistroke prototype, it then computes the screen length of the meaningful cluster and assigns position, size, and other information about the cluster to the cluster descriptor <INF *clust>. First Inter-BuffO checks whether <scount> is a valid index to a meaning entry in the multistroke prototype table (step 1016). If it is, InterBuff( ) initializes the value of typeFit to zero (step 1018) and enters a for-loop in which it computes the screen length of the cluster (step 1020). The variable <typeFit> is used to accumulate the lengths of the strokes making up the multistroke prototype. When the for-loop is completed (i.e., all of the strokes of the multistroke prototype have been examined), InterBuff( ) records the information about the cluster into structure <INF clust> by calling a MakeClust( ) routine (step 1022). After the cluster information has been recorded, InterBuff( ) returns the value of <typeFit> and exits (step 1024).

In the event that scount is not a valid index into the meanings in the prototype table (e.g. it is equal to -1 or NULL_SYM), InterBuff( ) continues the search for a mulitstroke prototype match (i.e., a type code match).

The StkBoundXXO Routines

The routines StkBoundXX( ) are encodings of tree based neural networks which assign meaning to multistroke prototypes given by the table in the structure <bundle symsTbl[ ]22 . XX stands for a number between 0 and COMPNUM (=119).

The routine is called from within the routine InterBuff( ), using an array of pointers pStkBound[COMPNUM], each of which points to one of the StkBoundO routines. The input of the routines is a pointer pmindist to the unsigned integer, which describes the distance between the strokes in the cluster.

The output of StkBound( ) is an integer <scount> which could take value −1, or between 0 and BRCHNUM (=9). If the value is more than −1 then the assignment of meaning is done by using <scount> as an index into the <symTbl[ ]> array inside the routine InterBuff( ), otherwise the meaning is assigned inside the routine StkBound( ) by direct assignment to a global variable <sym>.

The typical structure of the StkBoundXX( ) routines is shown by the pseudo-code in FIG. 34. The neural networks that implement the StkBoundXX( ) routines are similar to those previously described except that they use different features, namely, the squares of the distances between the binding points of the prototypes being considered. In general, a StkBoundXX( ) routine checks whether the cluster whose strokes were found to meet the rough closeness criterion of InterBuff( ) is indeed tight enough to be characterized as a meaningful cluster. The StkBoundXX( ) routine finds the pair of binding points with the least distance between them and records this smallest distance in <*pmirnDist> (step 1030). It does this by calling a routine IsClose( ). IsClose( ), however, only looks at certain pairs of binding points.

For each pair of prototypes, there are a maximum of 16 possible distances that can be computed between the four binding points of each prototype. The DistArr( ) routine that was called by InterBuff( ) generates a 16 element array for each pair of prototypes in a cluster and each element of this array records the computed distance for a corresponding pair of binding points. In the described embodiment, the entries in this array are indexed as follows:

| index | 1st prototype binding point | 2nd prototype binding point |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |
| 12 | 3 | 0 |
| 13 | 3 | 1 |
| 14 | 3 | 2 |
| 15 | 3 | 3 |

It has been found that certain distances within this array provide the most useful information for discriminating between alternative meanings and for assigning meaning. The distances of most importance are identified in the array of 16 distances by indexes 0, 6, 10, and 2.

After finding the smallest distance, StkBoundXX( ) sets the value of tbound[ ] array for the index with the smallest combination to TRUE. This creates an initial assignment of meanings in the neural network tree. As before, the variables <tbound[ ] > correspond to the possible meanings of the multistroke prototype. StkBoundXX( ) contructs a classification tree by extracting information from the handwriting database (i.e., the <typeBuff[ ] > array) and assigning values to the elements of the true boundary array tbound [BRCHNUM] (steps 1032–1034). The general form of the relationships within the classification are shown in FIG. 34. The details, however, depend upon the particular multistroke prototype being evaluated. In general, the classification criteria include locations of binding points and the locations and sizes of the prototypes. The specific relationships can be readily developed by one skllled in the art.

StkBoundXX( ) determines the first element of the tbound array which is true and uses the index of this element as the index into the array symsThl[COMPNUM].syms [BRCHNU] (step 1050). If no tbound variables are true, it assigns a null meaning to the cluster (step 1052).

Once scanning of the stroke buffer is completed, the system calls two additional routines, BufOrder( ) and OverlapAnsr( ).

The first routine reorders the entries into the cluster buffer <BINFO *buf> in order of increasing x-coordinate of the clusters. The second routine, which is used for user interface with the Editor, determines whether there is an "overlap" between different clusters of the cluster buffer.

Resolution of Ambiguities Using Spatial Context

Up to now the assignment of meaning to a cluster did not depend on the presence of other clusters in the cluster buffer. There are a number of cases, however, where the meaning of a symbol is ambiguous and the presence of other nearby clusters provides additional information that resolves the ambiguity. For example, a round stroke could mean both upper case 'O' and lower case 'o'. If no additional information is provided this ambiguity cannot be resolved. However, when a round stroke is close to another unambiguous meaningful symbol, the meaning of the round stroke can be inferred from the relative size of the two symbols.

In the case when the meaning of the cluster is ambiguous, the upper case meaning is assigned where applicable. In the case where a single downward stroke could mean '1', 'I', 'i', 'j', the default meaning is '1' if the stroke follows and preceeds a letter, and is '1', otherwise.

The following symbols are inherently ambiguous in terms of the case of the letter:

'C'
'E'(if written with one stroke)
'K'
'M'
'm'
'O'
'S'
'U'
'V'
'W'
'X'
'Z'

The case of these symbols is disambiguated by a routine SpatContext( ) which is called by a routine PrintCom( ) which is in turn called called by the routine PenUp( ). The inputs of the routine SpatContext( ) are a pointer to structure <BINFO *buf>, which describes the clustering of the stroke buffer, and an integer which is an index into the array of clusters.

In addition, in a number of cases a single stroke has a meaning used only for purposes of clustering, and by itself does not have a meaning of a character in the ASCII set. For example, taken by itself a single downward stroke can have a meaning of '(',')', or '1'. Yet, when taken in conjunction with a single horizontal stroke which crosses it, it is sometimes useful to assign to it the meaning 'ƒ' (an extended ASCII charcter set 159), which allows the system to tell 't' from 'ƒ' but in itself is not an admissible printed character. Therefore, before printing such a charcter on the screen, it is desirable to convert such a meaning into a closest meaning from the admissible set of characters.

The routine SpatContext( ) performs the following operations:

1. It converts clusters or single strokes with meanings described by the extended ASCII set into the meanings described by the standard ASCII character set.

2. It determines if the character preceeding or following the ambiguous character under consideration belongs to the class of tall letters (i.e., capital letters and letters 'b', 'd', 'f', 'g', 'h', 'j', 'l', 'p', 'q', 't', 'y', script 'z'), or to the class of short letters (i.e., the remaining letters of alphabet).

3. It assigns the ambiguous letter to a short or tall class.

4. If an ambiguous letter follows a short letter whose size does not exceed a certain threshold, the ambiguous letter is declared to be lower case; otherwise, it is declared to be upper case.

5. If an ambiguous letter is being followed by a short letter whose size does not exceed a certain threshold, the ambiguous letter is declared to be lower case; otherwise, it is declared to be upper case.

6. If the ambiguous letter is '1', then it is converted to 'i', or to 'j' using the preceeding algorithm.

7. The threshold of the preceeding algorithm is adjusted depending on whether or not the ambiguous letter is short or tall.

The Editor—An Interactive Pen-Based User Interface

The role of the Editor is twofold. First it allows to determine if the users input should be interpreted as text or as a command. Second it allows the user to actively interact with the recognizer to correct errors or manipulate image of the input to insert spaces in the lines, delete groups of strokes, etc.

The following is a description of the error correction and input image manipulation functions of the Editor. It allows for the following operations on the input:

1) Overwrite cluster(s)
2) Insert space
3) Delete cluster(s)
4) Modify clustering The overwrite operation provides a way for the user to replace a meaningful cluster or clusters in the cluster buffer by writing a stroke of sufficient topological complexity over the image of the cluster desired to be replaced. Both the image and all data structures describing the overwritten cluster are deleted. The topological complexity is described by the number of the directions in the direction string of the largest meaningful part of the stroke. The requirement of topological complexity is necessary because strokes of low complexity may actually modify meanings of the clusters.

The insert space operation provides the user with the ability to widen the horizontal space between two clusters by writing an 'L' shaped gesture between the two clusters. The position of the vertical leg of the 'L' gesture determines where the space insertion is to occur, while the length of the horizontal leg determines the horizontal extent of the inserted space. This operation results in erasure of the images of all strokes in the current buffer whose x-coordinate is to the right of the center of the vertical leg of the 'L'-gesture, changing the x-positions of all such strokes by the amount equal to the length of the horizontal leg of 'L'-gesture and re-drawing all such strokes in the new, shifted position.

The delete cluster(s) operation provides the user with the ability to use a gesture to remove images and all data structures describing one or more clusters in the current stroke buffer. This operation can be accomplished by two gestures: the long horizontal line gesture which removes itself and all clusters it overlaps from the system—this is used primarily to remove three or more clusters; and a horizontal scratch gesture made by repeated continuous horizontal stroke where the stroke includes at least three back and forth horizontal pen movements, which removes itself and all clusters it overlaps—this being used primarily for removal of two or less clsuters from the current stroke buffer.

The cluster modificaton operation provides for correcting errors in clustering. The user can enter vertical tick mark gestures to indicate to the Recognizer that the strokes on the different sides of a tick mark should not be considered as a part of a single cluster.

All of the described functions involve determining whether or not the latest stroke entry in the current stroke buffer overlaps any of the strokes of the clusters in the before current stroke buffer. As noted above, checking for overlapping is determined by the routine OverlapAnsr( ). This routine has void output; its input is a pointer to the cluster buffer <BINFO *buf>, which was described earlier.

The pseudo-code describing the operation of OverlapAnsrO is presented in FIGS. 35A–E. In general, OverlapAnsr( ) performs the following functions. It checks whether the last cluster is overlapping anything else. If it does overlap another symbol, it checks if its total size is small compared to the size of the underlying symbol. If it is large as compared to the underlying symbol, then OverlapAnsr( ) removes the underlying strokes from the stroke buffer; it removes the underlying clusters from the cluster buffer and erases the displayed text of underlying strokes; and it removes the points of underlying strokes from the points buffer and erases displayed points of the underlying strokes.

The details of the operation of OverlapAnsr( ) are as follows. OverlapAnsr( ) initializes an array <underCount[]> which holds the number of clusters that have been overlapped by the last stroke (step 1070). Then, it enters a double nested for-loop in which it identifies the cluster which contains the latest stroke (step 1072). This cluster potentially can be the cluster which overlaps another cluster. The overlapping cluster will be identified hereinafter as the "overlapper" and the underlying cluster will be identified as the "overlapped" cluster. Note that <oldTimeOrdr[tick.Buff-I]> is the number of the last stroke in the array of space ordered strokes of the current stroke buffer. OverlapAnsr( ) determines which cluster in the <BINFO buf> structure contains the latest stroke. It uses a variable <overcount> to store an index into the cluster buffer identifyfing the possible overlapper.

When OverlapAnsr( ) finds the potential overlapper, it stores the position of the cluster's center and the cluster's x and y size (step 1080). Then, OverlapAnsr( ) enters a for-loop in which it goes through the cluster buffer and determines the cluster buffer indexes of the overlapped clusters, if any (step 1084). Before enering this for-loop, OverlapAnsr( ) initializes a variable <underNum> that will be used to count the total nunber of the overlapped clusters that are found (step 1082).

Within the for-loop, OverlapAnsr( ) first checks whether the index of the cluster equals the index of the possible overlapper (step 1086). OverlapAnsr( ) ignores the overlap of the overlapper on itself (i.e., self-overlapping) so if the indexes are equal, it moves on to the next cluster index.

After checking for self-overlapping, OverlapAnsr( ) stores the position and size of the potentially overlapped cluster (i.e., the cluster identified by index count) (step 1090). Then, it determines whether the overlapper's position is inside a box bounding the potentially overlapped cluster (step 1092). If it is inside the bounding box, OverlapAnsr( ) records the cluster buffer index of the actual overlapped cluster in array <underCount[ ]> (step 1094) and augments the count <underNum> of the total number of overlapped clusters (step 1096).

If the overlapper's position is not within the box bounding the potentially overlapped cluster, OverlapAnsr( ) determines whether potential overlapped cluster's position is inside a box bounding the overlapper (step 1098). If it is inside the bounding box, OverlapAnsr( ) records the cluster buffer index of the actual overlapped cluster in array <underCount[ ]> (step 1100) and augments the count <underNum> of the total number of overlapped clusters (step 1102).

If either the overlapper or the potential overlapped cluster are "thin" i.e., its x-size is much more than its y-size), then it is enough to check overlapping of the x-bounds of the cluster position with the bounding boxes. This is needed for detecting erasure gestures (e.g. a tick over the symbol to be erase). These tests are performed in steps 1104 and 1110 which are similar to the previously described steps 1092 and 1098 but they only look at the x dimensions.

After completing the search through the entire cluster buffer, if it is determined that there are no overlaps, OverlapAnsr( ) returns to the routine which called it, namely, the ScanBuff( ) routine (step 1112). On the other hand, if one or more overlaps were found, OverlapAnsr( ) proceeds to determine the nature of the editing gesture(s).

After locating the overlapping clusters, OverlapAnsr( ) checks whether the system is in the edit mode, the last stroke is IL shaped and it is declared to have HAPY_SYM meaning (step 1114). If those conditions are satisfied, OverlapAnsr( ) proceeds with space insertion by first declaring an insertion variable <tick.Isrt> to be TRIUE (step 1116). Then OverlapAnsr( ) calls an ErasePoints( ) routine to erase the image of all strokes in the stroke buffer (step 1118). After erasing the points, OverlapAnsr( ) determines the amount of shift that will be required for space insertion (steps 1120 and 1122). To do this it looks at the x size of the overlapper (i.e., the 'L' editing gesture). Once the amount of x shift has been determined, OverlapAnsr( ) enters a for-loop in which it adds this amount to the x-coordinates of all points in the point array (step 1124). Note that <timeBuff[ ]> positions are in tablet coordintes and the point array positions are in pixel locations. Thus, the information from the cluster buffer must be transformed before adding them to the positions in the point array.

After shifting the points in the point array, OverlapAnsr( ) erases all text printed for current cluster buffer (i.e., <ansrBuff[ ]>) (step 1126). Then, it recomputes the shift in screen coordinates (step 1128) and determines the x-coordinate of the vertical leg of the 'L'-shaped space insert gesture (step 1130).

Once the vertical leg of the 'L' gesture has been located, OverlapAnsr( ) enters a for-loop in which it shifts the x-coordinates of the appropriate clusters (step 1132). First, it determines the x-coordinate of the left vertical leg of the bounding box of each cluster in the cluster buffer (step 1134). If the cluster is positioned to the right of the insert gesture (step 1136), Overlap Ansr( ) (1) adds shift.x to the x-coordinate of the the cluster (step 1138); (2) adds shift.x to the x-coordinate of each stroke of that cluster as represented in the prototype lists of the stroke buffer (step 1142); and adds shift.x to the x-coordinate of each binding point of that cluster as represented in the prototype lists of the stroke buffer (step 1144).

After the appropriate clusters have been shifted by the amount shift.x, OverlapAnsr( ) calls a routine RecDrawBoxbuf) to draw a new bounding box around the shifted stroke buffer (step 1146) and calls another routine PrintCom(buf) to print new corrresponding text on the display (step 1148). Then, OverlapAnsr( ) removes the 'L' gesture from the current stroke buffer (step 1150) and calls a routine DrawPoints( ) to draw new shifted images of all strokes in the stroke buffer (step 1152).

At this point, OverlapAnsr( ) checks if system is in editing mode (step 1154) or if the overlapper is less complicated than a circle and more complicated than the most complicated prototype on the prototype list (step 1156). If either of these conditions exists, OverlapAnsr( ) returns to the calling routine. Otherwise, OverlapAnsr( ) sets an overwriting variable <tick.Over> to TRUE (step 1158).

The rest of the code in the routine relates to overwriting or erasing Editor functions. If either the overwrite or edit mode are on, OverlapAnsr( ) erases the images of all overlapped clusters (step 1160). If it is in overwrite mode, then it redraws the remaining strokes (step 1066) or if it is in erasure mode, it erases the image of the erasure gesture (step 1064).

Next, OverlapAnsr( ) enters a while Loop in which it updates the data structures for removed objects (step 1070). In particular, it calls a routine TakeList( ) that (1) removes points from the <pntArr[ ]> structure; (2) removes point counts from array of corrdinates of stroke endpoints (i.e., in the <strArr> structure); (3) removes strokes (lists) from stroke buffer <timeBuff[ ]>; and (4) removes clusters from cluster buffer <buf>.

EXAMPLES OF ACTUAL CHARACTER PROCESSING

The following are examples of actual character processing for a two stroke input consisting of a U followed by a downward stroke to represent the numeral '4'. The description will follow the processing of the strokes by the various algorithms mentioned above and will present the values taken on by the above-identified data structures during processing Single Stroke The first input into the recognition system is a U-shaped stroke written in the lower right comer of the 10000×10000 resolution tablet and seen on 1000×1000 resolution screen. There are a total of 68 sampling points with the following coordinates and transition values.

pen.x=8439 pen.y=8637 TRANSITION=5
pen.x=8440 pen.y=8635 TRANSITION=8
pen.x=8438 pen.y=8637 TRANSITION=8
pen.x=8438 pen.y=8639 TRANSITION=8
pen.x=8438 pen.y=8641 TRANSITION=8
pen.x=8438 pen.y=8652 TRANSITION=8
pen.x=8438 pen.y=8661 TRANSITION=8
pen.x=8440 pen.y=8679 TRANSITION=8
pen.x=8439 pen.y=8687 TRANSITION=8
pen.x=8442 pen.y=8698 TRANSITION=8
pen.x=8445 pen.y=8709 TRANSITION=8
pen.x=8450 pen.y=8720 TRANSITION=8
pen.x=8453 pen.y=8732 TRANSITION=8 pen.x=8457 pen.y=8743 TRANSITION=8
pen.x=8461 pen.y=8756 TRANSITION=8
pen.x=8465 pen.y=8767 TRANSITION=8
pen.x=8469 pen.y=8780 TRANSITION=8
pen.x=8474 pen.y=8793 TRANSITION=8
pen.x=8481 pen.y=8807 TRANSITION=8
pen.x=8489 pen.y=8820 TRANSITION=8
pen.x=8496 pen.y=8831 TRANSITION=8
pen.x=8506 pen.y=8840 TRANSITION=8
pen.x=8514 pen.y=8850 TRANSITION=8
pen.x=8523 pen.y=8860 TRANSITION=8
pen.x=8532 pen.y=8869 TRANSITION=8
pen.x=8539 pen.y=8878 TRANSITION=8
pen.x=8547 pen.y=8882 TRANSITION=8
pen.x=8558 pen.y=8886 TRANSITION=8
pen.x=8568 pen.y=8890 TRANSITION=8
pen.x=8578 pen.y=8892 TRANSITION=8
pen.x=8587 pen.y=8896 TRANSITION=8
pen.x=8598 pen.y=8898 TRANSITION=8
pen.x=8606 pen.y=8903 TRANSITION=8
pen.x=8616 pen.y=8902 TRANSITION=8
pen.x=8625 pen.y=8904 TRANSITION=8
pen.x=8634 pen.y=8903 TRANSITION=8
pen.x=8644 pen.y=8898 TRANSITION=8
pen.x=8654 pen.y=8896 TRANSITION=8
pen.x=8662 pen.y=8892 TRANSITION=8
pen.x=8670 pen.y=8888 TRANSITION=8
pen.x=8692 pen.y=8874 TRANSITION=8
pen.x=8700 pen.y=8864 TRANSITION=8
pen.x=8713 pen.y=8852 TRANSITION=8
pen.x=8722 pen.y=8841 TRANSITION=8
pen.x=8729 pen.y=8830 TRANSITION=8
pen.x=8737 pen.y=8816 TRANSITION=8
pen.x=8744 pen.y=8804 TRANSITION=8
pen.x=8753 pen.y=8789 TRANSITION=8
pen.x=8759 pen.y=8775 TRANSITION=8
pen.x=8764 pen.y=8761 TRANSITION=8
pen.x=8767 pen.y=8750 TRANSITION=8
pen.x=8770 pen.y=8739 TRANSITION=8
pen.x=8770 pen.y=8728 TRANSITION=8
pen.x=8773 pen.y=8715 TRANSITION=8
pen.x=8773 pen.y=8701 TRANSITION=8
pen.x=8771 pen.y=8686 TRANSITION=8
pen.x=8771 pen.y=8669 TRANSITION=8
pen.x=8767 pen.y=8653 TRANSITION=8
pen.x=8767 pen.y=8635 TRANSITION=8
pen.x=8764 pen.y=8620 TRANSITION=8
pen.x=8762 pen.y=8609 TRANSITION=8
pen.x=8762 pen.y=8599 TRANSITION=8
pen.x=8759 pen.y=8592 TRANSITION=8
pen.x=8757 pen.y=8583 TRANSITION=8
pen.x=8756 pen.y=8581 TRANSITION=8
pen.x=8757 pen.y=8582 TRANSITION=8
pen.x=8757 pen.y=8586 TRANSITION=7

Note that the first point is identified by TRANSITION=5 corresponding to an UP_DOWN event (i.e., pen brought into contact with the tablet) and the last point is identified by TRANSITION=7 corresponds to a DOWN_UP event (i.e., pen lifted off of tablet). For all intermediate points, TRANSITION=8 corresponding to a DOWN_DOWN event (i.e., pen remains on tablet). The coordinates are stored in the ring buffer <ringbuffer[ ]> and in the point buffer <pntBuff[ ]>. The extraction and storage of the sampling points occurs in routines CheckRingBuffero and PenISR( ).

Dynamic Feature Extraction

Dynamic feature extraction occurs in routines PenDown( ), PenMoved( ) (which calls subroutine Stroke( ), and PenUp( ) (which calls subroutine SymRec( ) which, in turn, calls subroutine LastSeg( ). Dynamic feature extraction results in assignment of values to instances of structure <SEGM> for 4 different scales. The printout below was obtained using the following code.

```
for(scale = 0; scale < SC; scale++)
    {
    printf("\nscale %d\n",scale);
    for(count = O; count <= tick.Segs[scale]; count++)
        {
        x[1] = segs[scale].Seg[count].Bef.x/TBLT_SCRN;
        x[2] = segs[scale].Seg[count].Bef.y/TBLT_SCRN;
        x[3] = segs[scale].Seg[count].Aft.x/TBLT_SCRN;
        x[4] = segs[scale].Seg[count].Aft.y/TBLT_SCRN;
        x[5] = segs[scale].Seg[count].End.x/TBLT_SCRN;
        x[6] = segs[scale].Seg[count].End.y/TBLT_SCRN;
        printf("B %3d %3d A %3d %3d E %3d %3d \n",
            x[1], x[2], x[3], x[4], x[5], x[6]);
        if(count == tick.Segs[scale]) break;
        x[7] = segs[scale].Seg[count].Ext.min[0].x/TBLT_SCRN;
        x[8] = segs[scale].Seg[count].Ext.min[0].y/TBLT_SCRN;
        x[9] = segs[scale].Seg[count].Ext.min[1].x/TBLT_SCRN;
        x[10] = segs[scale].Seg[count].Ext.min[1].y/TBLT_SCRN;
        x[11] = segs[scale].Seg[count].Ext.max[0].x/TBLT_SCRN;
        x[12] = segs[scale].Seg[count].Ext.max[0].y/TBLT_SCRN,
        x[13] = segs[scale].Seg[count].Ext.max[1].x/TBLT_SCRN,
        x[14] = segs[scale].Seg[count].Ext.max[1].y/TBLT_SCRN,
        printf("I %3d %3d %3d %3d A %3d %3d %3d %3d \n",x[7],
            x[8], x[9], x[10], x[11], x[12], x[13], x[14]);
        x[15] = segs[scale].Seg[count].Dir;
        x[16] = segs[scale].Seg[count].Len;
        x[17] = segs[scale].Seg[count].Pos;
        x[18] = segs[scale].Seg[count].Neg;
        x[19] = segs[scale].Seg[count].Pti;
        x[20] = segs[scale].Seg[count].Pto;
        printf("D %d L %3d P %3d N %3d I %d 0 %d\n",
            x[15],x[16],x[17],x[18],x[19],x[20]);
        }
    }
```

There are three segments for scale 0, 1, 2. There are 9 segments for scale 3. The increase in the number of segments for fine scale is due to angle boundary noise. The data stored in the <SEGM> structure is presented below.

Scale 0

In the following columns of data:

B stands for the sampling point before the first (begin) point of the segment;

A stands for the sampling point before the last (end) point of the segment; and

E stands for the first sampling point of the segment (note that its last point is the first point of the next segment).

Since there are three segments, there are four sets of x-y-coordinates of before, after and end points.

| B: 843 863 | A: 845 872 | E: 843 863 |
| B: 848 880 | A: 860 890 | E: 853 886 |
| B: 860 890 | A: 874 880 | E: 869 887 |
| B: 877 872 | A: 876 863 | E: 876 863 |

In the following columns

I stands for the coordinates of maxima (two numbers) and minima (two numbers) for x-direction; and C stands for the coordinates of maxima (two numbers) and minima (two numbers) for y-direction;

|   |   |   |
|---|---|---|
| I: 843 863 843 863 | C: 853 886 | 853 886 |
| I: 853 886 853 886 | C: 869 887 | 860 890 |
| I: 869 887 876 863 | C: 877 872 | 869 887 |

In the following columns
D stands for the direction of the segment
2—UP
4—LEFT
6—DOWN
8—RIGHT
L stands for the tablet length of the segment;
N stands for the tablet length of the negative displacement of the segment;
P stands for the tablet length of the positive displacement of the segment; and
J stands for the index of the first point of the segment at this scale in the point array, pntArr[ ].

| D: 6 | L: 234 | P: 93 | N: 0 | J: 13 | O: 34 |
|---|---|---|---|---|---|
| D: 8 | L: 160 | P: 34 | N: 29 | J: 34 | O: 48 |
| D: 2 | L: 239 | P: 78 | N: 3 | J: 48 | O: 69 |

Scale 1

| B: 843 863 | A: 844 867 | E: 843 863 |
|---|---|---|
| B: 850 884 | A: 857 889 | E: 853 887 |
| B: 867 888 | A: 873 881 | E: 871 885 |
| B: 876 863 | A: 875 859 | E: 875 859 |
| I: 843 863 843 863 | C: 853 887 | 853 887 |
| I: 853 887 871 885 | C: 871 885 | 862 890 |
| I: 871 885 875 859 | C: 877 868 | 871 885 |
| D: 6 | L: 243 | P: 100 | N: 0 | J: 9 | O: 31 |
| D: 8 | L: 174 | P: 26 | N: 52 | J: 31 | O: 47 |
| D: 2 | L: 260 | P: 58 | N: 12 | J: 47 | O: 69 |

Scale 2

| B: 843 863 | A: 843 866 | E: 843 863 |
|---|---|---|
| B: 851 885 | A: 855 888 | E: 853 886 |
| B: 865 889 | A: 871 885 | E: 869 887 |
| B: 876 860 | A: 875 858 | E: 875 858 |
| I: 843 866 843 863 | C: 853 886 | 853 886 |
| I: 853 886 853 886 | C: 869 887 | 862 890 |
| I: 869 887 875 858 | C: 877 870 | 869 887 |
| D: 6 | L: 234 | P: 94 | N: 1 | J: 8 | O: 29 |
| D: 8 | L: 160 | P: 35 | N: 30 | J: 29 | O: 44 |
| D: 2 | L: 291 | P: 81 | N: 16 | J: 44 | O: 69 |

Scale 3

| B: 843 863 | A: 843 865 | E: 843 863 |
|---|---|---|
| B: 848 882 | A: 850 884 | E: 849 883 |
| B: 849 883 | A: 851 885 | E: 850 884 |
| B: 851 885 | A: 853 886 | E: 852 886 |
| B: 852 886 | A: 853 887 | E: 853 886 |
| B: 853 886 | A: 855 888 | E: 853 887 |
| B: 867 888 | A: 870 886 | E: 869 887 |
| B: 869 887 | A: 871 885 | E: 870 886 |
| B: 870 886 | A: 872 884 | E: 871 885 |
| B: 876 859 | A: 875 858 | E: 875 858 |
| I: 843 865 843 863 | C: 849 883 | 849 883 |
| I: 849 883 849 883 | C: 850 884 | 850 884 |
| I: 850 884 850 884 | C: 852 886 | 852 886 |
| I: 852 886 852 886 | C: 853 886 | 853 886 |
| I: 853 886 853 886 | C: 853 887 | 853 887 |
| I: 853 887 869 887 | C: 869 887 | 863 890 |
| I: 869 887 870 886 | C: 870 886 | 869 887 |
| I: 870 886 871 885 | C: 871 885 | 870 886 |
| I: 871 885 875 858 | C: 877 870 | 871 885 |
| D: 6 | L: 196 | P: 58 | N: 1 | J: 7 | O: 23 |
| D: 8 | L: 10 | P: 9 | N: 0 | J: 23 | O: 24 |
| D: 6 | L: 20 | P: 17 | N: 0 | J: 24 | O: 26 |
| D: 8 | L: 9 | P: 9 | N: 0 | J: 26 | O: 27 |
| D: 6 | L: 9 | P: 7 | N: 0 | J: 27 | O: 29 |
| D: 8 | L: 153 | P: 25 | N: 29 | J: 29 | O: 43 |
| D: 2 | L: 10 | P: 8 | N: 0 | J: 43 | O: 44 |
| D: 8 | L: 13 | P: 0 | N: 12 | J: 44 | O: 45 |
| D: 2 | L: 269 | P: 60 | N: 16 | J: 45 | O: 69 |

To give an example of position discrimination, a second stroke will be needed. Therefore, it will be assumed that the second stroke is a single downward stroke written in proximity and to the right if the U-shaped stroke so that the whole combination looks like the number 4. The pen sampling coordinates for the second stroke are:

pen.x=8789 pen.y=8501 TRANSITION=5
pen.x=8790 pen.y=8501 TRANSITION=8
pen.x=8789 pen.y=8500 TRANSITION=8
pen.x=8790 pen.y=8500 TRANSITION=8
pen.x=8789 pen.y=8501 TRANSITION=8
pen.x=8790 pen.y=8500 TRANSITION=8
pen.x=8789 pen.y=8500 TRANSITION=8
pen.x=8790 pen.y=8500 TRANSITION=8
pen.x=8789 pen.y=8501 TRANSITION=8
pen.x=8790 pen.y=8501 TRANSITION=8
pen.x=8788 pen.y=8500 TRANSITION=8
pen.x=8790 pen.y=8501 TRANSITION=8
pen.x=8788 pen.y=8502 TRANSITION=8
pen.x=8790 pen.y=8499 TRANSITION=8
pen.x=8790 pen.y=8501 TRANSITION=8
pen.x=8789 pen.y=8501 TRANSITION=8
pen.x=8790 pen.y=8500 TRANSITION=8
pen.x=8789 pen.y=8499 TRANSITION=8
pen.x=8790 pen.y=8501 TRANSITION=8
pen.x=8789 pen.y=8501 TRANSITION=8
pen.x=8790 pen.y=8502 TRANSITION=8
pen.x=8789 pen.y=8501 TRANSITION=8
pen.x=8790 pen.y=8501 TRANSITION=8
pen.x=8788 pen.y=8501 TRANSITION=8
pen.x=8790 pen.y=8502 TRANSITION=8
pen.x=8788 pen.y=8502 TRANSITION=8
pen.x=8790 pen.y=8506 TRANSITION=8
pen.x=8789 pen.y=8508 TRANSITION=8
pen.x=8790 pen.y=8510 TRANSITION=8
pen.x=8793 pen.y=8525 TRANSITION=8
pen.x=8796 pen.y=8531 TRANSITION=8
pen.x=8801 pen.y=8542 TRANSITION=8
pen.x=8801 pen.y=8552 TRANSITION=8
pen.x=8805 pen.y=8562 TRANSITION=8
pen.x=8804 pen.y=8571 TRANSITION=8
pen.x=8805 pen.y=8583 TRANSITION=8
pen.x=8807 pen.y=8594 TRANSITION=8
pen.x=8808 pen.y=8599 TRANSITION=8
pen.x=8807 pen.y=8605 TRANSITION=8
pen.x=8807 pen.y=8610 TRANSITION=8
pen.x=8808 pen.y=8621 TRANSITION=8
pen.x=8810 pen.y=8626 TRANSITION=8
pen.x=8811 pen.y=8632 TRANSITION=8
pen.x=8813 pen.y=8643 TRANSITION=8
pen.x=8813 pen.y=8653 TRANSITION=8
pen.x=8815 pen.y=8663 TRANSITION=8
pen.x=8815 pen.y=8671 TRANSITION=8
pen.x=8816 pen.y=8680 TRANSITION=8
pen.x=8816 pen.y=8691 TRANSITION=8
pen.x=8817 pen.y=8704 TRANSITION=8
pen.x=8819 pen.y=8712 TRANSITION=8
pen.x=8819 pen.y=8724 TRANSITION=8
pen.x=8820 pen.y=8731 TRANSITION=8
pen.x=8822 pen.y=8741 TRANSITION=8 pen.x=8822 pen.y=8751 TRANSITION=8
pen.x=8823 pen.y=8760 TRANSITION=8
pen.x=8822 pen.y=8771 TRANSITION=8
pen.x=8822 pen.y=8781 TRANSITION=8
pen.x=8823 pen.y=8792 TRANSITION=8
pen.x=8824 pen.y=8800 TRANSITION=8
pen.x=8823 pen.y=8811 TRANSITION=8
pen.x=8824 pen.y=8820 TRANSITION=8
pen.x=8826 pen.y=8830 TRANSITION=8
pen.x=8826 pen.y=8841 TRANSITION=8
pen.x=8829 pen.y=8852 TRANSITION=8
pen.x=8827 pen.y=8861 TRANSITION=8
pen.x=8830 pen.y=8871 TRANSITION=8
pen.x=8829 pen.y=8881 TRANSITION=8
pen.x=8830 pen.y=8884 TRANSITION=8
pen.x=8831 pen.y=8890 TRANSITION=8
pen.x=8832 pen.y=8903 TRANSITION=8
pen.x=8832 pen.y=8912 TRANSITION=8
pen.x=8835 pen.y=8920 TRANSITION=8
pen.x=8838 pen.y=8930 TRANSITION=8
pen.x=8839 pen.y=8940 TRANSITION=8
pen.x=8839 pen.y=8952 TRANSITION=8
pen.x=8840 pen.y=8956 TRANSITION=8
pen.x=8840 pen.y=8962 TRANSITION=8
pen.x=8843 pen.y=8971 TRANSITION=8
pen.x=8845 pen.y=8981 TRANSITION=8
pen.x=8845 pen.y=8990 TRANSITION=8
pen.x=8847 pen.y=9001 TRANSITION=8
pen.x=8847 pen.y=9010 TRANSITION=8
pen.x=8848 pen.y=9020 TRANSITION=8
pen.x=8850 pen.y=9024 TRANSITION=8
pen.x=8847 pen.y=9026 TRANSITION=8
pen.x=8849 pen.y=9030 TRANSITION=8
pen.x=8850 pen.y=9033 TRANSITION=8
pen.x=8849 pen.y=9035 TRANSITION=8
pen.x=8850 pen.y=9035 TRANSITION=8
pen.x=8850 pen.y=9040 TRANSITION=8
pen.x=8850 pen.y=9041 TRANSITION=7 Its dynamic features are as follows:

```
                       Scale 0
   B: 879 850     A: 880 858        E: 879 850
   B: 883 893     A: 884 901        E: 884 901
   I: 879 850 879 850       C: 884 901 884 901
D: 6     L: 509      P: 57    N: 0    J: 105   O: 162
                       Scale 1
   B: 879 850     A: 880 854        E: 879 850
   B: 884 897     A: 884 902        E: 884 902
   I: 879 850 879 850       C: 884 902 884 902
D: 6     L: 519      P: 58    N: 0    J: 101   O: 162
                       Scale 2
   B: 879 850     A: 879 852        E: 879 850
   B: 884 900     A: 885 902        E: 885 902
   I: 879 850 879 850       C: 885 902 885 902
D: 6     L: 523      P: 60    N: 0    J: 99    O: 162
                       Scale 3
   B: 879 850     A: 879 852        E: 879 850
   B: 884 903     A: 885 904        E: 885 904
   I: 879 850 879 850       C: 885 904 885 904
D: 6     L: 539      P: 61    N: 1    J: 99    O: 162
```

Proportion Discrimination

Having extracted the dynamic features, the recognition system performs proportion discrimination. The end result of the proportion discrimination is a list of meaningful prototypes assigned to each of the two the strokes. The example will be given only for the U-shaped stroke.

Before the dynamic features are used in proportion discrimination, the noise induced by passage of the pen close to one of the two diagonal directions is reduced. The resulting features have the following values:

| (direct) | (length) | (pos displ) | (neg displ) | (angl_1) | (angl_2) |
|---|---|---|---|---|---|
| | | Scale 0 | | | |
| D | 234 | 93 | 0 | 6 | 12 |
| R | 160 | 34 | 29 | 6 | −1 |
| U | 239 | 78 | 3 | −1 | −1 |
| | | Scale 1 | | | |
| D | 243 | 100 | 0 | 6 | 13 |
| R | 174 | 26 | 52 | 7 | −1 |
| U | 260 | 58 | 12 | −1 | −1 |
| | | Scale 2 | | | |
| D | 234 | 94 | 1 | 6 | 12 |
| R | 160 | 35 | 30 | 6 | −1 |
| U | 291 | 81 | 16 | −1 | −1 |
| | | Scale 3 | | | |
| D | 196 | 58 | 1 | 5 | 12 |
| R | 201 | 67 | 29 | 7 | −1 |
| U | 292 | 80 | 16 | −1 | −1 |

Note that instead of 9 segments the scale 3 dynamic feature representation has 3. This is a result of angle boundary noise reduction. The variables angl_1 and angl_2 are the 4 bit quantized values of angle difference between pairs of adjacent segments and the pairs of once removed segments.

Angle values vary between 0 and 15. The value −1 is assigned when angle computation is not possible. Angle variables are computed as static features during proportion discrimination.

Proportion discrimination proper begins with matching prototypes to connected subsets of the direction strings, and proceeds further with computing the length of the match, and then using tree structured neural networks to assign meaning to each matched prototype.

In this example, there are four lists of prototypes, one for each scale. In the following data, the columns mean the following:

0 the meaning of the stroke; the first line contains information about the stroke as seen at this scale, therefore, the meaning is null as signified by the @ symbol;

1 this column can have either 0—when the stroke did not have to be reversed to match this prototype, and 1—when reversal was needed;

2 the prototype number on the list of all prototypes;

3 the offset of the beginning of the matched prototype relative to the beginning of the direction string representing the input stroke;

4 the total number of segments in this prototype;

5 the total tablet length of the matched portion of the input stroke;

6 the x-size of the matched portion;

7 the y-size of the matched portion.

| 0 1 2 3 4 | 5 | 6 | 7 |
|---|---|---|---|
| Scale 0 | | | |
| @ 0 0 0 3 | 633 | 0 | 0 |
| U 0 7 0 3 | 633 | 33 | 31 |
| L 0 3 0 2 | 394 | 25 | 26 |

| 0 1 2 3 4 | 5 | 6 | 7 |
|---|---|---|---|
| 1 0 0 0 1 | 234 | 9 | 23 |
| − 0 1 1 1 | 160 | 16 | 3 |
| Scale 1 | | | |
| @ 0 0 0 3 | 677 | 0 | 0 |
| U 0 7 0 3 | 677 | 33 | 31 |
| L 0 3 0 2 | 417 | 27 | 26 |
| 1 0 0 0 1 | 243 | 10 | 24 |
| − 0 1 1 1 | 174 | 17 | 5 |
| Scale 2 | | | |
| @ 0 0 0 3 | 685 | 0 | 0 |
| U 0 7 0 3 | 685 | 33 | 32 |
| \ 0 3 0 2 | 394 | 25 | 26 |
| 1 0 0 0 1 | 234 | 9 | 23 |
| Scale 3 | | | |
| @ 0 0 0 3 | 689 | 0 | 0 |
| U 0 7 0 3 | 689 | 33 | 32 |
| L 0 3 0 2 | 397 | 25 | 26 |
| − 0 1 1 1 | 201 | 19 | 7 |
| 1 0 0 0 1 | 196 | 5 | 19 |

This information about the prototype lists is stored in a structure <PINFO>.

One observes that the tablet length of the prototype on the top of the list achieves maximum for scale equal to 3. This scale is therefore declared the scale with the best graded input representation for a single stroke. From now on, only the information coming from scale 3 is kept for further processing. The remaining scales are discarded.

On the level of the assignment of meaning by the neural networks, the neural networks have the following choices for meanings of the matched prototypes #7, 3, 1, 0. These are taken from the structure <protTbl[ ]> (see Appendix A).

7—"DRU", 'τ', 'V', 'U', 'O', 'j', 0, 0, 0, 0,

3—"DR", '\', '<', 'V', 'L', 'A', 'h', 'n'n 'r', 'c',

1—"R", '/', '\', '-', 'r', 0, 0, 0, 0, 0,

0—"D", '/', '\', '1', '(',')', '$f$', '$f$', 'y', '$J$',

Among these possibilities, the neural networks #7,3,1,0 have the following values of the true boundaries <tbound[ ]>. Here "T" stands for tbound[count]=TRUE, and "." stands for tbound[count]=FALSE.

| # length count | 0 | 1 | 2 | 3 | 4 | 5 | 6 | 7 | 8 |
|---|---|---|---|---|---|---|---|---|---|
| Scale 0 tbound[ ]= | | | | | | | | | |
| 7 633 | — | — | T | — | — | — | — | — | — |
| 3 394 | — | — | — | T | — | — | — | — | — |
| 1 160 | — | — | T | — | — | — | — | — | — |
| 0 234 | — | — | T | — | — | — | — | — | — |
| Scale 1 tbound[ ]= | | | | | | | | | |
| 7 677 | — | — | T | — | — | — | — | — | — |
| 3 417 | — | — | — | T | — | — | — | — | — |
| 1 174 | — | — | T | — | — | — | — | — | — |
| 0 243 | — | — | T | — | — | — | — | — | — |
| Scale 2 tbound[ ]= | | | | | | | | | |
| 7 685 | — | — | T | — | — | — | — | — | — |
| 3 394 | T | — | — | — | — | — | — | — | — |
| 1 160 | — | — | T | — | — | — | — | — | — |
| 0 234 | — | — | T | — | — | — | — | — | — |
| Scale 3 tbound[ ]= | | | | | | | | | |
| 7 689 | — | — | T | — | — | — | — | — | — |
| 3 397 | — | — | — | T | — | — | — | — | — |
| 1 201 | — | — | T | — | — | — | — | — | — |
| 0 196 | — | — | T | — | — | — | — | — | — |

This concludes proportion discrimination. The next step is to store the prototype lists for strokes in a structure which describes a group of strokes and then perform clustering and position discrimination.

Clustering and Position Discrimination

The first step in clustering is loading the dynamic features into the stroke buffer <BUFF timeBuff[BUFFNUM]>. In addition to copying the values of dynamic features from structure <PINFO> into array of structures <BUFF>, the system extracts the static features needed exclusively for position discrimination. These features are called the binding points. There up to <BINDNUM> of them, and for this particular example there are exactly three. These binding points are determined for every meaningful prototype on the list.

Here the binding points will be presented for the largest prototypes. For the example U-shaped stroke, the coordinates of the binding points for the prototype "DRU" are:

| point # | x-coord | y-coord | |
|---|---|---|---|
| 0 | 843 | 863 | coordinates of the beginning of the prototype |
| 1 | 875 | 859 | coordinates of the end of the prototype |
| 2 | 863 | 890 | coordinates of the y-maximum of the middle segment of the prototype |

For the example of the downward stroke the coordinates of the binding points for the prototype "D" are:

| point # | x-coord | y-coord | |
|---|---|---|---|
| 0 | 879 | 850 | coordinates of the beginning of the prototype |
| 1 | 885 | 904 | coordinates of the end of the prototype |
| 2 | 882 | 877 | coordinates of the middle of the prototype |

The multistroke prototype oftype code number 108 is matched by the combination of the strokes in this example. This is the multistroke prototype # 7 on the list of multi-stroke prototypes. It has the following possible meanings:

| # | type code | meanings |
|---|---|---|
| #7 | 108, | 'K', '4', 'Y', 'u', 'N', 'Y', 0, 0, 0 |

The next matched multistroke prototype is # 3. This prototype is made up from one L-shaped stroke and one downward stroke. Its possible meanings are given by:

| # | type code | meanings |
|---|---|---|
| 3 | 104, | '4', 'u', 'd', 'K', '4', 'Y', 'K', 'X', 'Y' |

For a given group of up to <STRKNUM> strokes, the system computes squares of up to <BINDNUM*BINDNUM> distances between the binding points of each two strokes in the group. In this example, there are only two strokes with three binding points each, therefore, one obtains:
x[00]=1465
x[10]=80
x[20]=1856
x[01]=3445
x[11]=2216
x[21]=680
x[02]=1717
x[12]=410
x[22]=560
In general, for stroke of more complicated shapes one could have <BINDNUM>=4 binding points.

One observes that among the nine distances, the smallest is between the rightmost tip of the U-shaped stroke and upper tip of the downward stroke. This results in assignment of <TRUE> to variable tbound[1] and <FALSE> to <tbound [0]>. Consequently the meaning of the multistroke prototype is declared '4'.

The process of clustering results in one cluster, described by the cluster buffer <BINFO *buf>. The non null entries in this buffer are given by:
(*buf).Sym[0]='4';
(*buf).Siz[0].x=41;
(*buf).Sym[0].y=52;
(*buf).Pos[0].x=864;
(*buf).Pos[0].y=877;
(*buf).Len[0]=1228;
(*buf).Prt[0]=107;
(*buf).Frm[0][0]=0;
(*buf).Frm[0][1]=1;

Scanning

The process of scanning the current stroke buffer for this example may be summarized as follows.

1. After the dynamic features were extracted from the most recent stroke call ScanBuff( ).

2. In ScanBuff( ): order all strokes in the current stroke buffer left to right. In this example, the strokes are already in this order because the second stroke was written to the right of the first one.

The variable <timeOrdr[ ]> contains the order of strokes after reordering:
timeOrdr[0]=0
timeOrdr[1]=1
The following chart lists all clusters and their composition. The first on the line is the meaning of the cluster, then follows the list of the indexes of the constituent strokes in the stroke buffer. The value 254 is an initialization value NULL_SYM.

| U | 0 254 254 254 |
| 1 | 1 254 254 254 |

The variable <oldTimeOrdr[ ]> contains the order of strokes before reordering. In this case, it is identical to the <timeOrdr[ ]>:

oldTimeOrdr[0]=0
oldTimeOrdr[1]=1

| U | 0 254 254 254 |
| 1 | 1 254 254 254 |

3. ScanBuff( ) determines the region of influence for the most recent stroke. The variable <begscan> is the index of the leftmost stroke of the influence zone and the value of the variable <endScan> is the index of the rightmost stroke in the influence zone. All indexes are into the stroke buffer <BUFF timeBuff[ ]>.

In this example, the influence zone contains all the strokes of the stroke buffer. The size of the zone in the present embodiment does not exceed twice of STRKNUM. It should be noted, however, that, in general, the influence zone could be as large as the number of strokes in the stroke buffer. Such an event is extremely rare.
begScan=0
endScan=2
The following chart contains the results of loading strokes from the stroke buffer into the window buffer:
<BUFF windBuff[STRKNUM]>
windB: put in wind=0 sym=U
windb: put in wind=1 sym=1
In this example, both of the two strokes are loaded into the window buffer. In general there could be at most STRKNUM strokes loaded because we assume that there are at maximum four strokes in each meaningful symbol.

4. The scanning loop in the ScanBuff( ) begins:
  0 TOP OF WHILE LOOP
  4.1 The variables relevant to the scanning loop are as follows. The variable <buff> is the number of strokes in the stroke buffer, <feet> is the number of strokes in the largest cluster found within the strokes of the window buffer, <scan> is the scanning loop termination variable, and <wind> is the number of strokes in the window buffer. Note that this is the top of the scanning loop and the position discrimination has not been used yet. The values for the above-identified variables are:
    buff=2 feet=0 scan=0 wind=2
  4.2 The variable <clustSym> is the meaning of the best cluster within the window buffer. At this stage it is null because the system has not tried to interpret the window buffer yet.
    clustSym=@
  4.3 The following line lists all the strokes from <timeBuff[ ]> which make up cluster found in <windBuff[ ]>. At this stage there are no strokes because there is no cluster.
    frm0=254 frm1=254 frm2=254 frm3=254
  4.4 The following line lists the strokes that remain to be processed during scanning of this region of influence.
    rmn0=0 rmn1=1 rmn2=254 rmn3=254
    wnd0=U wnd1=1 wnd2=■ wnd3=■
  4.5 The following chart lists the stroke buffer entries. There is a U-shaped stroke and a downward stroke in the stroke buffer.

| U[0] posx 860 | 0 254 254 254 |
| 1[1] posx 882 | 1 254 254 254 |

4.6 The system found that the multistroke prototype #108 matches a combination of two prototypes on the two prototype lists corresponding to the entries to the stroke buffer.
    typeCode=108

4.7 At this point, the routine InterList0 is called to determine the cluste?s composition, meaning, etc.
in InterList: frm0=0 fin1=1 frm2=254 frm3=254
bundSym=4 typeCode=108 typeFit=1228

4.8 The entries from the stroke buffer prototype lists which make up the # 108 cluster are:
Prt=7 Len=3 Fit=689 px=860 py=860 sx=33 sy=32 sym=U
Prt=0 Len=1 Fit=539 px=882 py=882 sx=6 sy=53 sym=1,
where <.Prt> is the single stroke prototype number, <.Len> is the number of directions in its directions string, <.Fit> is its length, <.px> is its x-position, <.py> is its y-position, <.sx> is its x-size, <.sy> is its y-size, and <.sym> is the meaning of the prototype.

4.9 The next multistroke prototype matched is #104, which is made from one downward stroke and one L-shaped stroke. This prototype is also accepted as meaningful.

4.10 InterBuff( ) is called and the system determines that the #104 cluster in the window buffer has the following meaning, multistroke prototype number, and length:
bundSym=4 typeCode=104 typeFit=936

4.11 The entries from the stroke buffer prototype lists which make up the # 104 cluster are:
Prt=3 Len=2 Fit=397 px=856 py=856 sx=25 sy=26 sym=L
Prt=0 Len=1 Fit=539 px=882 py=882 sx=6 sy=53 sym=1
This cluster also uses all the strokes in the window buffer.
in InterList: frm0=0 frm1=1 frm2=254 frm3=254

4.12 Because the cluster #108 is 1228 tablet pixels long and cluster #104 is only 936 pixels long, the first cluster is chosen as the most representative. Note however that the meaning of the second cluster is also '4'. If for some reason the system would have rejected the first prototype it would have still recognized the input as '4'but with less confidence.

4.13 The system returns from InterList( ) back to ScanBuff( ) and prints the information about the best cluster found in the window buffer:
1 LIST INTERPRETED
buff=2 feet=2 scan=0 wind=2
clustSym=4
frm0=0 frm1=1 frm2=254 frm3=254
rmn0=0 rmn1=1 rmn2=254 rmn3=254
wnd0=U wnd1=1 wnd2=■ wnd3=■

| U[0] posx 860 | 0 254 254 254 |
| 1[1] posx 882 | 1 254 254 254 |

4.14 At this point, the system determines which of the strokes need to be removed form the window buffer to proceed with scanning. It determines that strokes #0 and # I should be removed:
remove[0]=0
remove[1]=1
remove[2]=254
remove[3]=254

4.15 Now the cleaning of the window buffer begins:
2 BUFF CLEANED
buff=2 feet 2 scan=0 wind=2
clustSym=4
fim0=0 frm1=1 frm2=254 frm3=254
rmn0=0 rmn1=1 rmn2=254 rmn3=254
wnd0=U wnd1=1 wnd2=■ wnd3=■

After cluster stroke removal there is nothing left:

| ■[0] posx 10 | 254 254 254 254 |
| ■[1] posx 10 | 254 254 254 254 | remain[0]=254
remain[1]=254
remain[2]=254
remain[3]=254

4.16 Now the found cluster is put into the cluster buffer.
3 CLUSTER PUT IN BUF
buff=2 feet=2 scan=2 wind=2
clustSym=4
frm0=0 frm1=1 frm2=254 frm3=254
rmn0=254 rmn1=254 rmn2=254 rmn3=254
wnd0=U wnd1=1 wnd2=■ wnd3=■

| 4[0] posx 864 | 0  1 254 254 |
| ■[1] posx 10 | 254 254 254 254 |

4.17 The system attempts to load into the window buffer any remaining strokes from the influence zone of the stroke buffer. In this example, there are none.
4 WINDOW LOADED
buff=2 feet=2 scan=2 wind=0
clustSym=4
frm0=0 frm1=1 frm2=254 frm3=254
rmn0=254 rmn1=254 rmn2=254 rmn3=254
wnd0=■ wnd1=■ wnd2=■ wnd3=■

| 4[0] posx 864 | 0  1 254 254 |
| ■[1] posx 10 | 254 254 254 254 |

4.18 The single cluster descriptor for the window buffer is re-initialized.
5 CLUSTER CLEANED
buff=2 feet=2 scan=2 wind=0
clustSym=@
frm0=254 frm1=254 frm2=254 frm3=254
rmn0=254 rmn1=254 rmn2=254 rmn3=254
wnd0=■ wnd1=■ wnd2=■ wnd3=■

| 4[0] posx 864 | 0  1 254 254 |
| ■[1] posx 10 | 254 254 254 254 |

4.19 End of scanning.

APPENDIX A

```
struct protTbl{
    char longProt[PROTLEN];
    UCHAR symbols[BRCHNUM];
    {protTbl[PROTNUM]3 = {
/*00*/ "D",     '/', '\', '1', '(', ')', 'ſ', 'f', 'y', 'J',
/*01*/ "R",     '/', '\', '-', 'r', 0, 0, 0, 0, 0,
/*02*/ "DL",    '/', 'J', 'U', 'S', 0, 0, 0, 0, 0,
/*03*/ "DR",    '\', '<', 'V', 'L', 'A', 'h', 'n', 'r', 'c',
/*04*/ "LD",    '/', 'r', 'T', 0, 0, 0, 0, 0, 0,
/*05*/ "RD",    '\', '7', 'ι', '1', 0, 0, 0, 0, 0,
/*06*/ "URD",   '1', '', 'n', 'f', '1', '7', 0, 0, 0,
/*07*/ "DRU",   'τ', 'V', 'U', 'O', 'j', 0, 0, 0, 0,
/*08*/ "LDR",   '<', '[', 'C', 'L', 'v', 0, 0, 0, 0,
/*09*/ "RDL",   '>', ')', '[', '7', 'S', 'y', 0, 0, 0,
/*10*/ "RDR",   '~', '2', 'Z', 'N', 'M', 'L', 'n', 'u', 'h',
/*11*/ "LDL",   'S', '5', 'J', '{', 'v', 0, 0, 0, 0,
```

APPENDIX A-continued

```
/*12*/ "DRD",       '~', 'n', 'h', 'y', 'M', 0, 0, 0, 0,
/*13*/ "DLD",       '~', 'N', 'W', 0, 0, 0, 0, 0, 0,
/*14*/ "URDL",      'P', 'D', 'O', '1', 'A', '1', 'S', 'j', '7',
/*15*/ "ULDR",      'C', '9', 'O', 'e', '1', 'α', 'b', 'f', 'x',
//15                '4', '7', 'G', 'a', '&', 'g', 'S',
/*16*/ "DRUL",      'D', 'b', 'k', '6', 'O', '&', 's', 'j', 'q',
/*17*/ "LDRU",      'L', 'j', 'r', 'O', 'σ', 'α', 's', 'y', '2',
//17                'd', 0, 0, 0, 0, 0, 0, 0, 0,
/*18*/ "RDLD",      'T', 'U', '7', 'J', '?', 0, 0, 0, 0,
/*19*/ "LDRD",      'T', '7', '9', 'a', 'G', 'S', 'n', 0, 0,
/*20*/ "DRDL",      'b', 'J', '1', 'h', 'y', 'n', 0, 0, 0,
/*21*/ "DLDR",      'σ', 'd', '1', 'C', 0, 0, 0, 0, 0,
/*22*/ "DRUR",      'r', 'v', '8', '✓', 'V', 'h', 'w', 0, 0,
/*23*/ "URDR",      'r', 'i', 'a', 'k', 'q', 0, 0, 0, 0,
/*24*/ "RESV",      0, 0, 0, 0, 0, 0, 0, 0, 0,
/*25*/ "LDRDR",     'q', 'h', 0, 0, 0, 0, 0, 0, 0,
/*26*/ "RDLDL",     '3', '}', 0, 0, 0, 0, 0, 0, 0,
/*27*/ "URDRU",     '~', '&', 'N', 'v', 0, 0, 0, 0, 0,
/*28*/ "LDRDL",     'J', 'G', 'S', 'g', '5', 'h', 0, 0, 0,
/*29*/ "RDLDR",     '=', 'k', '2', 'Z', 's', 'q', 'h', 'c', 0,
/*30*/ "RDLUR",     'Z', '2', 'J', 'G', '6', 'O', 'r', 'τ', 's',
//30                'b', 'f', 'S', '8'
/*31*/ "DRURD",     '4', 'h', 'n', 'u', '7', 'r', 'Y', 'G', 'A',
//31                'm', 'N', 'y', 's', 'k', 'R', 'W',
/*32*/ "DLURD",     'h', 'n', 'r', '7', 'A', 'N', 'α', 'D', 'f',
//32                '9', 'x', 'b',
/*33*/ "DRULD",     'u', '6', 'y', '4', 's', 'd', 0, 0, 0,
/*34*/ "LURDL",     '9', 'O', 'e', 'l', '1', 'b', 'f', 'i', 'C',
//34                'q', 'p', '4', 0, 0, 0, 0, 0, 0,
/*35*/ "RDRDL",     '3', 'M', 0, 0, 0, 0, 0, 0, 0,
/*36*/ "LDRUR",     '8', 'o', 'G', 'f', 'F', 'S', 'δ', 'J', 0,
/*37*/ "DRULU",     '8', 'S', 0, 0, 0, 0, 0, 0, 0,
/*38*/ "DLURU",     '8', 0, 0, 0, 0, 0, 0, 0, 0,
/*39*/ "RDRUL",     'A', '8', 0, 0, 0, 0, 0, 0, 0,
/*40*/ "ULDRD",     '8', '9', 'k', 'h', 0, 0, 0, 0, 0,
/*41*/ "LULDR",     '<', '{', '8', '&', 0, 0, 0, 0, 0,
/*42*/ "URULD",     '8', 0, 0, 0, 0, 0, 0, 0, 0,
/*43*/ "RURDL",     '8', 's', '}', 0, 0, 0, 0, 0, 0,
/*44*/ "URDLD",     'R', 'k', '7', 0, 0, 0, 0, 0, 0,
/*45*/ "RESRV",     0, 0, 0, 0, 0, 0, 0, 0, 0,
/*46*/ "RESRV",     0, 0, 0, 0, 0, 0, 0, 0, 0,
/*47*/ "ULDRUR",    'b', 'f', 'G', 'F', 0, 0, 0, 0, 0,
/*48*/ "LDRURD",    '9', 'a', 'G', 'd', 'q', '4', 's', 'u', 'f',
/*49*/ "LDRULD",    '6', '9', 'a', 'G', 'd', 'O', 'Q', 'q', '4',
//49                'b', 's', 'u',
/*50*/ "DRURDL",    'y', 'b', 'P', 'D', '7', 'R', 'k', 'j', 'A',
/*51*/ "DRULDL",    'y', 'φ', 'G', '}', 0, 0, 0, 0, 0,
/*52*/ "DLURDL",    'b', 'P', 'D', '7', 'A', 'k', 'f', '9', 0,
/*53*/ "DLULDR",    'd', 'A', 'C', 'a', 0, 0, 0, 0, 0,
/*54*/ "DRULDR",    'd', 'A', 'C', 'q', 0, 0, 0, 0, 0,
/*55*/ "URDRDL",    'B', 'β', '3', 'z', 'y', 'M', 0, 0, 0,
/*56*/ "URDLDR",    '&', 's', 'R', 'A', 'k', 'K', 0, 0, 0,
/*57*/ "RDLURD",    'b', 'f', '2', 'O', 's', 0, 0, 0, 0,
/*58*/ "RESRVD",    0, 0, 0, 0, 0, 0, 0, 0, 0,
/*59*/ "RESRVD",    0, 0, 0, 0, 0, 0, 0, 0, 0,
/*60*/ "RESRVD",    0, 0, 0, 0, 0, 0, 0, 0, 0,
/*61*/ "URDRURD",   'M', 'm', 'z', 'R', 'B', 'u', 'h', 0, 0,
/*62*/ "DRURURD",   'H', '4', 'K', 'k', 0, 0, 0, 0, 0,
/*63*/ "DRURULD",   'H', '4', 'K', 'k', 0, 0, 0, 0, 0,
/*64*/ "DLURURD",   'H', '4', 'K', 'k', 0, 0, 0, 0, 0,
/*65*/ "DLURULD",   'H', '4', 'K', 'k', 0, 0, 0, 0, 0,
/*66*/ "DRURDRU",   'q', 'N', 'W', 'w', 'm', 'h', 'n', 'u', '@',
//66                'H', 'A',
/*67*/ "RDLDRDL",   'z', 'B', '3', '{', '}', 'y', 0, 0, 0,
/*68*/ "RDLURDL",   'z', 'B', '3', '{', 0, 0, 0, 0, 0,
/*69*/ "LDRDLDR",   'Σ', 'E', 'a', 'q', '9', 'u', 0, 0, '@',
/*70*/ "LDRULDR",   'E', 'd', 'a', 'q', 'f', 'G', '6', 'o', '2',
/*71*/ "LDRULUR",   'f', 'G', '8', 'g', 'q', 0, 0, 0, 0,
/*72*/ "DRDLURU",   'b', '8', 0, 0, 0, 0, 0, 0, 0,
/*73*/ "URLDRD",    '8', 0, 0, 0, 0, 0, 0, 0, 0,
/*74*/ "URDLDRD",   'B', 'R', 'k', 0, 0, 0, 0, 0, 0,
/*75*/ "URDLURD",   'R', 'm', 'M', 'n', 'k', 'd', 0, 0, 0,
/*76*/ "LDRURDL",   '&', 'g', '5', 'y', 'G', 'b', 0, 0, 0,
/*77*/ "LDRULDL",   'g', 'G', 0, 0, 0, 0, 0, 0, 0,
/*78*/ "LDRURDR",   'q', 'd', 'a', 'G', 'u', 0, 0, 0, 0,
/*79*/ "DRULDRU",   'W', 0, 0, 0, 0, 0, 0, 0, '@',
/*80*/ "DRURDLD",   'R', 'F', 'k', 0, 0, 0, 0, 0, 0,
/*81*/ "DLURDLD",   'R', 'F', 'k', 0, 0, 0, 0, 0, 0,
/*82*/ "DLURDLDR",  'B', 'R', 'k', 'F', 0, 0, 0, 0, 0,
/*83*/ "DRURDLDR",  'B', 'R', 'k', 'F', 0, 0, 0, 0, 0,
/*84*/ "URDLDRDL",  'B', 'β', 'm', 0, 0, 0, 0, 0, 0,
/*85*/ "URDLURDL",  'B', 'β', 'm', 0, 0, 0, 0, 0, 0,
/*86*/ "LDRURDLU",  'q', 'g', '5', 'G', 0, 0, 0, 0, 0,
/*87*/ "LDRULDLU",  'q', 'g', 'G', 0, 0, 0, 0, 0, 0,
/*88*/ "LDRURDRU",  'q', 'd', 'a', 'G', 'w', 0, 0, 0, '@',
/*89*/ "LDRULDRU",  'E', 'd', 'a', 'q', 'f', 'G', '6', 'o', '2',
//89                '@', 'w',
};
    struct bundle {
        ULONG typeCode;
        UCHAR syms[BRCHNUM];
    } symsTbl[COMPNUM] = {}
/*00*/ 101, 'X', 'Y', 'V', '^', '1', 'K', 'D', 0, 0,
/*01*/ 102, '+', 'Y', '1', 'T', 'L', 'U', '7', 'X', 't',
/*02*/ 103, 'D', 'X', 'Y', 'Y', 'D', 'N', 'H', 0, 0,
/*03*/ 104, '4', 'u', 'd', 'K', '4', 'Y', 'K', 'X', 'Y',
/*04*/ 105, '∩', 'Y', 'K', 'K', 'X', 'k', 0, 0, 0,
/*05*/ 106, 'n', 'h', 'Y', 'X', 0, 0, 0, 0, 0,
/*06*/ 107, 'n', 'h', 0, 0, 0, 0, 0, 0, 0,
/*07*/ 108, 'K', '4', 'Y', 'u', 'N', 'Y', 0, 0, 0,
/*08*/ 109, 'K', '4', 'd', '9', 'e', 0, 0, 0, 0,
/*09*/ 110, 'P', 'b', 'D', 0, 0, 0, 0, 0, 0,
/*10*/ 111, '4', 'U', 'P', 'R', 'x', 0, 0, 0, 0,
/*11*/ 115, 'Q', '0', '9', 'P', 'd', 'b', 'H', '4', 'K',
/*12*/ 116, 'Q', '0', '9', 'P', 'd', 'b', 'H', '4', 'K',
/*13*/ 117, 'Q', '0', '9', 'P', 'd', 'b', 'H', '4', 'K',
/*14*/ 118, 'Q', '0', '9', 'P', 'd', 'b', 'H', '4', 'K',
/*15*/ 127, 'B', 0, 0, 0, 0, 0, 0, 0, 0,
/*16*/ 134, 'M', 0, 0, 0, 0, 0, 0, 0, 0,
/*17*/ 123, 'K', 'Y', 'N', '4', 'H', 0, 0, 0, 0,
/*18*/ 129, '$', 0, 0, 0, 0, 0, 0, 0, 0,
/*19*/ 130, '4', 0, 'R', 'I', 0, 0, 0, 0, 0,
/*20*/ 131, '4', 0, 'R', 0, 0, 0, 0, 0, 0,
/*21*/ 132, 'M', 0, 0, 0, 0, 0, 0, 0, 0,
/*22*/ 133, 'M', 'K', 0, 0, 0, 0, 0, 0, 0,
/*23*/ 136, 'B', 0, 0, 0, 0, 0, 0, 0, 0,
/*24*/ 162, 'M', 0, 0, 0, 0, 0, 0, 0, 0,
/*25*/ 168, 'B', 0, 0, 0, 0, 0, 0, 0, 0,
/*26*/ 169, 'B', 0, 0, 0, 0, 0, 0, 0, 0,
/*27*/ 202, 'X', '>', '<', '=', 'Y', 0, 0, 0, 0,
/*28*/ 203, 'J', '[', '5', 'T', 0, 0, 0, 0, 0,
/*29*/ 204, '[', 't', 't', '4', 0, 0, 0, 0, 0,
/*30*/ 205, 'F', 'f', '[', 0, 0, 0, 0, 0, 0,
/*31*/ 206, '7', '1', ']', '5', 0, 0, 0, 0, 0,
/*32*/ 207, 'A', 'f', '7', '1', 't', 0, 0, 0, 0,
/*33*/ 208, 'J', '5', 0, 0, 0, 0, 0, 0, 0,
/*34*/ 209, 'E', 't', '4', 'G', 0, 0, 0, 0, 0,
/*35*/ 211, 'Z', 0, 0, 0, 0, 0, 0, 0, 0,
/*36*/ 212, 'J', '5', 'f', 0, 0, 0, 0, 0, 0,
/*37*/ 215, '0', 'Q', 'f', '5', 'G', 'J', 0, 0, 0,
/*38*/ 216, '0', 'Q', 0, 0, 0, 0, 0, 0, 0,
/*39*/ 219, 'F', 0, 0, 0, 0, 0, 0, 0, 0,
/*40*/ 220, '7', 0, 0, 0, 0, 0, 0, 0, 0,
/*41*/ 221, '3', '5', '1', 'J', 0, 0, 0, 0, 0,
/*42*/ 222, '1', 0, 0, 0, 0, 0, 0, 0, 0,
/*43*/ 225, 'F', 'f', 0, 0, 0, 0, 0, 0, 0,
/*44*/ 232, 'A', '7', '1', 'F', 0, 0, 0, 0, 0,
/*45*/ 233, 'A', '7', 'F', 0, 0, 0, 0, 0, 0,
/*46*/ 235, 't', 0, 0, 0, 0, 0, 0, 0, 0,
/*47*/ 237, 'G', 'H', 0, 0, 0, 0, 0, 0, 0,
/*48*/ 315, '0', 'g', 0, 0, 0, 0, 0, 0, 0,
/*49*/ 408, 'u', 0, 0, 0, 0, 0, 0, 0, 0,
/*50*/ 409, 'd', 0, 0, 0, 0, 0, 0, 0, 0,
/*51*/ 415, 'a', 'q', 'd', '0', 'Q', 0, 0, 0, 0,
/*52*/ 506, 'M', 0, 0, 0, 0, 0, 0, 0, 0,
/*53*/ 515, '0', 0, 0, 0, 0, 0, 0, 0, 0,
/*54*/ 532, 'm', 0, 0, 0, 0, 0, 0, 0, 0,
/*55*/ 533, 'm', 0, 0, 0, 0, 0, 0, 0, 0,
/*56*/ 606, '3', 0, 0, 0, 0, 0, 0, 0, 0,
/*57*/ 615, 'Q', '0', 'G', 0, 0, 0, 0, 0, 0,
/*58*/ 707, 'M', 0, 0, 0, 0, 0, 0, 0, 0,
/*59*/ 808, 'W', 0, 0, 0, 0, 0, 0, 0, 0,
/*60*/ 909, 'E', '4', 0, 0, 0, 0, 0, 0, 0,
/*61*/ 910, 'x', 'O', 0, 0, 0, 0, 0, 0, 0,
/*62*/ 911, 'a', 0, 0, 0, 0, 0, 0, 0, 0,
/*63*/ 1010, '3', 0, 0, 0, 0, 0, 0, 0, 0,
/*64*/ 1515, '8', 0, 'g', 0, 0, 0, 0, 0, 0,
/*65*/ 10101, 'K', '*', 'N', 'Y', 0, 0, 0, 0, 0,
```

APPENDIX A-continued

```
 66*/   10102, 'A', '*', 'K', '4', '1', 'Y', 'H', 'U', 0,
 67*/   10108, 'M', 'K', 0, 0, 0, 0, 0, 0, 0, 0,
 68*/   10110, 'R', 'P', 0, 0, 0, 0, 0, 0, 0, 0,
 69*/   10129, '$', 0, 0, 0, 0, 0, 0, 0, 0, 0,
 70*/   10202, 'F', 'I', '*', '[', '1', 'K', '±', 'Ø', 0,
 71*/   10210, 'R', 'P', 0, 0, 0, 0, 0, 0, 0, 0,
 72*/   10606, 'm', 0, 0, 0, 0, 0, 0, 0, 0, 0,
 73*/   10707, 'm', 0, 0, 0, 0, 0, 0, 0, 0, 0,
 74*/   11010, 'B', 0, 0, 0, 0, 0, 0, 0, 0, 0,
 75*/   11515, '%', 0, 0, 0, 0, 0, 0, 0, 0, 0,
 76*/   20202, '*', 'H', 'A', '≡', 0, 0, 0, 0, 0,
 77*/   20204, 'E', 0, 0, 0, 0, 0, 0, 0, 0, 0,
 78*/   20205, 'E', 0, 0, 0, 0, 0, 0, 0, 0, 0,
 79*/   20223, 'E', 0, 0, 0, 0, 0, 0, 0, 0, 0,
 80*/   1020202, 'E', '*', 0, 0, 0, 0, 0, 0, 0,
 81*/   1010202, '#', 'M', 'W', 0, 'O', '*', 0, 0, 0,
 82*/   230, 'Z', 0, 0, 0, 0, 0, 0, 0, 0, 0,
 83*/   231, 'Z', 0, 0, 0, 0, 0, 0, 0, 0, 0,
 84*/   10104, 'K', 0, 0, 0, 0, 0, 0, 0, 0, 0,
 85*/   10204, 'K', 0, 0, 0, 0, 0, 0, 0, 0, 0,
 86*/   120, 'K', 0, 0, 0, 0, 0, 0, 0, 0, 0,
 87*/   122, 'K', '4', 0, 0, 0, 0, 0, 0, 0, 0,
 88*/   809, 'K', 0, 0, 0, 0, 0, 0, 0, 0, 0,
 89*/   10205, '*', 'A', 0, 0, 0, 0, 0, 0, 0, 0,
 90*/   170, '&', 0, 0, 0, 0, 0, 0, 0, 0, 0,
 91*/   171, '&', 0, 0, 0, 0, 0, 0, 0, 0, 0,
 92*/   0, 0, 0, 0, 0, 0, 0, 0, 0, 0, 0,
 93*/   0, 0, 0, 0, 0, 0, 0, 0, 0, 0, 0,
 94*/   112, '$', 0, 0, 0, 0, 0, 0, 0, 0, 0,
 95*/   1010101, 'M', 'W', 0, 0, 0, 0, 0, 0, 0,
 96*/   0, 0, 0, 0, 0, 0, 0, 0, 0, 0, 0,
 97*/   0, 0, 0, 0, 0, 0, 0, 0, 0, 0, 0,
 98*/   1112, '}', 'x', 0, 0, 0, 0, 0, 0, 0,
 99*/   0, 0, 0, 0, 0, 0, 0, 0, 0, 0,
100*/   229, 0, 0, 0, 0, 0, 0, 0, 0, 0, 0,
101*/   609, 'G', 0, 0, 0, 0, 0, 0, 0, 0, 0,
102*/   304, 'Y', 0, 0, 0, 0, 0, 0, 0, 0, 0,
103*/   119, 'R', 0, 0, 0, 0, 0, 0, 0, 0, 0,
104*/   158, 'R', 0, 0, 0, 0, 0, 0, 0, 0, 0,
105*/   151, 'R', 0, 0, 0, 0, 0, 0, 0, 0, 0,
106*/   10115, 'R', 0, 0, 0, 0, 0, 0, 0, 0, 0,
107*/   210, '7', '≧', '5', '1', 'A', 0, 0, 0, 0,
108*/   430, 'E', 0, 0, 0, 0, 0, 0, 0, 0, 0,
109*/   191, 'i', '!', 'j', ';', 0, 0, 0, 0, 0,
110*/   391, 'j', 0, 0, 0, 0, 0, 0, 0, 0, 0,
111*/   491, 'i', 0, 0, 0, 0, 0, 0, 0, 0,
112*/   1991, '?', '?', 0, 0, 0, 0, 0, 0, 0,
113*/   9191, ':', ';', 0, 0, 0, 0, 0, 0, 0,
114*/   691, '?', ';', 0, 0, 0, 0, 0, 0, 0,
115*/   1091, '?', 'j', ';', 0, 0, 0, 0, 0, 0,
116*/   991, 'i', 0, 0, 0, 0, 0, 0, 0, 0,
117*/   10206, 'A', 0, 0, 0, 0, 0, 0, 0, 0,
118*/   249, 'G', 0, 0, 0, 0, 0, 0, 0, 0,
119*/   1591, 'j', 0, 0, 0, 0, 0, 0, 0, 0
        }
```

What is claimed is:

1. A handwritten character recognition system for use in a data processing system including a tablet and pen for user entry of handwritten characters and a processing unit connected from the tablet and pen for operating upon the user input under control of the character recognition system, the handwritten character recognition system comprising:

a pen input detector for detecting and indicating user inputs through the tablet and pen, the user inputs including pen strokes and pen states, an input cluster buffer connected from the pen input detector for storing stroke descriptor information of a current stroke as the current stroke is entered by the user, a point buffer connected from the input cluster buffer for storing the stroke descriptor information of the current stroke, a point detector connected from the input cluster buffer and responsive to the pen states for transferring the stroke descriptor information of the current stroke into the point buffer, a stroke feature recognizer including a dynamic stroke feature extractor connected ftom the point buffer and responsive to a pen down state for dynamically extracting stroke recognition features from the stroke descriptor information of the current stroke as the current stroke is entered by the user and for assigning a meaning to the current stroke, wherein the stroke recoriition features describe the current stroke with variable degrees of hierarchical approximations, the hierarchical approximations including multiple scalar representations of the current stroke, and a cluster recognizer connected ftom the stroke feature recognizer and responsive to the meaning assigned to each stroke for recognizing and assigning a character meaning to a current cluster of strokes.

2. The handwritten character recognition system of claim 1 wherein the stroke feature recognizer further comprises:

a static stroke feature extractor connected from the point buffer and responsive to the pen states for extracting stroke recognition features from the stroke descriptor information of the current stroke when the current stroke is completed.

3. The handwritten character recognition system of claim 2 wherein:

the static stroke feature extractor is responsive to a pen up state for statically extracting stroke recognition features from the stroke descriptor information of the current stroke when the current stroke is completed.

4. The handwritten character recognition system of claim 1 wherein the stroke descriptor information comprises:

for each stroke, a sequence of coordinate points along the line of the stroke, including at least the first and last points of the line of the stroke, and a direction string indicating, for each point of the string, the direction of movement of the line of the stroke at the point.

5. The handwritten character recognition system of claim 4 wherein the stroke feature extractor further comprises:

a segment analyzer for identifying segments of a stroke wherein a segment of a stroke includes at least a beginning point of the segment and an end point of the segment and wherein a segment does not contain a change in direction of movement of the line of the stroke, a direction analyzer for identifying changes in the direction of movement of the line of a stroke wherein a change in direction of movement of the line of a stroke occurs when an angle between two lines connecting three consecutive points along the stroke exceeds a predetermined boundary defined by two lines extending from any one of the three points, the two lines extending from that point in the direction of movement of the pen at that point and the angle between the two lines being defined by predetermined displacement perpendicular to the direction of movement of the pen at that point.

6. The handwritten character recognition system of claim 5 wherein the segment analyzer further comprises:

a segment constructor responsive to the direction analyzer for inserting an additional point at a change in direction of the line of a stroke, the additional point is located at the end point of the segment before the change in direction of the line of the stroke and operating as the beginning point of the segment following the change in direction of the line of the stroke.

7. The handwritten character recognition system of claim 1 wherein the stroke feature recognizer further comprises:
   a stroke recognition feature data structure for storing the stroke recognition features extracted from the current stroke, wherein
      the stroke recognition features describe the current stroke with variable degrees of hierarchical approximations, the hierarchical approximations including multiple scalar representations of the current stroke and including the direction string indicating, for points along the line of the stroke, the direction of movement of the line of the stroke at each point.

8. The handwritten character recognition system of claim 7 wherein the stroke recognition features further include:
   the coordinates of at least the beginning and end points of the line of the stroke.

9. The handwritten character recognition system of claim 7 wherein the stroke recognition features further include:
   an array of coordinates of all points along the line of the stroke as received as input coordinates from the tablet.

10. A handwritten character recognition system for use in a data processing system including a tablet and pen for user entry of handwritten characters and a processing unit connected from the tablet and pen for operating upon the user input under control of the character recognition system, the handwritten character recognition system comprising:
    a pen input detector for detecting and indicating user inputs through the tablet and pen, the user inputs including pen strokes and pen states,
    an input cluster buffer connected from the pen input detector for storing stroke descriptor information of a current stroke as the current stroke is entered by the user,
    a point buffer connected ftom the input cluster buffer for storing the stroke descriptor information of the current stroke,
    a point detector connected from the input cluster buffer and responsive to the pen states for transferring the stroke descriptor information of the current stroke into the point buffer,
    a stroke feature recognizer connected from the point buffer and responsive to the pen states for extracting stroke recognition features from the stroke descriptor information of the current stroke and assigning a meaning to the current stroke, and
    a cluster recognizer connected from the stroke feature recognizer and responsive to the meaning assigned to each stroke for recognizing and assigning a character meaning to a current cluster of strokes,
    wherein the stroke feature recognizer includes
      a multiple scale stroke representation generator for
         reading the stroke recognition features from the stroke recognition feature data structure,
         generating a plurality of scaled topological representations of the current stroke,
            each scaled topological representation being a progressively smoothed representation of the current stroke generated from the stroke representation features,
         selecting a scaled topological representation of the current stroke, the scaled topological representation of the current stroke being selected to provide the maximum signal to noise ratio of the stroke representation,
      a stroke proportion discriminator responsive to the scaled topological representation of the current stroke for storing a list of ideal prototype representations corresponding to possible meanings of the current stroke from a plurality of ideal prototype representations of strokes, and
      a stroke boundary discriminator responsive to the scaled topological representation of the current stroke and to the ideal prototype representations of the list of ideal prototype representations for comparing the scaled topological representation of the current stroke and
         boundaries of the ideal prototype representations of the list of ideal prototype representations wherein the boundaries of the ideal prototype representations are determined by linear combinations of features of the ideal prototype representations, and
         assigning to the current stroke an identification of an ideal prototype representation having boundaries including the scaled topological representation of the current stroke, the assigned identification of the matching ideal prototype representation representing a stroke meaning assigned to the current stroke.

11. The handwritten character recognition system of claim 10 wherein the stroke feature recognizer further comprises:
    a stroke recognition feature data structure for storing the stroke recognition features extracted from the current stroke, wherein
       the stroke recognition features describe the current stroke with variable degrees of hierarchical approximation, and include
          the direction string indicating, for points along the line of the stroke, the direction of movement of the line of the stroke at each point.

12. The handwritten character recognition system of claim 11 wherein the stroke proportion discriminator further generates, for each ideal prototype representation, a corresponding reversed ideal prototype representation having a reversed direction string for use in the comparison of features of the topological representations of the current stroke and of the ideal prototype representations.

13. A handwritten character recognition system for use in a data processing systern including a tablet and pen for user entry of handwritten characters and a processing unit connected from the tablet and pen for operating uDon the user input under control of the character recognition system, the handwritten character recognition system comprising:
    a pen input detector for detecting and indicating user inputs through the tablet and pen, the user inputs including pen strokes and pen states,
    an input cluster buffer connected from the pen input detector for storing stroke descriptor information of a current stroke as the current stroke is entered by the user,
    a point buffer connected from the input cluster buffer for storing the stroke descriptor information of the current stroke,
    a point detector connected from the input cluster bufer and responsive to the pen states for transferring the stroke descritor informration of the current stroke into the point buffer,
    a stroke feature recognizer including a dynamic stroke feature extractor connected from the point buffer and responsive to a pen down state for dynamically extracting stroke recognition features from the stroke descriptor information of the current stroke as the current stroke is entered by the user and for assiliini a meaning to the current stroke, and a cluster recognizer connected from the stroke feature recognizer and responsive to the meaning assigned to each stroke for recognizing and assigning a character meaning to a current cluster of strokes, wherein the stroke feature recognizer is responsive to the stroke recognition features for assigning a meaning to each current stroke and the cluster recognizer includes a stroke buffer, including
a current stroke buffer for storing the strokes of a current cluster of strokes in the time order of their entry, and
a previous stroke buffer for storing the strokes of a cluster of strokes immediately preceding the current cluster of strokes,
a window buffer for storing a contiguous group of strokes in spatial order according to the coordinates of the strokes of the group,
a stroke buffer controller responsive to the stroke feature recognizer for constructing an influence list containing an identification of an area of influence of each stroke of the current cluster of strokes,
receiving a current stroke,
determining an area of influence of the current stroke, when the area of influence of the current stroke indicates that the current stroke is a part of the current cluster of strokes,
writing the current stroke into the current stroke buffer, and
when the area of influence of the current stroke indicates that the current stroke is not a part of the current cluster of strokes,
transferring the strokes of the current cluster of strokes into the previous stroke buffer, and
writing the current stroke into the current stroke buffer to begin a new current cluster of strokes,
a stroke buffer scanner for scanning the influence list, and writing the strokes of the current stoke buffer into the window buffer in spatial order,
a position discriminator for storing a cluster data structure containing a plurality of cluster meanings,
each cluster meaning representing a cluster of strokes and a corresponding meaning assigned to the cluster of strokes,
reading combinations of strokes from the window buffer,
comparing the combinations of strokes from the window buffer with the cluster meanings stored in the cluster data structure,
determining when a combination a strokes from the window buffer corresponds to a cluster meaning,
providing as an output an identification of the cluster meaning corresponding to the combination of strokes from the window buffer,
removing the combination of strokes from the window buffer, and transferring the combination of strokes fom the current cluster buffer to the previous stroke buffer.

14. The handwritten character recognition system of claim 13 wherein:

the stroke buffer controller is responsive to a current stroke having spatial coordinates located between strokes which are previous in time for
reordering the strokes in the current and previous stroke buffers,
the stroke buffer scanner is responsive to the reordering of the current and previous stroke buffers for rewriting the strokes of the current stoke buffer into the window buffer in a corresponding new spatial order, and
the position discriminator is responsive to the rewriting of the window buffer for determining a new cluster meaning from the new combinations of strokes in the window buffer.

15. The handwritten character recognition system of claim 14 wherein the new stroke is an editing gesture and the handwritten character system further comprises:

an editor responsive to the editing gesture for directing the stroke buffer controller to modify the strokes stored in the stroke buffer as indicated by the editing gesture.

16. The handwritten character recognition system of claim 13 wherein a combination of two consecutive strokes comprises an editing command and wherein:

the position discriminator is responsive to the combination of two consecutive strokes comprising an editing command for providing an output indicating the editing command, and the handwritten character recognition system further includes an editor responsive to the editing command for directing the stroke buffer controller to modify the strokes stored in the stroke buffer as indicated by the editing command.

17. In a data processing system including a tablet and pen for user entry of handwritten characters and a processing unit connected from the tablet and pen for operating upon the user input, a method for recognizing handwritten characters, comprising the steps of:

storing stroke descriptor information of a current stroke in a stroke buffer as the current stroke is entered by the user, responsive to the pen states, transferring the stroke descriptor information of the current stroke into a point buffer, in response to a pen down state, dynamically extracting stroke recognition features from the stroke descriptor information of the current stroke and dynamically assigning a meaning to the current stroke,
wherein the stroke recognition features describe the current stroke with variable degrees of hierarchical alproximations, the hierarchical approximations including mutiple scalar representations of the current stroke, and recognizing and assigning a character meaning to a current cluster of strokes.

18. The method for recognizing handwritten characters of claim 17, further comprising the steps of:

extracting stroke recognition features from the stroke descriptor information of the current stroke when the current stroke is completed.

19. The method for recognizing handwritten characters of claim 18 wherein:

the static extraction of stroke recognition features from the stroke descriptor information of the current stroke when the current stroke is completed is in response to a pen up state.

20. The method for recognizing handwritten characters of claim 17 wherein the stroke descriptor information comprises:

for each stroke,
a sequence of coordinate points along the line of the stroke, including at least the first and last points of the line of the stroke, and a direction string indicating, for each point of the string, the direction of movement of the line of the stroke at the point.

21. The method for recognizing handwritten characters of claim 20, further comprising the steps of:

identifying segments of a stroke wherein a segment of a stroke includes at least a beginning point of the segment and an end point of the segment and wherein a segment does not contain a change in direction of movement of the line of the stroke, and identifying changes in the direction of movement of the line of a stroke wherein a change in direction of movement of the line of a stroke occurs when an angle between two lines connecting three consecutive points along the stroke exceeds a predetermined boundary defined by two lines extending from any one of the three points, the two lines extending from that point in the direction of movement of the pen at that point and the angle between the two lines being defined by predetermined displacements perpendicular to the direction of movement of the pen at that point.

22. The method for recognizing handwritten characters of claim 21, further comprising the steps of:

inserting an additional point at a change in direction of the line of a stroke, wherein the additional point is located at the end point of the segment before the change in direction of the line of the stroke and operating as the beginning point of the segment following the change in direction of the line of the stroke.

23. The method for recognizing handwritten characters of claim 17, further comprising the steps of:

storing the stroke recognition features extracted from the current stroke, wherein the stroke recognition features describe the current stroke with variable degrees of hierarchical approximations the hierarchical approximations including multiple scalar representations of the current stroke and including the direction string indicating, for points along the line of the stroke, the direction of movement of the line of the stroke at each point.

24. The method for recognizing handwritten characters of claim 23 wherein the stroke recognition features further include:

the coordinates of at least the beginning and end points of the line of the stroke.

25. The method for recognizing handwritten characters of claim 23 wherein the stroke recognition features firther include:

an array of coordinates of all points along the line of the stroke as received as input coordinates from the tablet.

26. In a data processing system including a tablet and pen for user entry of handwritten characters and a processing unit connected from the tablet and pen for operating upon the user input, a method for recognizing handwritten characters. comprising the steps of:

storing stroke descriptor information of a current stroke in a stroke buffer as the current stroke is entered by the user, responsive to the pen states, transferring the stroke descriptor information of the current stroke into a point buffer, extracting stroke recognition features from the stroke descriptor information of the current stroke and assigning a meaning to the current stroke, and recognizing and assigning a character meaning to a current cluster of strokes, including reading the stroke recognition features from the stroke recognition feature data structure, generating a plurality of scaled topological representations of the current stroke, each scaled topological representation being a progressively smoothed representation of the current stroke generated from the stroke representation features, selecting a scaled topological representation of the current stroke, the scaled topological representation of the current stroke being selected to provide the maximum signal to noise ratio of the stroke representation, storing a list of ideal prototype representations corresponding to possible meanings of the current stroke from a plurality of ideal prototype representations of strokes, comparing the scaled topological representation of the current stroke and boundaries of the ideal prototype representations of the list of ideal prototype representations wherein the boundaries of the ideal prototype representations are determined by linear combinations of features of the ideal prototype representations, and assigning to the current stroke an identification of an ideal prototype representation having boundaries including the scaled topological representation of the current stroke, the assigned identification of the matching ideal prototype representation representing a stroke meaning assigned to the current stroke.

27. The method for recognizing handwritten characters of claim 26, further comprising the steps of:

storing the stroke recognition features extracted from the current stroke, wherein the stroke recognition features describe the current stroke with variable degrees of hierarchical approximation, and include the direction string indicating, for points along the line of the stroke, the direction of movement of the line of the stroke at each point.

28. The method for recognizing handwritten characters of claim 27, further comprising the step of:

generating, for each ideal prototype representation, a corresponding reversed ideal prototype representation having a reversed direction string for use in the comparison of features of the topological representations of the current stroke and of the ideal prototype representations.

29. The method for recognizing handwritten characters of claim 17 wherein the stroke feature recognizer is responsive to the stroke recognition features for assigning a meaning to each current stroke and further comprising the steps of:

storing the strokes of a current cluster of strokes in the time order of their entry, storing the strokes of a preceding cluster of strokes, storing a contiguous group of strokes of the current cluster of strokes in spatial order according to the coordinates of the strokes of the group, constructing an influence list containing an identification of an area of influence of each stroke of the current cluster of strokes, receiving a current stroke, determining an area of influence of the current stroke, and when the area of influence of the current stroke indicates that the current stroke is a part of the current cluster of strokes, writing the current stroke into the current cluster of strokes, and when the area of influence of the current stroke indicates that the current stroke is not a part of the current cluster of strokes, transferring the strokes of the current cluster of strokes into the preceding cluster of stroke, and writing the current stroke into a new current cluster of strokes, scanning the influence list, and writing the strokes of the current stoke buffer into the spatially ordered contiguous group of strokes, storing plurality of cluster meanings, each cluster meaning representing a cluster of strokes and a corresponding meaning assigned to the cluster of strokes, reading combinations of strokes from the spatially ordered contiguous group of strokes, comparing the combinations of strokes from the spatially ordered contiguous group of strokes with the cluster meanings, determining when a combination a strokes from the spatially ordered contiguous group of strokes corresponds to a cluster meaning, providing as an output an identification of the cluster meaning corresponding to the combination of strokes from the spatially ordered contiguous group of strokes, removing the combination of strokes from the spatially ordered contiguous group of strokes, and transferring the combination of strokes from the current cluster of strokes to the preceding cluster of strokes.

30. The method for recognizing handwritten characters of claim 28, further comprising the step of:

responsive to a current stroke having spatial coordinates located between strokes which are previous in time, reordering the strokes in the current and preceding clusters of strokes to accommodate the current stroke, rewriting the strokes of the current cluster of strokes into the spatially ordered contiguous group of strokes in a corresponding new spatial order, and determining a new cluster meaning from the new combinations of strokes in the spatially ordered contiguous group of strokes.

31. The method for recognizing handwritten characters of claim 29 wherein the new stroke is an editing gesture, firther comprising the step of:

responsive to the editing gesture, modifying the strokes stored in the current and preceding clusters of strokes as indicated by the editing gesture.

32. The method for recognizing handwritten characters of claim 28 wherein a combination of two consecutive strokes comprises an editing command, further comprising the steps of:

responsive to the combination of two consecutive strokes comprising an editing command, providing an output indicating the editing command, andmprising the steps of:

modifying the strokes stored in the current and preceding clusters of strokes as indicated by the editing command.

* * * * *